United States Patent
Tajima et al.

(10) Patent No.: US 7,232,374 B2
(45) Date of Patent: Jun. 19, 2007

(54) WHEEL BEARING DEVICE

(75) Inventors: Eiji Tajima, Shizuoka-ken (JP);
Hiroyuki Ogura, Shizuoka-ken (JP);
Syougo Suzuki, Shizuoka-ken (JP);
Shigeaki Fukushima, Shizuoka-ken (JP); Mitsuru Umekida, Shizuoka-ken (JP); Akira Torii, Shizuoka-ken (JP);
Akira Sera, Shizuoka-ken (JP); Hisashi Ohtsuki, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/771,394

(22) Filed: Feb. 5, 2004

(65) Prior Publication Data

US 2004/0171428 A1 Sep. 2, 2004

Related U.S. Application Data

(62) Division of application No. 09/956,465, filed on Sep. 20, 2001, now Pat. No. 6,739,977.

(30) Foreign Application Priority Data

| Sep. 20, 2000 | (JP) | 2000-285815 |
| Oct. 16, 2000 | (JP) | 2000-315519 |
| Jan. 24, 2001 | (JP) | 2001-15842 |
| Feb. 13, 2001 | (JP) | 2001-35907 |
| Jun. 4, 2001 | (JP) | 2001-168619 |

(51) Int. Cl.
*F16D 3/84* (2006.01)

(52) U.S. Cl. ............ 464/178; 464/905; 464/145; 384/544

(58) Field of Classification Search ............... 464/178, 464/145, 146, 905; 384/544; 301/105.1
See application file for complete search history.

(56) References Cited

U.S. PATENT DOCUMENTS

| 4,571,099 A | 2/1986 | Balken et al. |
| 6,109,793 A * | 8/2000 | Miyazaki ............... 384/448 |
| 6,250,814 B1 | 6/2001 | Tajima et al. |
| 6,280,093 B1 | 8/2001 | Ohtsuki et al. |
| 6,280,096 B1 | 8/2001 | Miyazaki et al. |
| 6,286,909 B1 | 9/2001 | Mizukoshi et al. |
| 6,296,321 B1 * | 10/2001 | Mizukoshi et al. ...... 301/105.1 |
| 6,422,758 B1 | 7/2002 | Miyazaki et al. |
| 6,478,471 B2 | 11/2002 | Ishida et al. |
| 6,523,909 B1 | 2/2003 | Nakamura et al. |
| 6,634,951 B2 | 10/2003 | Sahashi et al. |

FOREIGN PATENT DOCUMENTS

JP 57-164801 10/1982

(Continued)

*Primary Examiner*—Aaron Dunwoody
(74) *Attorney, Agent, or Firm*—Arent Fox LLP

(57) ABSTRACT

A wheel bearing device having a unitized hub ring, double-row bearing and constant velocity universal joint with one of double-row inner raceways formed on the joint outer ring. An end portion of the joint outer ring is fitted to an outside periphery of the hub ring through serrated portions. The hub ring is plastically deformed and expanded from an inside diameter side toward an outside diameter side by pushing a steel ball into a through hole of the hub ring preventing play in the serrated portions by the diameter expansion. A surface-hardened layer is formed at least on a base portion of the wheel mounting flange.

13 Claims, 44 Drawing Sheets

FOREIGN PATENT DOCUMENTS

| | | |
|---|---|---|
| JP | 58-173502 U | 11/1983 |
| JP | 59-75803 | 4/1984 |
| JP | 10-264605 | 10/1998 |
| JP | 10-272903 | 10/1998 |
| JP | 11-037146 | 2/1999 |
| JP | 11-062951 | 3/1999 |
| JP | 11-151904 | 6/1999 |
| JP | 2000-002239 | 1/2000 |
| JP | 2000-211310 | 8/2000 |
| JP | 2000-219006 | 8/2000 |
| JP | 2001-018604 | 1/2001 |
| JP | 2001-018605 | 1/2001 |

\* cited by examiner (a)

(b)

Wheel bearing device, conventional type

Wheel bearing device of the invention

WHEEL BEARING DEVICE

This is a Divisional of U.S. patent application Ser. No. 09/956,465, filed Sep. 20, 2001, which issued as U.S. Pat. No. 6,739,977 on May 25, 2004. The disclosure of the prior application, now patent, is hereby incorporated by reference in its entirety.

BACKGROUND OF THE INVENTION

1. Field of the Invention

The invention relates to a wheel bearing device which rotatably supports a wheel of an automobile on an car body.

2. Description of the Related Art

A wheel bearing device (hereinafter referred to as "bearing device") shown in FIG. 45 is for a driving wheel and has a constitution in which a hub ring 1, a bearing 2, and a constant velocity universal joint 3 are unitized.

The hub ring 1 is provided with an outboard inner raceway 4 on its outer peripheral surface as well as a wheel mounting flange 6 for mounting a wheel (not shown). Hub bolts 7 for fixing a wheel disc are studded on the wheel mounting flange 6 with equal intervals in a circumferential direction. A pilot portion 40 having a wheel guide portion 38 and a brake guide portion 39 is unitizedly formed with an outboard end portion of the hub ring 1. Also, a brake rotor (not shown) is mounted on the wheel mounting flange 6 together with the wheel disc.

The constant velocity universal joint 3 is provided at an end of a shaft 8 and comprises a joint outer ring 11 with a track groove 9 formed on its inside periphery, a joint inner ring 12 having a track groove 10 formed on its outside periphery opposing the track groove 9 of the joint outer ring 11, torque transmission balls 13 installed between the track groove 9 of the joint outer ring 11 and the track groove 10 of the joint outer ring 11, and a cage 14 supporting the torque transmission balls 13 disposed between the joint outer ring 11 and the joint inner ring 12. Between the joint outer ring 11 and the shaft 8 is a boot 15 for preventing entry of water and foreign matter from outside and leakage of grease contained inside.

The joint outer ring 11 has a mouse portion 16 storing the joint inner ring 12, the torque transmission balls 13 and the cage 14, and a stem portion 19 axially extending from the mouse portion 16, with a serrated portion 17 being formed thereon. Transmission of torque from the stem portion 19 to the hub ring 1 is enabled by inserting the stem portion 19 into a through-hole of the hub ring 1 so that they are fit each other through serrated portions 17 and 18 formed respectively on an outside peripheral surface of the stem portion 19 and an inside peripheral surface of the through-hole. An axial end of the joint outer ring 11 is plastically deformed to be roll-formed to an outboard end portion of the hub ring 1, and the joint outer ring 11 is fixed to the hub ring 1 by a roll-formed portion 20.

Double-row inner raceways are formed with an outboard inner-raceway 4 formed on an outer peripheral surface of the hub ring 1 and with an inboard inner-raceway 5 formed on an outer peripheral surface of a shoulder portion 21 of the joint outer ring 11. The joint outer ring 11 is inserted into the hub ring 1 axially from the inboard side and is roll-formed to the hub ring 1. Thereby a shoulder portion 21 of the joint outer ring 11 butts against an inboard end portion of the hub ring 1, thereby pre-load is applied to the bearing 2.

The bearing 2 is of a double-row angular ball bearing constitution, and is constituted such that rolling elements 25 and 26 are disposed between the inner raceways 4 and 5 formed respectively on outer peripheral surfaces of the hub ring 1 and joint outer ring 11 and outer raceways 23 and 24 formed respectively on an outer ring 22, and the rolling elements 25 and 26 of each row are supported by cages 27 and 28 at equal intervals in a circumferential direction. The outer ring 22 is provided with an car-body mounting flange 29 for mounting an car body (not shown) on it. The car-body mounting flange 29 is fixed with bolts on a knuckle extending from a suspension device (not shown) of the car body. At opening portion at both ends of the bearing 2, a pair of seals 30 and 31 sealing an annular space formed by the outer ring 22, the hub ring 1 and the joint outer ring 11 are fitted into inner peripheral portions at end portions of the outer ring 22 to prevent inside grease from leaking and water and foreign matter from entering from outside. The seals 30 and 31 are provided with seal lips that are in sliding contact onto outer peripheral portions of the hub ring 1 and the joint outer ring 11.

While the bearing device shown in FIG. 45 is a type having a non-separable constitution in which the hub ring 1, the bearing 2 and the constant velocity universal joint 3 are unitized together, FIGS. 46 and 47 show other examples of bearing devices of a type having a separable constitution in which a hub ring 1' and the bearing 2 are unitized together, and the constant velocity universal joint 3 is fixed to the hub ring 1' with bolts 32 or nuts 33. A separable type differs from a non-separable type as described below.

An inner ring 35, a separate element from the hub ring 1', is fitted onto a small-diameter end portion 34 formed on an outside periphery of an inboard end portion of the hub ring 1', and an inboard inner raceway 5 is formed on an outside periphery of the inner ring 35. The inner ring 35 is pressed into position with an appropriate interference to prevent creeping from occurring. Both an outboard inner raceway 4 formed on an outside periphery of the hub ring 1' and the inboard inner raceway 5 formed on the outside periphery of the inner ring 35 form double-row inner raceways. The inner ring 35 is pressed onto the end portion of the small-diameter portion 34 of the hub ring 1', the end portion of the small-diameter portion 34 of the hub ring 1' is outwardly roll-formed by plastically deforming it, and the roll-formed portion 36 serves to prevent the inner ring 35 from loosening and coming off, and to apply pre-load to the bearing 2.

In this type of bearing devices, because of the constitution in which the roll-formed portion 36 serves for the prevention of coming off and application of pre-load, the joint outer ring 11 is fixed to the hub ring 1 in the following way: a stem portion 19 of the joint outer ring 11 is inserted into the through-hole of the hub ring 1', then the joint outer ring 11 is fixed to the hub ring 1' with tightening torque necessary and sufficient to prevent the joint outer ring 11 from loosening from the hub ring 1' either by engaging a bolt 32 into a threaded hole 37 formed on a stem portion 19 of the joint outer ring 11 (see FIG. 46) or by engaging a nut 33 onto the stem portion 19 of the outer joint ring 11 (see FIG. 47).

The bearing device in FIG. 45 is constituted such that the stem portion 19 of the joint outer ring 11 is roll-formed by plastically deforming it, and the joint outer ring 11 is fixed to the hub ring 1 by a roll-formed portion 20. Therefore, considering the convenience in assembly of this bearing device, a serration fit between the hub ring 1 and the stem portion 19 of the joint outer ring 11 is preferably loose.

Also, in the bearing devices in FIG. 46 and FIG. 47, the roll-formed portion 36 of the hub ring 1' serves to prevent the inner ring 35 from loosening and coming off, and to apply pre-load to the bearing 2, and the bolt 32 or the nut 33 fixes the constant velocity universal joint 3 to the hub ring

1'. Because the swaged portion 36 of the hub ring 1' serves to prevent the inner ring 35 from loosening and apply pre-load to the bearing 2 as described above, applying pre-load by fastening torque of the bolt 32 or the nut 33 becomes unnecessary, and the bolt 32 or the nut 33 fixes the joint outer ring 11 to the hub ring 1' with fastening torque that is necessary and sufficient to prevent the joint outer ring 11 from loosening.

However, when the serration fit between the hub ring 1 or 1' and the stem portion 19 is loose for convenience in assembly of the bearing device, play may occur between the serrated portions 17 and 18 of the hub ring 1 or 1' and the stem portion 19 respectively, resulting in possible deterioration in drive feeling and generation of an unusual sound in a driving system. Also, a constitution of this type is weak to moment load applied to the hub ring 1, an attempt for securing sufficient strength for the stem portion 19 and the roll-formed portion 20 hinders the miniaturization of the entire device.

Also, because the bearing devices in FIGS. 45 to 47 are constituted such that the stem portion 19 of the joint outer ring 11 is fitted into an inside periphery of the hub ring 1 or 1', the dimensions in a radial direction of the serrated portions 17 and 18 for torque transmission cannot be made larger than the inside diameter of the hub ring 1 or 1'. When the diameters of serrated portions cannot be made larger as described above, the serrated portions inevitably have to be made longer in an axial direction to secure a predetermined transmitted torque, which results in inconvenience in that the dimension in the axial direction of the bearing device increases.

In the bearing device in FIG. 45, specifically, moment load acting on the hub ring 1 is received mainly only by the outboard bearing 2 of the double row bearing 2. This is because the hub ring 1 and the joint outer ring 11 tend to be bent at their butted portion when moment load is applied, so that an inboard bearing is not capable enough to support moment load. Therefore, excessive force may cause looseness at the roll-formed portion 20, so that lack in coupling strength between the hub ring 1 and the outer joint ring 11, as well as lack in strength of the stem portion 19 of the joint outer ring 11 is feared.

Also, in the bearing devices in FIGS. 45 to 47, because the inner raceway 4 is formed on the hub ring 1 or 1', and the hub ring 1 or 1' has a function equivalent to a raceway of a general roller bearing, the hub ring 1 or 1' must be made of steel for bearing in the same way as a raceway of such a general roller bearing. However, because steel for bearing is extremely purified steel, it is expensive. Also, steel for bearing contains a higher amount of carbon for hardenability and for hardness on a raceway surface, so that it has low ductility, which leads in poor workability in forging.

In a wheel bearing device, generally, an inboard bearing is subjected to severer load conditions than an outboard bearing. Conventionally, specifications of internal parts of both inboard and outboard bearings have been made equal without considering such a point described above. Briefly, the pitch circle diameters and other dimensions of outboard and inboard bearings have been made equivalent. This means, however, that an outboard outer raceway 23 also inevitably has a large radius dimension that satisfies the rated load of an inboard bearing, which is against demand for miniaturization and weight-reduction of a bearing device. Furthermore, when designing a bearing device, it must be considered that a hub bolts 7 do not contact with an outer ring 22 in case of repair, for example, in the case when the hub bolt 7 is drawn from wheel mounting flange 6; however, a larger radial dimension of the outboard outer raceway 23 makes such consideration difficult to realize, restricting the freedom in design. Consequently, the design itself of a bearing device cannot be realized in an extreme case.

In a bearing device in FIG. 45, a axial end of the joint outer ring 11 is plastically deformed to roll-form it to an outboard end portion of the hub ring 1, and the joint outer ring 11 is fixed to the hub ring 1 by the roll-formed portion 20. Therefore, during the roll-forming operation, run-out occurs on the wheel mounting flange 6 of the hub ring 1. Run-out of the flange will cause face run-out (or run-out in an axial direction) on a brake rotor to be mounted on the wheel mounting flange 6 of the hub ring 1, causing vibration in braking while the automobile is traveling at a high speed or resulting in a problem such as uneven wear of the brake rotor or brake juddering.

Generally, in view of the reason of easiness in forging, workability in cold forging, and machinability or because of economy, raw un-heat-treated medium carbon steel (S53C and others) for machine structural purpose is used for the hub ring 1. Miniaturization and weight-lightening of a bearing device greatly contribute for increased travel stability of an automobile, so that the wheel mounting flange 6 of the hub ring 1 is increasingly constituted with ribs and thinned. However, such movement is bringing the mechanical strength of the hub ring itself to a fatigue limit of the material, or medium-carbon steel for machine structural purpose, and therefore, further weight-reduction is becoming difficult. Specifically, thinning of the wheel mounting flange 6 of the hub ring 1 for weight-reduction purpose can cause concentration of rotational bending stress at an outboard base portion of the wheel mounting flange 6, or at a fillet located at a region extending from a brake rotor mounting surface to a cylindrical pilot portion 41, and the fillet can be a starting point of breakage.

An inboard base portion of the wheel mounting flange 6 is a sealing surface with which the seal-lip of a seal 30 is in sliding contact, and the sealing surface has a larger curvature with a quenching-tempering treatment being applied to give abrasion resistance on the surface. Therefore, the inboard root portion of the wheel mounting flange 6 has higher mechanical strength than an outboard base portion that is not heat-treated, so that the inboard base portion is less likely to be a starting point of breakage caused by rotational bending stress.

Although thickening of the wheel mounting flange 6 can be a solution for avoiding such breakage described above, it is against the movement of weight-reduction. Further, generation of stress can be eased with enlarged dimensions of the base portion, or the curvature of the base portion, of the wheel mounting flange 6; however, the application of this method is limited by a possible mechanical interference between the base portion and a brake rotor to be mounted on the wheel mounting flange 6.

Also, material can be strengthened by increasing its carbon content, adding a strengthening element such as Si (silicon) or V (vanadium) or by applying a heat treatment such as normalizing; however, workability of the material is affected by increased material hardness. Consequently, conventional processing methods or existing facilities become difficult to be applied, and further, adding a large amount of strengthening elements leads to increased material costs.

SUMMARY OF THE INVENTION

It is an object of the present invention to prevent occurrence of play between serrated portions of a hub ring and a joint outer ring.

To attain the above object, a bearing device according to the present invention comprises a hub ring, a double-row bearing and a constant velocity universal joint, at least the hub ring and the double-row bearing are unitized, and the hub ring and a joint outer ring of the constant velocity universal joint are fitted to each other through torque transmission means and joined together by means for fastening in an axial direction. In this constitution, a clearance in the fit portion of the torque transmission means is prevented from occurring by a play prevention member.

In this bearing device, fit condition of the torque transmission means provided between the hub ring and the joint outer ring, which was in a loose relationship for convenience in assembling a bearing device, can be changed to a tight relationship because clearance in the fit portion of the torque transmission means provided between the hub ring and the joint outer ring is prevented from occurring by the play prevention element. Thereby, occurrence of play between the serrated portions of the hub ring and the joint outer ring, deterioration of drive feeling and generation of unusual sound from a driving system can be prevented so that a highly reliable bearing device having high quality can be provided.

This invention is also applicable to a bearing device having a constitution in which a hub ring, a constant velocity universal joint and a double-row bearing are unitized, one of double-row inner raceways of the bearing is formed on a joint outer ring of the constant velocity joint, and an end portion of the joint outer ring is fitted onto an outside periphery of the hub ring through torque transmission means.

In a bearing device of the invention, the play prevention member for preventing occurrence of play in the fit portion of the torque transmission means has an outside diameter larger than an inside diameter of a hollow portion provided in the hub ring and it is a diameter-expanding member to be pressed into the hollow portion. Pressing the diameter-expanding member into the hollow portion of the hub ring expands the hub ring from the inside toward the outside, and thereby a fit condition of the torque transmission means between the hub ring and the joint outer ring can be changed to a tight one.

In a bearing device according to the invention, the hub ring and the joint outer ring can be fitted tighter by adding a constitution in which an end portion of the hub ring is roll-formed to be coupled with the joint outer ring or by adding a constitution where a snap ring is installed at an end portion of the hub ring to couple the hub ring with the joint outer ring.

The present invention is applicable to a constitution in which the hub ring has a small-diameter end portion, an inner ring as a separate element that forms one of double-row inner raceways of a bearing is pressed onto the small-diameter end portion, the hub ring and the bearing are unitized together by roll-forming the small-diameter end portion, and a joint outer ring is fitted into a bore of the hub ring through the torque transmission means.

In a bearing device according to the present invention, the play prevention member for preventing a clearance occurring in the fit portion of the torque transmission means has an outside diameter larger than an inside diameter of the hollow portion of the joint outer ring and is a diameter-expanding member to be pressed into the hollow portion. The diameter-expanding member expands the joint outer ring from the inside toward the outside by pressing the diameter-expanding member into the hollow portion, the fit condition in the torque transmission means between the hub ring and the joint outer, can be changed to a tighter one.

The diameter-expanding member is preferably a rolling element for a bearing. Using a rolling element as a diameter-expanding member facilitates the expansion of the hub ring or the joint outer ring from the inside toward the outside by pressing the diameter-expanding member into the hollow portion. A ball or a roller may be used as the rolling element.

In a bearing device according to the present invention, a small-diameter portion having an outside diameter smaller than an inside diameter of the hub ring is provided at an end portion of the joint outer ring, a portion having projections and depressions is formed on an outside periphery of the small-diameter portion in a circumferential direction, and between an inner periphery of the hub ring and an outer periphery of the small-diameter portion, there is installed a ring member integrally having tongue pieces elastically contacting with the portion having projections and depressions on the small-diameter portion and with the fit portion of the torque transmission means of the hub ring. Installation of the ring member between the hub ring and the small-diameter portion provides a fit condition in which the tongue pieces elastically contact with both the fit portion of the torque transmission means of the hub ring and the portion having projections and depressions of the small-diameter portion, of which arrangement creates a tight fit condition of the hub ring and the joint outer ring even play exists in the fit portion of the torque transmission means.

It is another object of the invention to make a bearing device more compact and to improve its rigidity against moment load.

In order to attain the object, a bearing device according to the invention comprises a hub ring, a constant velocity universal joint and a double-row bearing, of which all are unitized, and one of double-row inner raceways of the bearing is formed on a joint outer ring of the constant velocity universal joint, wherein the joint outer ring is fitted onto the hub ring through torque transmission means, and the hub ring and the joint outer ring are joined by plastic deformation.

By fitting the joint outer ring onto the hub ring as described above, a dimension of the torque transmission means in a radial direction can be made larger than an inside diameter of the hub ring. As a result of the enlargement in the diameter of the torque transmission means, the length of the torque transmission means in an axial direction can be shortened to make the bearing device more compact.

In this case, because the hub ring becomes possible to be extended to inboard side in a bore of the joint outer ring, the double-row bearing, or both inboard and outboard bearings, can take moment load acting on the hub ring through the extended portion, so that moment rigidity of the bearing device is increased. Taking moment load by the double-row bearing reduces load on the plastically deformed portion, so that loosening of the plastically deformed portion is surely prevented, and coupling strength between the hub ring and the joint outer ring is stably maintained over a long period of time. In order to obtain the effect described above, an inboard end portion of the hub ring is preferably extended beyond an inboard inner raceway of the double-row inner raceways.

The torque transmission means and the plastically deformed portion may be separately disposed in an axial direction. In this case, a torque transmission function and a function of preventing the hub ring from loosening are available independently from each other, allowing optimum design of both the functions such that each of the functions can be individually enhanced.

By providing a fit portion between the hub ring and the joint outer ring in which they are fitted without play, transmission of radial load between the two are ensured and radial rigidity of the bearing device is improved. Different embodiments may be available for the arrangements of the fit portion, the torque transmission means and the plastically deformed portion. For example, the plastically deformed portion can be disposed in an axial direction at one side of the torque transmission means and the fit portion can be disposed at the other side.

The plastically deformed portion is arranged such that, for example, an end portion of the hub ring is roll-formed for coupling with the joint outer ring. More specifically, for example, a tubular portion to be roll-formed is formed at the end portion of the hub ring, the tubular portion to be roll-formed is coupled with an end surface of the joint outer ring by plastically deforming the tubular portion to be roll-formed toward the outside of the hub ring by roll-forming or other means, and thus the hub ring and the joint outer ring are coupled together by plastic deformation.

Coupling constitutions for the hub ring and the joint outer ring include, besides those described above, such a constitution in which the hub ring and the joint outer ring are coupled by plastically deforming an end portion of a connection member inserted into the hub ring. The plastically deformed portion and the torque transmission means may be separately disposed in an axial direction, and they may also be disposed on a common part.

More specifically, for example, a portion with projections and depressions is provided within a fit range of the hub ring and the joint outer ring, and the fit range including the portion with projections and depression is at least partly expanded or shrunk in the diameters. By expanding or shrinking the diameters in the fit range, the portion with projections and depression provided either on the hub ring or on the joint outer ring bites into the mating member, a function of torque transmission and a function of preventing the hub ring (or the joint outer ring) from loosening are compatible.

The diameter-expanded portion or the diameter-shrunk portion in this case is preferably disposed on an inboard inner raceway rather than on an outboard inner raceway. By doing so, the dimension of the joint outer ring in an axial direction can be shortened, decrease in accuracy of the flange end surface of the hub ring caused by punching is avoided, and significant rise in costs for a heat treatment for the portion with projections and depression is avoided.

Fitting an inner ring having an outboard inner raceway on its outside periphery onto the hub ring can omit an outboard inner raceway from the hub ring, and the hub ring can be made as a member having no inner raceway. Accordingly, in selecting a material for the hub ring, consideration for hardenability or the hardness of an inner raceway becomes unnecessary. Therefore, material such as extremely purified steel or high-carbon steel is not necessary to be used for the hub ring, so that production costs can be lowered. The same effect is obtainable by fitting an inner ring having an outboard inner raceway on its outside periphery onto the joint outer ring.

For example, the diameter of an outboard outer raceway becomes smaller $\hat{1}$ by making the pitch-circle diameter of an outboard bearing of a double-row bearing smaller than that of an inboard bearing or $\hat{2}$ by making the diameter of outboard rolling elements smaller than that of inboard rolling elements, and thus the diameter of the outboard outer ring can be made smaller. Therefore, lightening in weight is achieved, space for removing hub bolts is secured, and freedom in design is increased.

The constitutions of $\hat{1}$ and $\hat{2}$ described above are applicable not only to a bearing device for a driving wheel, but also to a bearing device for a driven wheel. That is, in a bearing device in which a hub ring and a double-row bearing are unitized, the pitch-circle diameter of an outboard bearing of the double-row bearing is made smaller than that of an inboard bearing or the diameter of outboard rolling elements of the double-row bearing is made smaller than that of inboard rolling elements.

It is still another object of the present invention to prevent occurrence of run-out of a wheel mounting flange of a hub ring.

In order to attain the object, a bearing device according to the invention comprises a hub ring, a constant velocity universal joint and a double-row bearing which are unitized together, at least one of inner raceways of double-row inner raceways of the bearing and a wheel mounting flange are formed on the hub ring, and a stem portion of a joint outer ring of the constant velocity universal joint is inserted into the hub ring through torque transmission means, wherein a pilot member, which is a separated element having a wheel guide portion and a brake guide portion, is fitted to an end portion of the wheel mounting flange of the hub ring, and the hub ring and the pilot member are fixed by roll-forming to the joint outer ring. The hub ring, the pilot member and the joint outer ring are fixed to each other by unitizing the hub ring and the pilot member by roll-forming an axial end portion of the joint outer ring to the pilot member.

The constitution described above is applicable to a bearing device having a constitution in which the other inner raceway of the double-row bearing is formed directly on the joint outer ring of the constant velocity universal joint. Also, the stem portion and a mouth portion of the joint outer ring can be constituted so as that torque can be transmitted and also can be detachably constituted. In this case, preferably, the other inner raceway of the double-row inner raceways of the bearing is formed directly on the stem portion of the joint outer ring, and the stem portion and the mouth portion, which is a separate element, are fitted to each other through serrated portions.

In the bearing device according to the present invention, by fitting the pilot member, which is a separate element, to an end portion of the wheel mounting flange of the hub ring, alignment of the hub ring and the joint outer ring is made by the end portion of the wheel mounting flange and the separate pilot member, and the pilot member and the hub ring are fixed to be unitized by roll-forming an axial end of the joint outer ring. The alignment of the hub ring and the joint outer ring is made through the separate pilot member and the end portion of the wheel mounting flange, so that occurrence of run-out of the wheel mounting flange of the hub ring can be prevented. Further, fitting the pilot member eases stress concentration, caused by moment load applied to the hub ring, on a roll-formed portion at the axial end.

In this bearing device, it is preferable that $\hat{1}$ the pilot member is subjected to rust-proofing, $\hat{2}$ the surface thereof is hardened by a heat treatment, and $\hat{3}$ a seal member is provided on a surface thereof with which the hub ring contacts.

It is still a further object of the present invention to enhance the strength of a hub ring while aiming at the lightening in weight without changing the shape and dimensions of a wheel mounting flange and without increasing a carbon content in a material or without adding strengthening elements to a material.

In order to attain the object, a bearing device according to the invention comprises a hub ring, a constant velocity universal joint and a double-row bearing that are unitized together, at least one of inner raceways of double-row inner raceways of the bearing and a wheel mounting flange are formed on the hub ring, and a stem portion of a joint outer ring of the constant velocity universal joint is fitted into the hub ring through torque transmission means, wherein a surface-hardened layer is formed at least on an outboard base portion of the wheel mounting flange. The base portion is preferably a fillet located at a region extending from a brake rotor mounting surface to a tubular pilot portion, and the surface-hardened layer is formed by induction hardening.

Forming the surface-hardened layer at least on an outboard base portion of the wheel mounting flange facilitates strengthening of the outboard base portion, which is the weakest portion for rotational bending fatigue strength, to improve the strength for rotational bending fatigue strength without changing the shapes and dimensions of the wheel mounting flange and without increasing a carbon content in a material or adding strengthening elements in a material, but while enabling the use of current processing methods and facilities. As a result, ribbing or thinning of the wheel mounting flange can be realized, leading in miniaturization and weight-lightening of a bearing device.

In the invention, the surface hardness of the surface-hardened layer may be from HRC 40 through 63, preferably from HRC 58 through 63, and the depth may be from 0.3 through 2 mm, preferably from 0.5 through 2 mm.

When the surface hardness of the surface-hardened layer is made in the range from HRC 40 through 63, or preferably from HRC 58 through 63, the hardness in of range effectively prevents breakage caused by rotational bending fatigue, because rotational bending fatigue strength fundamentally depends on hardness. To prevent breakage caused by rotational bending fatigue means to limit the production of cracks on the material surface. Stress caused by rotational bending has its maximum value at the surface and it reduces toward inside. Therefore, the depth of the surface-hardened layer is not necessarily so deep, and the depth from 0.3 through 2 mm, preferably from 0.5 through 2 mm, is adequate.

The hub ring is preferably made of carbon steel containing C from 0.5 through 0.8 wt %. Carbon steel containing C from 0.5 through 0.8 wt % has better workability than SUJ2, high-carbon chrome steel for a bearing (containing C from 0.95 through 1.10 wt %), by a degree corresponding to its less carbon content.

The hub ring comprises the wheel mounting flange on its outside periphery, an outboard inner raceway of the double-row inner raceways thereon, and a small-diameter stepped portion onto which an inner ring is pressed, with the inner ring being formed with the inboard inner raceway. The present invention is applicable to a bearing device comprising a hub ring having such a constitution described above.

A wheel bearing device preferably comprises a seal having a seal lip slidingly contacts with an outside periphery of the hub ring or the inner ring, and a surface-hardened layer is formed about a base portion of the wheel mounting flange with which the seal lip slidingly contacts. By forming a surface-hardened layer also about a base portion of the wheel mounting flange with which the seal lip contacts, the wheel mounting flange is further strengthened.

It is preferable that a serrated portion is formed on an internal periphery of the hub ring and a surface-hardened layer is provided on the serrated portion. Forming a surface-hardened layer on a serrated portion improves a wear resistance and strength, and the improved strength allows to shorten the effective length of the serrated portion. Here, a serrated portion implies serration or spline.

The nature, principle, and utility of the invention will become more apparent from the following detailed description when read in conjunction with the accompanying drawings in which like parts are designated by like reference numerals or characters.

BRIEF EXPLANATION OF THE DRAWINGS

In the accompanying drawings:

FIG. 18(b) is an enlarged cross sectional view of an essential portion showing a ring member in an eighteenth embodiment that corresponds to the fifteenth embodiment, FIG. 18(c) is an enlarged cross sectional view of an essential portion showing a ring member in a nineteenth embodiment that corresponds to the sixteenth embodiment, and FIG. 18(d) is an enlarged cross sectional view of a part showing a ring member in a twentieth embodiment;

DETAILED DESCRIPTION OF THE PREFERRED EMBODIMENTS

Figure 1:
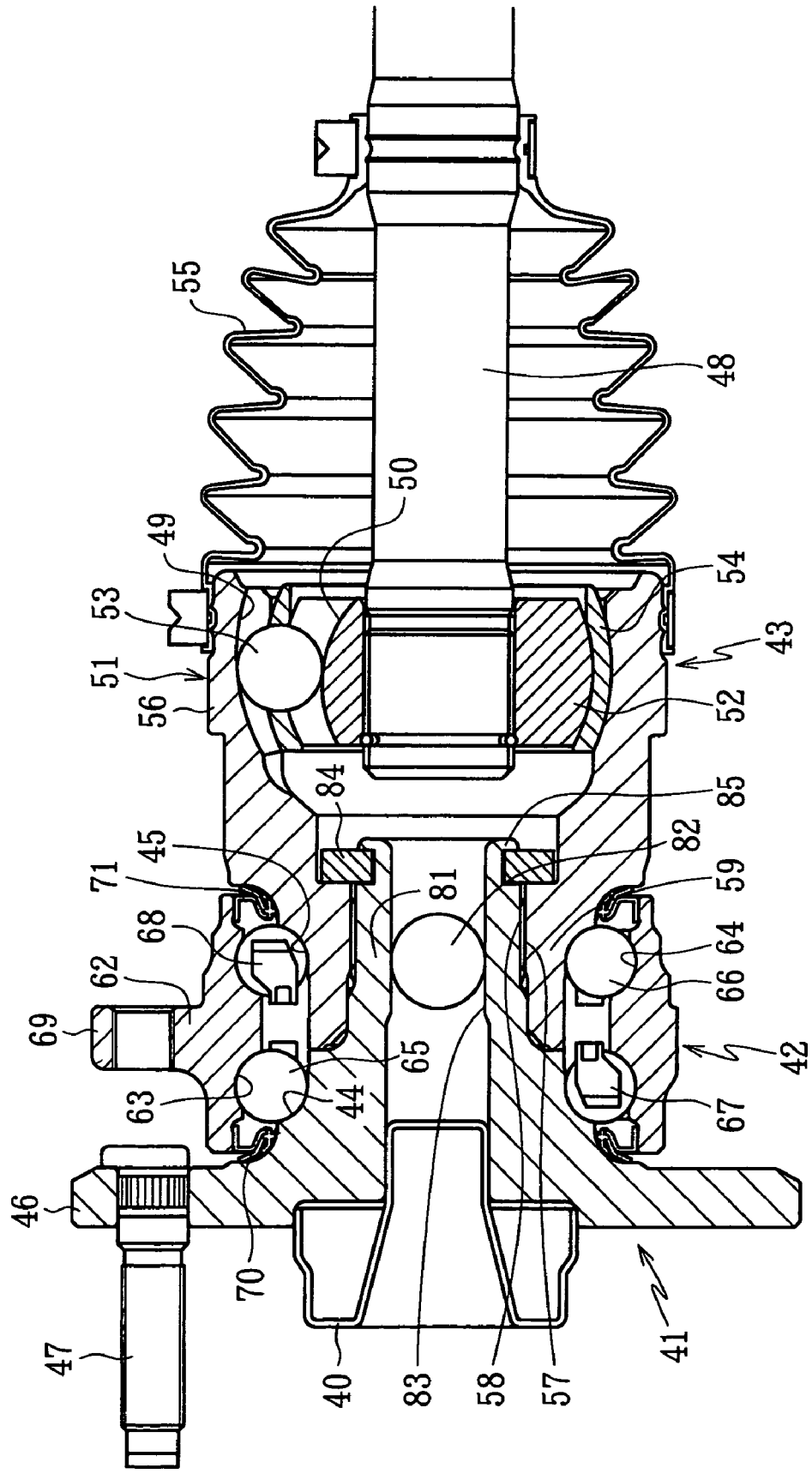
FIG. 1 is a cross sectional view showing a first embodiment of a bearing device according to the invention.

Bearing devices in FIGS. 1 to 4 are embodiments for constitutions of a non-separable type in which a hub ring 41, bearing 42 and a constant velocity universal joint 43 are unitized, and an inboard inner raceway 45 is formed on a joint outer ring 51. Also, bearing devices in FIGS. 5 to 26 are embodiments of constitutions of a separable type in which each of inner raceways 44 and 45 are formed respectively on a hub ring 41' and an inner ring 75, i.e., a separate element, to be unitized as a bearing 42, and the constant velocity universal joint 43 is fixed to the hub ring 41' with a bolt 72 or a nut 73.

The hub ring 41 constituting the bearing device of a first embodiment shown in FIG. 1 has an outboard inner raceway 44 formed on an outside periphery of the hub ring 41 and is provided with a wheel mounting flange 46 for mounting a wheel (not shown) thereon. Hub bolts 47 for fixing a wheel disc are studded at circumferentially equal intervals on the wheel mounting flange 46. A pilot member 40 for a wheel rotor is provided at an outboard opening portion of a through hole of the hub ring 41. The pilot member 40 also serves as a cap for preventing entry of water or foreign matter from outside or leakage of grease contained inside. Lightweight galvanized steel or resin having excellent corrosion resistance is suitable as a material for the member.

The constant velocity universal joint 43 is provided at an end of a shaft 48 and comprises the joint outer ring 51 with a track groove 49 formed on an inside periphery thereof, a joint inner ring 52 with a track grove 50, which surfaces the track grove 49 of the joint outer ring 51, formed on an outside periphery thereof, torque transmission balls 53 installed between the track groove 49 of the joint outer ring 51 and the track groove 50 of the joint inner ring 52, and a cage 54 provided between the joint outer ring 51 and the joint inner ring 52 for supporting the torque transmission balls 53. A boot 55 is provided between the joint outer ring 51 and the shaft 48 to prevent entry of water or foreign matter from outside and leakage of grease contained inside.

The joint outer ring 51 comprises a mouth portion 56 storing the joint inner ring 52, the balls 53 and the cage 54, and a stem portion 59 integrally extending from the mouth portion 56 in an axial direction. The inboard inner raceway 45 is formed on an outside periphery of the stem portion 59. The outboard inner raceway 44 formed on an outside periphery of the hub ring 41 and the inboard inner raceway 45 formed on an outside periphery of the stem portion 59 constitute double-row inner raceways.

The bearing 42 is of a double-row angular ball bearing structure in which rolling elements 65 and 66 are provided between the inner raceways 44 and 45 formed respectively on an outside periphery of the hub ring 41 and on the joint outer ring 51 and the outer raceways 63 and 64 of which both are formed on an inside periphery of an outer ring 62, and the rolling elements 65 and 66 are supported at circumferentially equal intervals by cages 67 and 68. The outer ring 62 is provided with an car-body mounting flange 69 for mounting the bearing device onto an car body (not shown). The car-body mounting flange 69 is fixed with bolts to a knuckle extending from a suspension device (not shown) of the car body. At opening portions at both ends of the bearing 42, a pair of seals 70 and 71 for sealing an annular space formed by the outer ring 62, the hub ring 41 and the joint outer ring 51 are fitted in bores at end portions of the outer ring 62 in order to prevent leakage of grease contained inside and entry of water or foreign matter from outside.

In a bearing device of this first embodiment, a small-diameter end portion 81 is formed by extending an inboard end portion of the hub ring 41, a serrated portion 57 is formed on an outside periphery of the small-diameter end portion 81, and at the same time, a serrated portion 58 is formed on an inside periphery of the stem portion 59 of the joint outer ring 51. The stem portion 59 of the joint outer ring 51 is put onto the small-diameter end portion 81 of the hub ring 41 to fit them to each other with the serrated portions 57 and 58, which allows transmission of torque from the joint outer ring 51 to the hub ring 41. Also, the stem portion 59 of the joint outer ring 51 is butted against the hub ring 41 to apply pre-load to the bearing 42.

The serrated portions 57 and 58 of the hub ring 41 and the joint outer ring 51 are in a loose-fit condition in an assembling process for convenience of assembly of a bearing device; however, with constitutions described below, they are made to be in a tight-fit condition when the assembling is completed. A hollow portion, or a through hole 83, is formed in an axial direction in the small-diameter portion 81 of the hub ring 41, and a steel ball 82, which is a rolling element for bearing, is pushed into the through hole 83. For the steel ball 82, a steel ball having an outside diameter slightly larger than a bore diameter of the through hole 83 is used. By pushing the steel ball 82 in, the small-diameter portion 81 of the hub ring 41 is expanded by plastic deformation from the bore diameter side toward the outside diameter side, the fit between the serrated portions 57 and 58 that has been in a loose-fit condition is brought to a tight-fit condition by expanding and swaging. Beside the steel ball 82, a diameter-expanding member such as a cylindrical roller can be used for expanding the diameter of the small-diameter portion 81 of the hub ring 41.

Further, a quench-hardened ring 84 is put onto the small-diameter portion 81 of the hub ring 41 and secured at a bottom portion of the mouth portion 56 of the joint outer ring 51, the small-diameter portion 81 is plastically deformed by a conventional swaging method, and a swaged portion 85 with a conventional swaging method serves to prevent the quench-hardened ring 84 from loosening. A conventional swaging method is suitable for the purpose in that the swaged portion 85 with a conventional swaging method is small in size and requires less space for a jig for a swaging operation than rocking die swaging method does. The quench-hardened ring 84 works to improve the strength of a portion swaged by a conventional swaging method and to enhance the tightening force of the small-diameter portion 81 through the diameter expansion by pushing the steel ball 82 in, and constitutes a diameter-expanding and -swaging portion by forming a portion with projections and depressions such as knurled surface on a bore surface.

Figure 2:
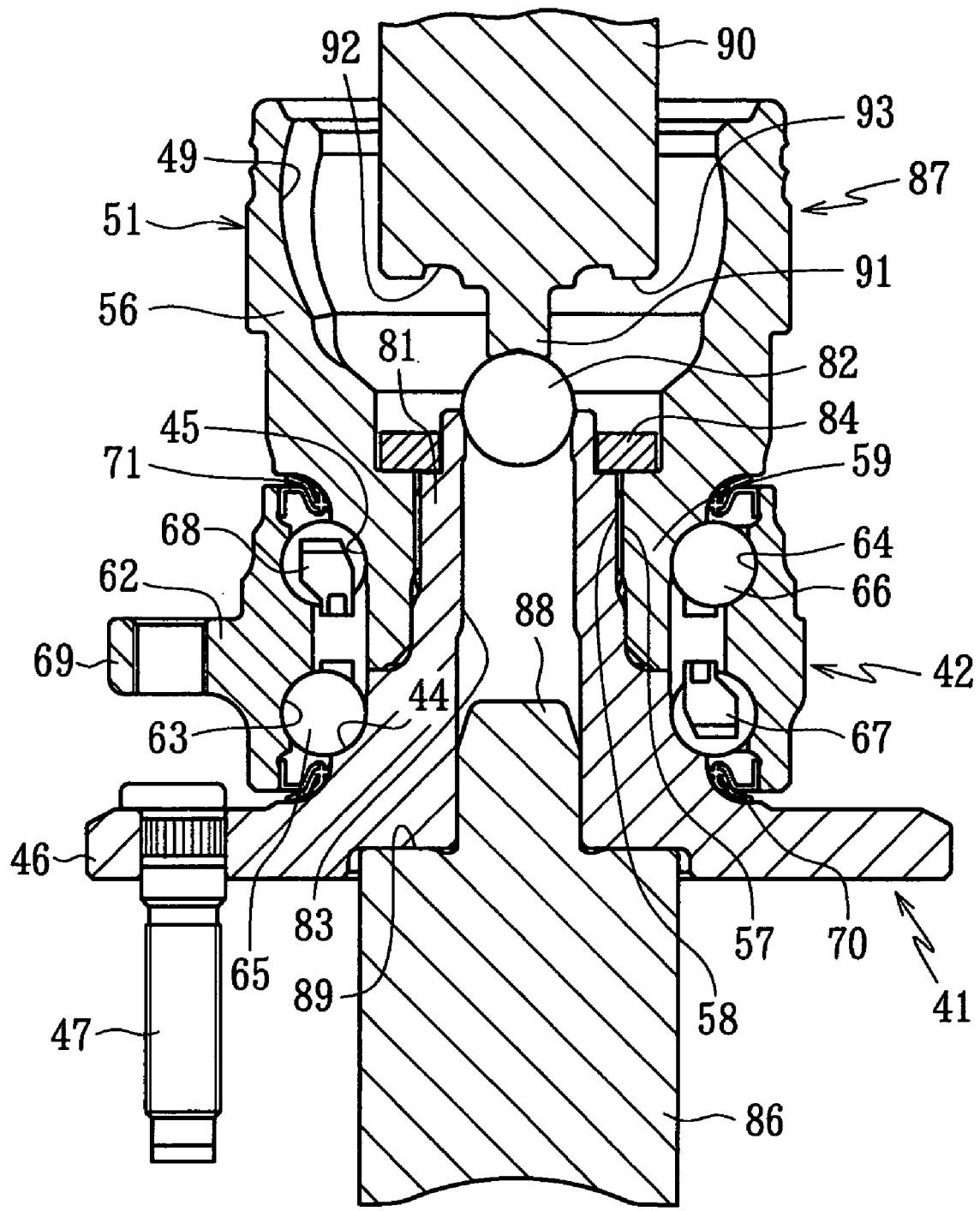
FIG. 2 is a cross sectional view showing a state before swaging is applied to the bearing device of the first embodiment.
Figure 3:
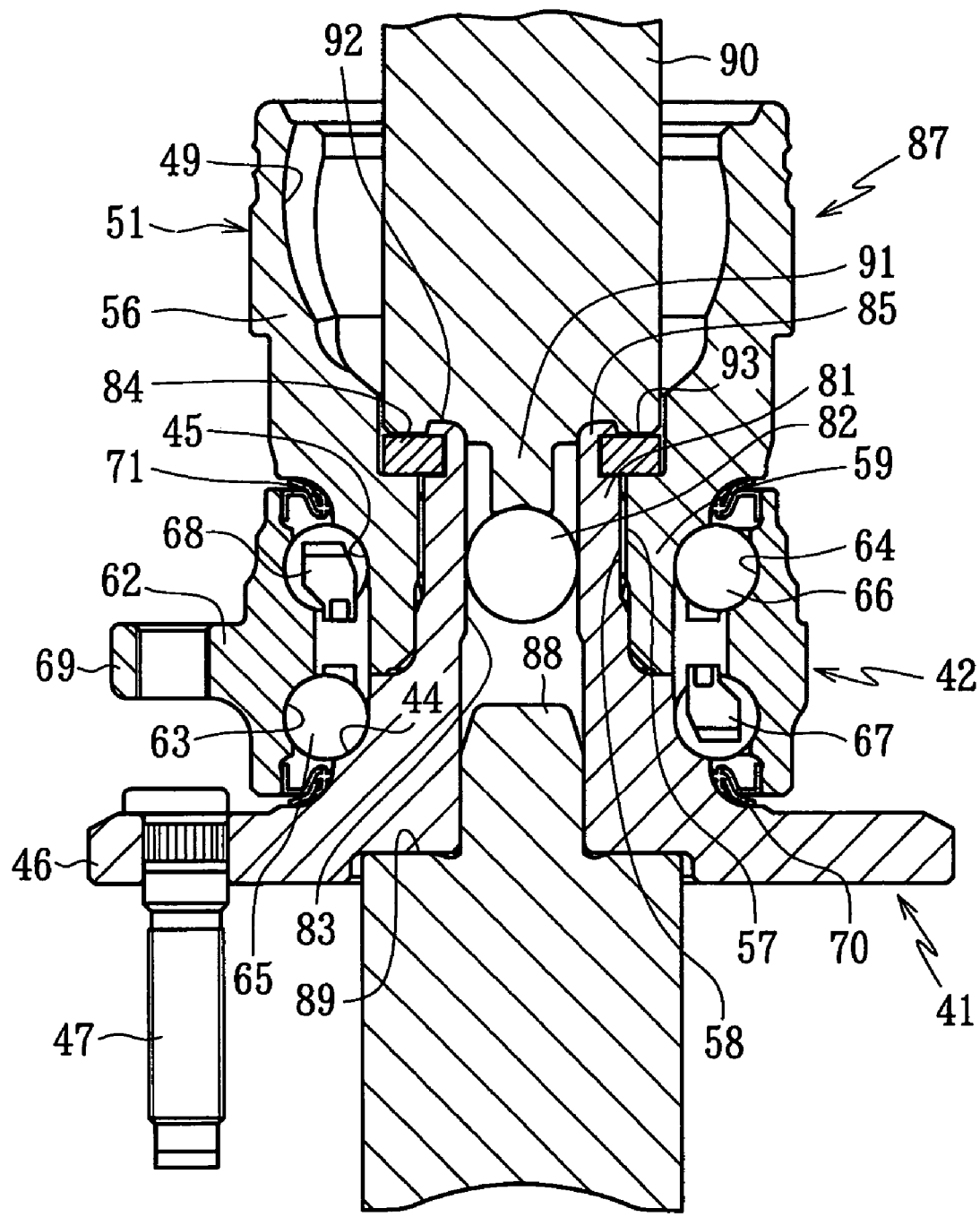
FIG. 3 is a cross sectional view showing a state after swaging is applied to the bearing device of the first embodiment.

Fixing together the hub ring 41 and the joint outer ring 51 by applying both diameter-expansion swaging and conventional swaging methods at the same time is made as shown in FIG. 2 and FIG. 3. FIG. 2 is a state before the swaging, and FIG. 3 is a state after the swaging.

As shown in FIG. 2, an assembly body 87 comprising the hub ring 41, the bearing 42 and the joint outer ring 51 is positioned on a fixedly arranged jig 86 for receiving pushing load. A projection 88 integrally formed at the tip of the jig 86 for receiving pushing load is inserted into the through hole 83 of the hub ring 41, and a peripheral portion of the through hole 83 of the hub ring 41 is placed on a receiving surface 89 provided around the projection 88. By placing the peripheral portion of the through hole 83 of the hub ring 41 on the receiving surface 89, a pressure receiving area for a swaging process is secured, and increase in the thickness of a pilot end surface found in a conventional constitution is avoided, and deformation of the wheel mounting flange is prevented.

In a state in which the quench-hardened ring 84 is put on the small-diameter portion 81 of the hub ring 41 and is placed at a bottom portion of the mouth portion 56 of the joint outer ring 51, the steel ball 82 is placed at the through-hole opening portion of the small-diameter portion 81 of the hub ring 41, and on the steel ball 82 is arranged a jig 90 for a conventional swaging method. The jig 90 for a conventional swaging method integrally has at its center tip portion a stick-out-shaped steel ball receiving portion 91, an annular concave portion 92 is provided outside the steel ball receiving portion 91, and a ring receiving portion 93 is provided outside the annular concave portion 92.

By lowering the jig 90 for a conventional swaging method, the steel ball 82 that contacts the steel ball receiving portion 91 is pressed into the through hole 83 of the hub ring 41. The steel ball 82 has an outside diameter slightly larger than an inside diameter of the through hole 83, so that the small-diameter portion 81 of the hub ring 41 is expanded from an inside diameter side toward an outside diameter side by the steel ball 82, a swaged portion produced by the diameter expansion is formed between the small-diameter portion 81 of the hub ring 41 and the knurled portion on a bore surface of the quench-hardened ring 84, and the fit condition of serrated portions 57 and 58 that has been in a loose-fit condition becomes a tight-fit condition. When the steel ball 82 is pushed into near the deepest position in the through hole 83, the ring receiving portion 93 of the jig 90 for a conventional swaging method presses the quench-hardened ring 84, and the annular concave portion 92 swages the small-diameter portion 81 of the hub ring 41.

When the hub ring 41 has sufficient rigidity against moment load, the steel ball 82 pushed inside in the diameter expansion process may be drawn outboard after the swaging. If the hub ring 41 may not have sufficient rigidity against moment load, it is so constituted that the steel ball 82 remains in the through hole 83 of the hub ring 41 after the swaging, facilitating to secure enough rigidity against moment load. As described above, the steel ball 82 functions as a reinforcing member of the hub ring 41, and it also prevents entry of water or foreign matter from outside or leakage of grease contained inside. With regard to swaging of the small-diameter portion 81 of the hub ring 41, it is difficult to secure a space for rocking die swaging, because inside space of the mouth portion 56 of the joint outer ring 51 is limited. Therefore, a conventional swaging method is suitable for the purpose described above, which allows make the swaging portion 85 smaller.

Figure 4:
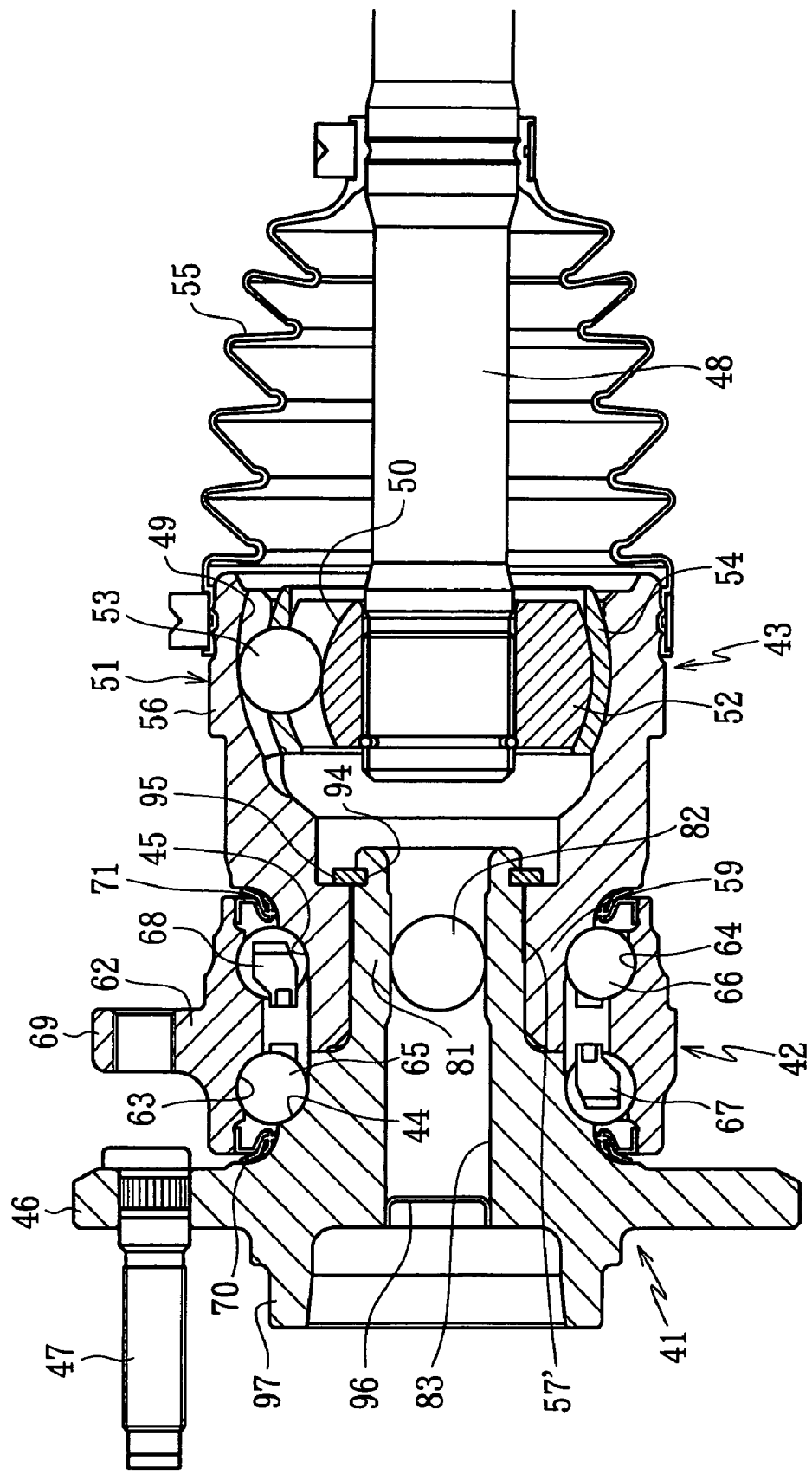
FIG. 4 is a cross sectional view showing a second embodiment of a bearing device according to the invention.

Next, FIG. 4 shows a second embodiment, a modified example of the first embodiment. In a bearing device of the second embodiment, a portion 57' with projections and depressions is formed by a process such as knurling on an outside periphery of the small-diameter portion 81 of the hub ring 41. The stem portion 59 of the joint outer ring 51 is fitted onto the small-diameter portion 81 of the hub ring 41, and the portion 57' with projections and depressions of the small-diameter portion 81 is made to bite into the stem portion 59 to be fitted them to each other, and thereby torque transmission from the joint outer ring 51 to the hub ring 41 is enabled. For both the purposes of the torque transmission and the fixing (or maintaining bearing pre-load), a constitution is provided in which the outside diameter of the small-diameter portion 81 of the hub ring 41 is directly fixed to a bore of the stem portion 59 of the joint outer ring 51 with diameter expansion swaging using the steel ball 82. The portion with projections and depressions may be formed on an inside periphery of the stem portion 59 of the joint outer ring 51.

The diameter expansion swaging using the steel ball 82 may be made in the same manner as that of the first embodiment. In an assembling process, the hub ring 41 and the joint outer ring 51 are in a loose-fit condition through the portion 57' with projections and depressions for convenience of assembling of a bearing device; however, when the assembling is completed, they are made to be a tight-fit condition by diameter expansion swaging using the steel ball 82.

An annular groove 94 is formed on an outside periphery of an end portion of the small-diameter portion 81 of the hub ring 41, and a snap ring 95 is fitted in the annular groove 94 for preventing the hub ring 41 from loosening. The snap ring 95 is not necessarily required, and it can be omitted if the fixing of the hub ring 41 and the joint outer ring 51 in an axial direction can be achieved by diameter expansion swaging using the steel ball 82 depending on the shape of a portion with projections and depressions formed on an outside periphery of the small diameter portion 81 of the hub ring 41 or an inside periphery of the joint outer ring 51. Without the snap ring 95, shortening a dimension in the axial direction is realized more easily.

At the outboard opening portion of the through hole 83 of the hub ring 41, a cap 96 made of light weight galvanized steel or resin both of which are excellent in corrosion resistance is installed for preventing entry of muddy water from outside or leakage of grease contained inside. A pilot portion 97 having a wheel guide portion and a brake guide portion is integrally formed at an outboard end portion of the hub ring 41; however, a constitution with the separate pilot member 40 (see FIG. 1) presented in the first embodiment may substitute this.

Figure 5:
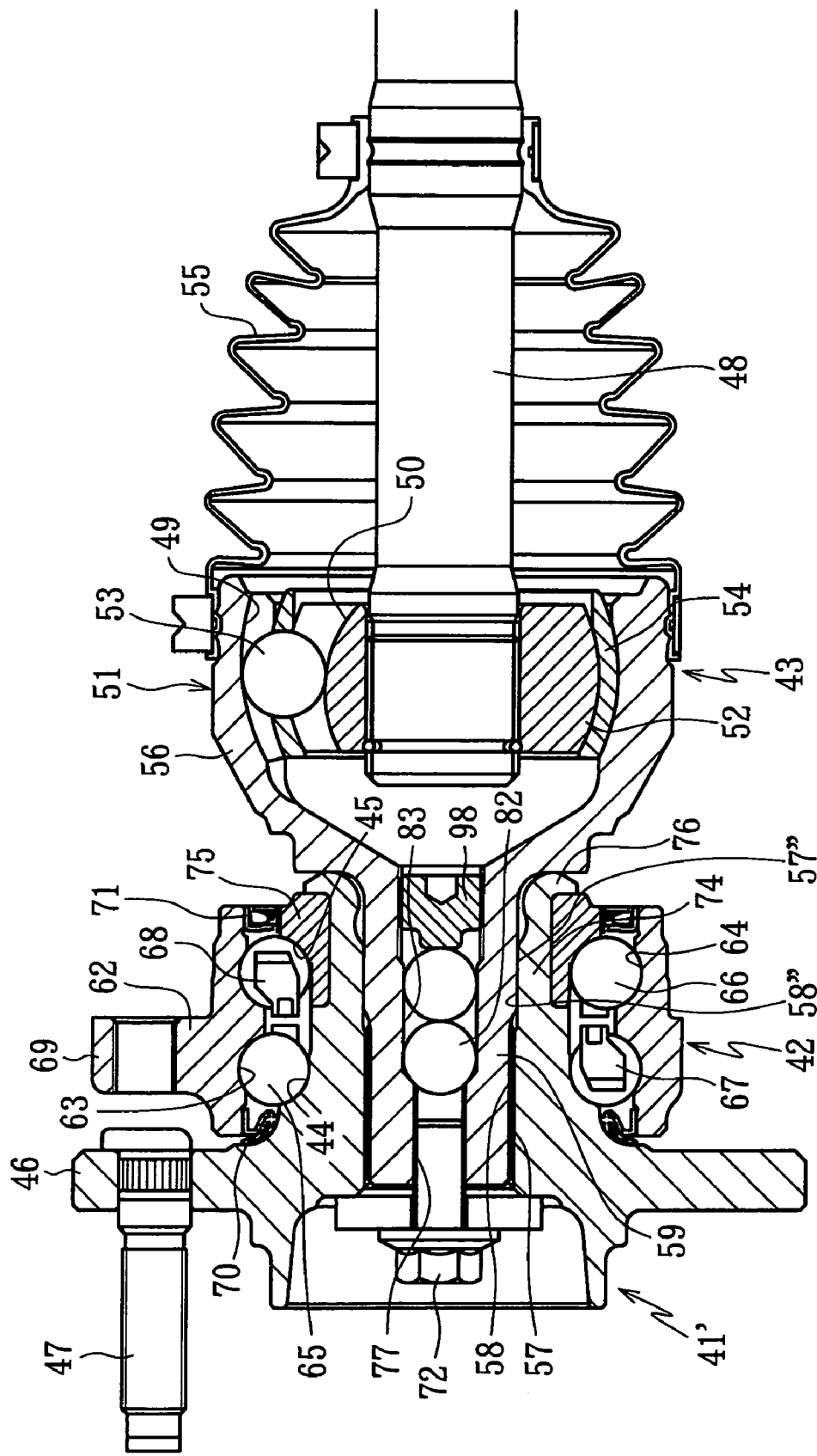
FIG. 5 is a cross sectional view showing a third embodiment of a bearing device according to the invention.

FIG. 5 shows a third embodiment in which a bearing device is of a type separable by removing a bolt. In this bearing device of a third embodiment, an inner ring 75, a separate element from a hub ring 41', is fitted onto a small-diameter portion 74 provided at the inboard side end of the hub ring 41', and an inboard inner raceway 45 is formed on an outside periphery of the inner ring 75. The inner ring 75 is pressed into position with an appropriate interference to prevent creeping from occurring. An outboard inner raceway 44 formed on an outside periphery of the hub ring 41' and the inboard inner raceway 45 formed on the outside periphery of the inner ring 75 constitute double-row inner raceways. The inner ring 75 is pressed onto the small-diameter end portion 74 of the hub ring 41', a projected end portion of the small-diameter end portion 74 of the hub ring 41' is roll-formed through plastic deformation at a roll-formed portion 76 outwardly, and the roll-formed portion 76 serves to prevent the inner ring 75 from loosening, and to apply pre-load to the bearing 42.

The joint outer ring 51 comprises the mouth portion 56 storing the joint inner ring 52, the ball 53 and the cage 54, and the stem portion 59, integrally extending in an axial direction from the mouth portion 56, with the serrated portion 57 being formed thereon. The stem portion 59 is inserted into the through hole of the hub ring 41', and by fitting them to each other with the serrated portion 57 and 58 formed respectively on an outside periphery of the stem portion 59 and on an inside periphery of the through hole, transmission of torque from the stem portion 59 to the hub ring 41' is enabled. The stem portion 59 of the joint outer ring 51 is inserted through the through hole of the hub ring 41', a bolt 72 is engaged in a threaded hole 77 formed in the stem portion 59, and thereby the joint outer ring 51 is fixed to the hub ring 41'. Because the roll-formed portion 76 of the hub ring 41' serves to prevent loosening of the inner ring 75 and apply pre-load to the bearing 42, tightening torque of the bolt 72 is set at a level that is necessary and sufficient for preventing the joint outer ring 51 from loosening from the hub ring 41'.

In this third embodiment, a hollow portion, or the through hole 83, is formed in the stem portion 59 of the joint outer ring 51, and the steel ball 82 having the outside diameter slightly larger than the inside diameter of the through hole 83 is pushed into the through hole 83 from a bottom side of the mouth portion 56. Pushing in of the steel ball 82 expands the stem portion 59 from the inside diameter side toward the outside diameter side, and this diameter expansion makes a fit condition between the serrated portion 57 and 58, which has been in a loose-fit condition, a tight-fit condition, and at the same time, pilot portions 57" and 58" formed respectively on an outside periphery of the stem portion 59 and on an inside periphery of the through hole 83 are also fitted with the diameter expansion. A plug 98 can be screwed in at an opening of a mouth portion of the through hole 83 for preventing the steel ball 82 from loosening; however, the plug 98 may not be installed for easiness of disassembling the hub ring 41' and the bearing 42 from the constant velocity universal joint 43.

The diameter expansion by using the steel ball 82 may be made in the same manner as that of the first and the second embodiments. The serrated portions 57 and 58 of the hub ring 41' and the joint outer ring 51 are in a loose-fit condition in an assembling process for convenience of assembling of a bearing device; however, when the assembling is completed they are brought to a tight-fit condition by diameter expansion using the steel ball 82. The hub ring 41' is plastically deformed in the diameter expansion swaging in the first and second embodiments, however, in the third embodiment, diameter expansion swaging is made within the range of elastic deformation of the stem portion 59. By doing so, the steel ball 82 is pushed out toward inboard side in disassembling, and the serrated portions 57 and 58 respectively of the hub ring 41' and the stem portion 59 can be returned to a loose-fit condition, making disassembly easier.

Figure 6:
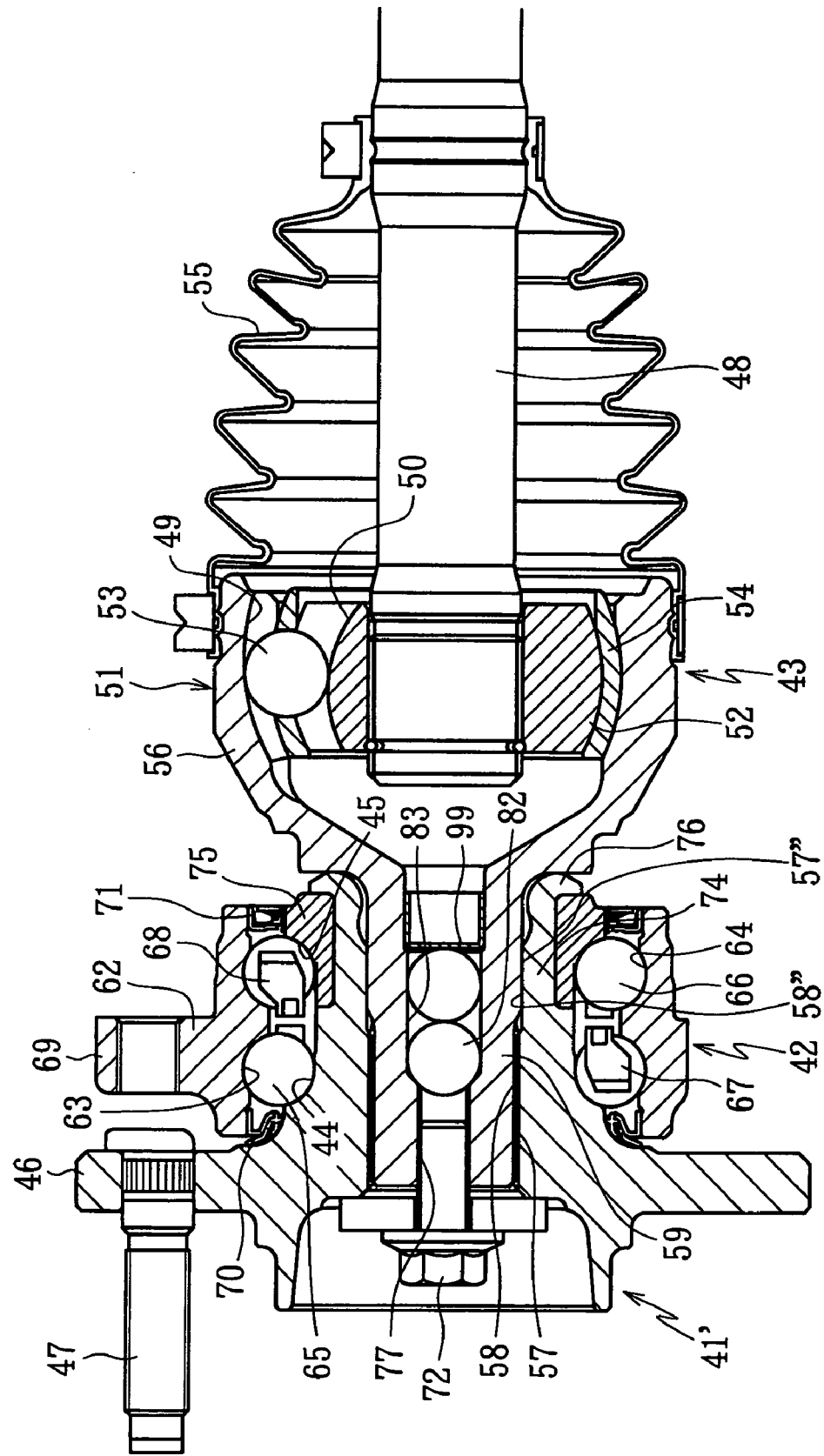
FIG. 6 is a cross sectional view showing a fourth embodiment of a bearing device according to the invention.

A bearing device of a fourth embodiment is shown in FIG. 6. The fourth embodiment differs from the third embodiment as described below. In the third embodiment, the plug 98 is screwed in at the opening of the mouth portion of the through hole 83 to prevent loosening of the steel ball 82, while in the fourth embodiment, an end cap 99 made of steel is fitted at the opening of the mouth portion of the through hole 83. With this constitution, the end cap 99 serves to prevent loosening of the steel ball 82 and leakage of grease, and disassembly is also made easier.

Figure 7:
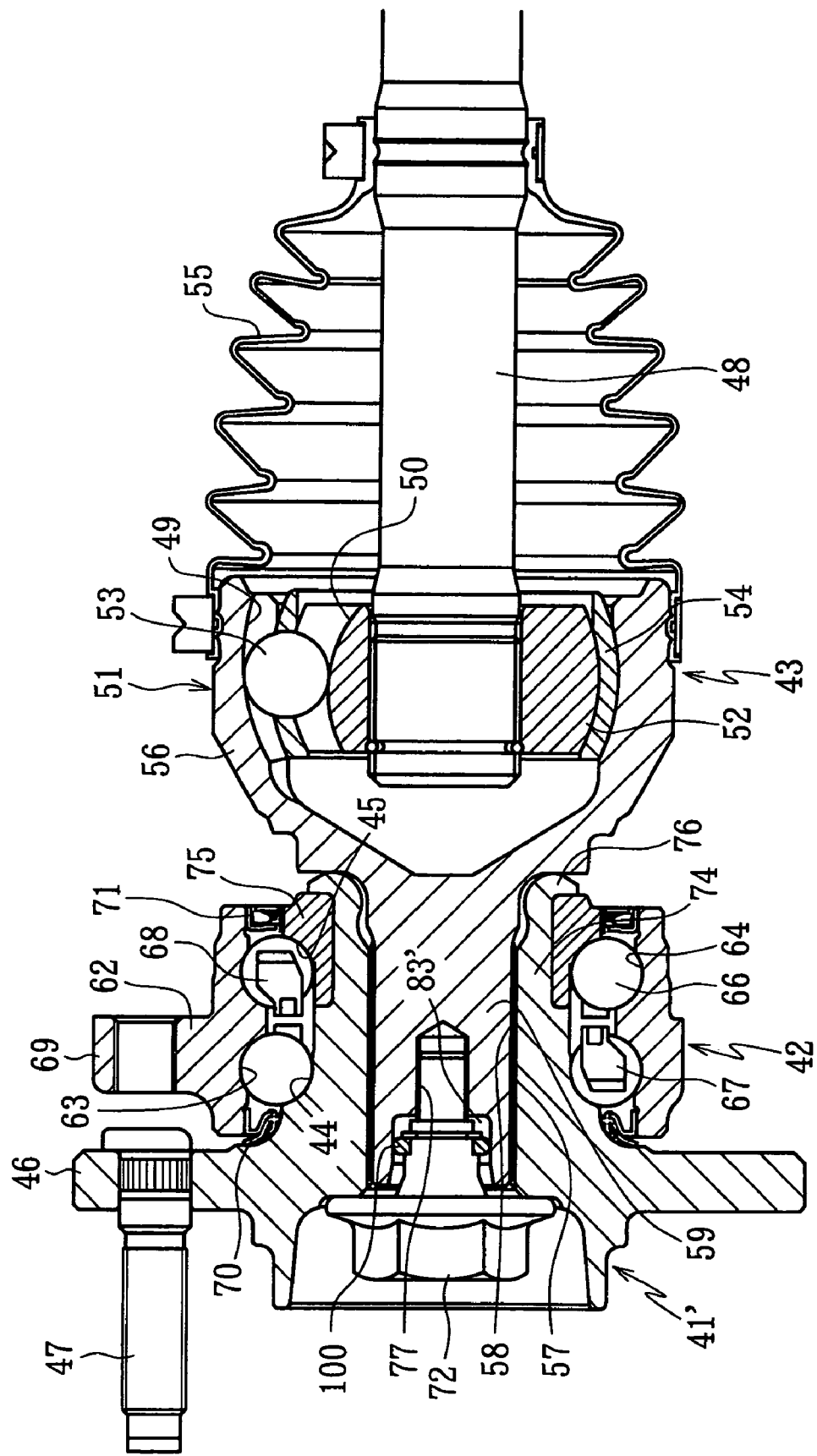
FIG. 7 is a cross sectional view showing a fifth embodiment of a bearing device according to the invention.

FIG. 7 shows a bearing device of a fifth embodiment. In the fifth embodiment, a hollow portion 83' is formed at an outboard end portion of the stem portion 59 of the joint outer ring 51, and the joint outer ring 51 is fixed to the hub ring 41' by engaging a bolt 72 into the threaded hole 77 formed at a bottom portion of the hollow portion 83'. A quench-hardened ring 100 is installed at a base portion of the bolt 72, the quench-hardened ring 100 is pushed in by tightening the bolt 72 to expand the stem portion 59 from an inside diameter side toward the outside diameter side within the range of elastic deformation, and thereby a fit condition between the serrated portions 57 and 58 that has been in a loose-fit condition is brought to a tight-fit condition by the diameter expansion swaging.

Figure 8:
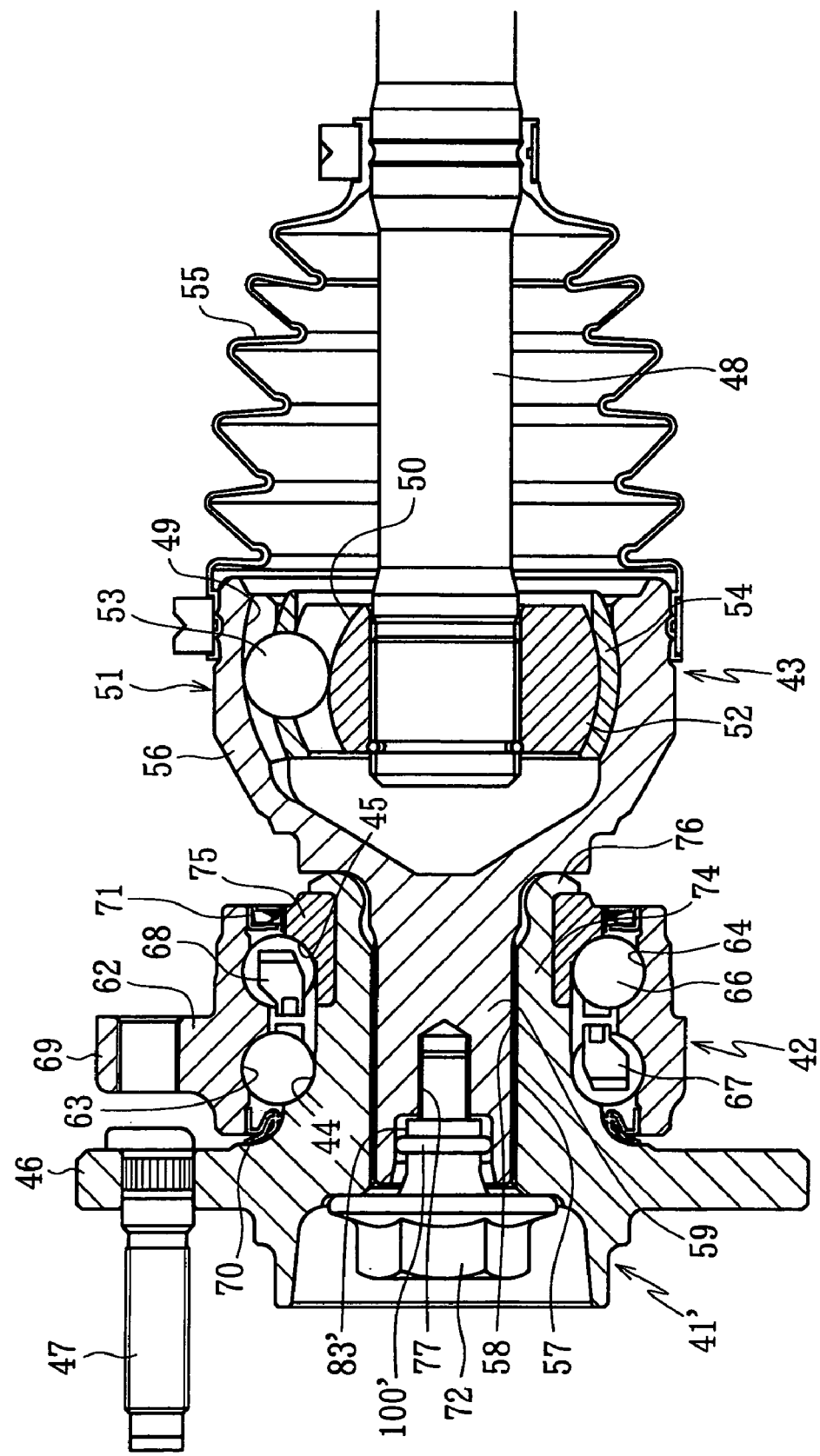
FIG. 8 is a cross sectional view showing a sixth embodiment of a bearing device according to the invention.
Figure 9:
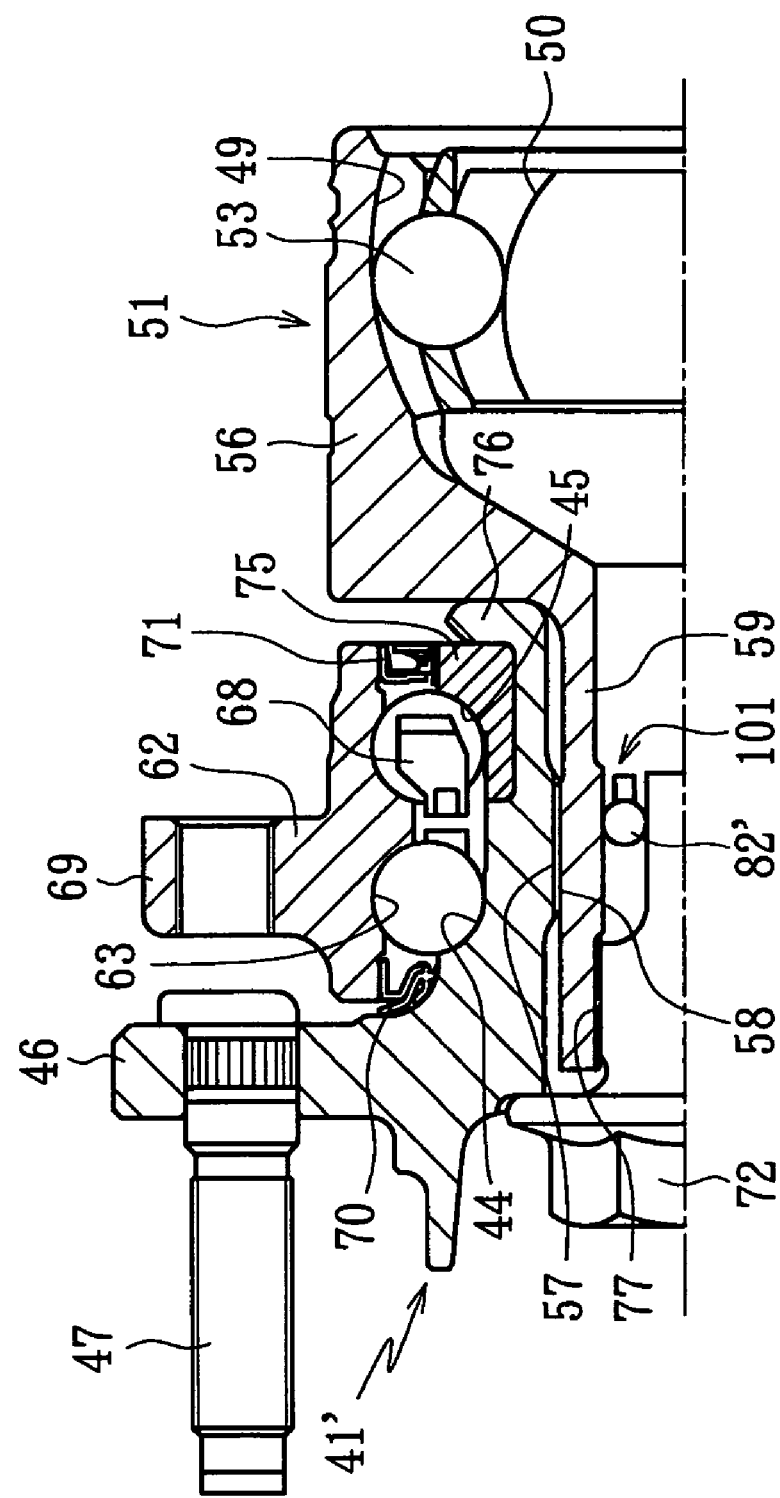
FIG. 9 is a cross sectional view showing a seventh embodiment of a bearing device according to the invention.
Figure 10:
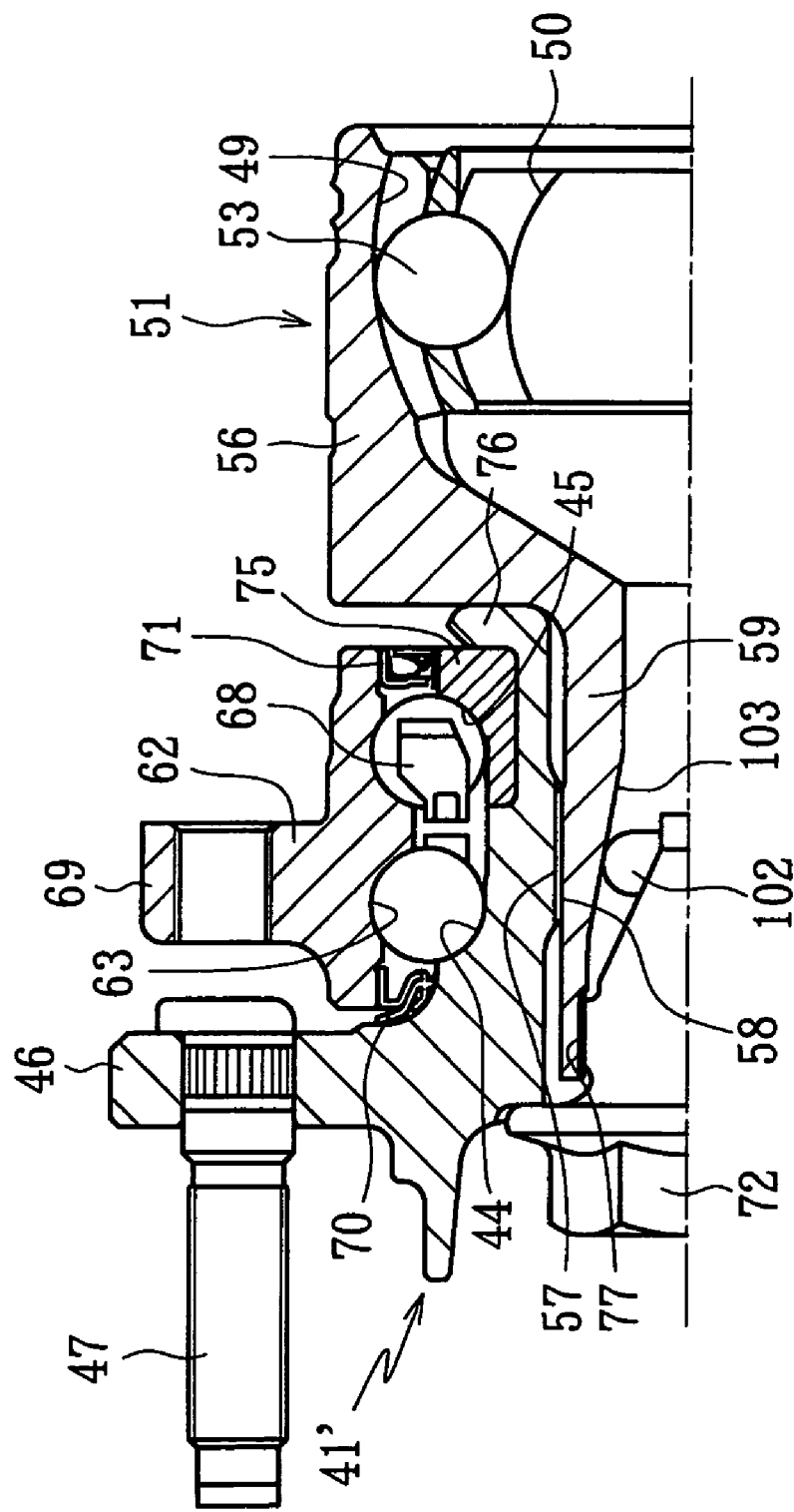
FIG. 10 is a cross sectional view showing an eighth embodiment of a bearing device according to the invention.

A ring 100' may be unitized with the bolt 72 as a sixth embodiment shown in FIG. 8. Also, it may be so constituted that a cage 101 is used instead of the ring as a seventh embodiment shown in FIG. 9, and the stem portion 59 is expanded from the inside diameter side within the range of elastic deformation toward the outside diameter side by tightening the bolt 72 to push in a plurality of steel ball 82' disposed at circumferentially equal intervals with the cage 101. Further, it may be so constituted that a ring 102 with a cross section having a circular arc is installed on the bolt 72 as shown in an eighth embodiment in FIG. 10, an inside diameter of a through hole to which the ring 102 arc contacts is made to be a tapered receiving surface 103 of which diameter shrinks from the outboard side toward the inboard side, the ring 102 arc is pushed in by tightening the bolt 72 to expand the stem portion 59 is expanded from the inside diameter side within the range of elastic deformation toward the outside diameter side.

Figure 11:
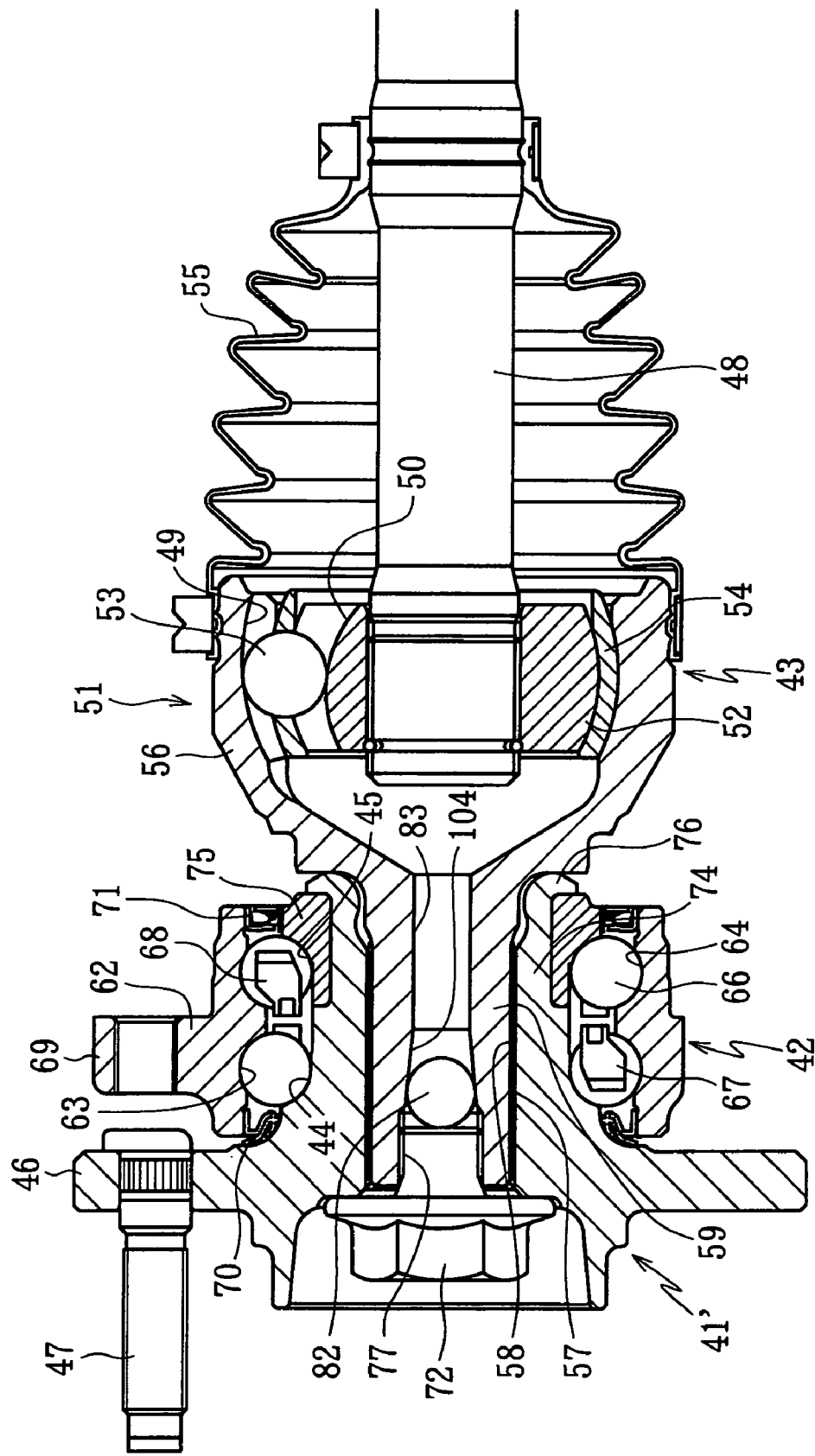
FIG. 11 is a cross sectional view showing a ninth embodiment of a bearing device according to the invention.

Next, a bearing device of a ninth embodiment is shown in the FIG. 11. In the ninth embodiment, the threaded hole 77 is formed at an outboard end portion of the through hole 83 of the stem portion 59, and a tapered portion 104 connecting through to the threaded hole 77 is formed. The tapered portion 104 has a bore of which diameter shrinks from the outboard side having a diameter substantially equal to the outside diameter of the steel ball 82 toward the inboard side having a diameter smaller than the outside diameter of the steel ball 82. By tightening the bolt 72, the steel ball 82 is pushed into the tapered portion 104 of the through hole 83 from the outboard side toward inboard side, the bore of the stem portion 59 is expanded in the range of elastic deformation toward the outside diameter side, and by this diameter expansion swaging, a fit condition between the serrated portions 57 and 58 that has been in a loose-fit condition is brought to a tight-fit condition.

Figure 12:
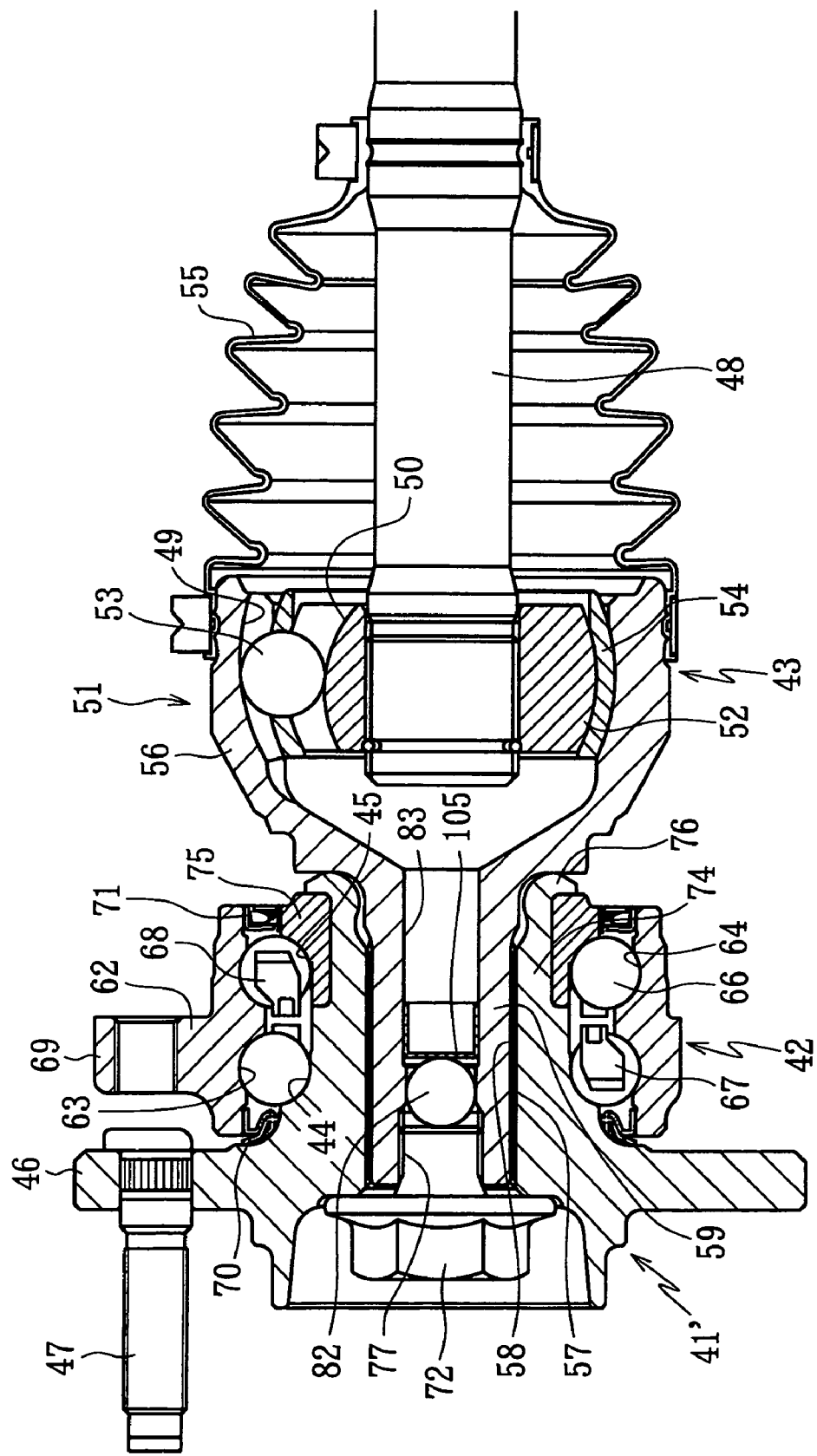
FIG. 12 is a cross sectional view showing a tenth embodiment of a bearing device according to the invention.

FIG. 12 shows a bearing device of a tenth embodiment. The tenth embodiment differs from the ninth embodiment such that described below. Instead of providing a tapered bore portion connected through to the threaded hole 77 in the through hole 83 of the stem portion 59, a straight bore portion having a diameter slightly smaller than the outside diameter of the steel ball 82 is provided in the through hole 83, and an end cap 105 that serves to prevent loosening of the steel ball 82 and leakage of grease is installed. In the tenth embodiment, by pushing out the steel ball together with end cap 105 in disassembling, the serrated portion 57 and 58 of the hub ring 41' and the stem portion 59 are allowed to return to a loose-fit condition, so that the disassembly is carried out easier.

Figure 13:
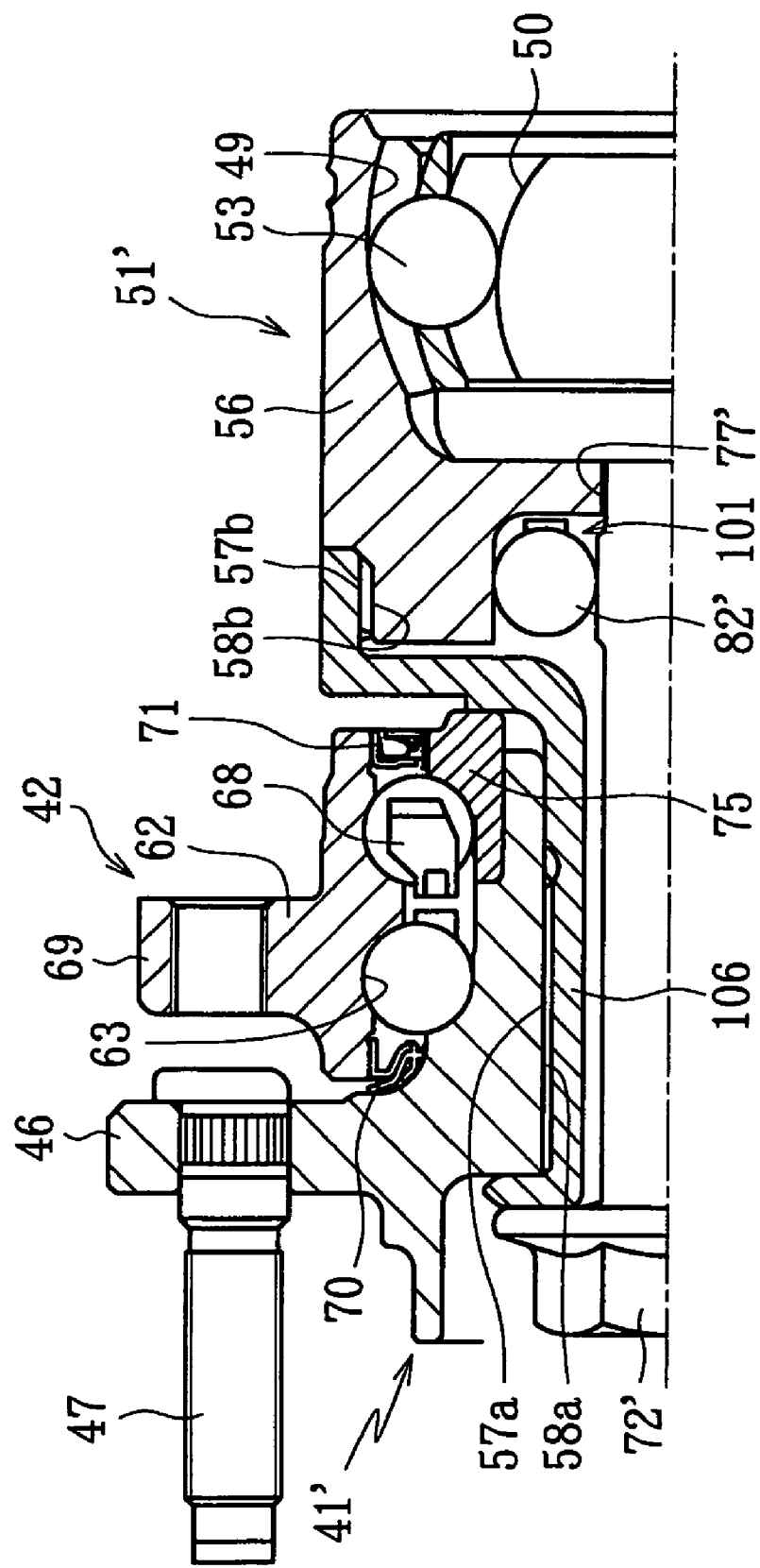
FIG. 13 is a cross sectional view showing an eleventh embodiment of a bearing device according to the invention.

FIG. 13 shows a bearing device of an eleventh embodiment. In the eleventh embodiment, a tubular member 106 for applying pre-load to the bearing 42 is fitted to the hub ring 41' through serrated portions 57a and 58a and is swaged to be fixed in position by plastically deforming an outboard end portion of the hub ring 41'. A serrated portion 57b is formed on an outside periphery of the outboard end portion of a joint outer ring 51', a serrated portion 58b is formed on a bore surface of an large-diameter inboard end portion of the tubular member 106, and by fitting the joint outer ring 51' and the tubular member 106 to each other through the serrated portions 57b and 58b, transmission of torque from the joint outer ring 51' to the hub ring 41' is enabled. A bolt 72' inserted through the tubular member 106 is engaged with the joint outer ring 51' at a threaded hole 77' and the cage 101 is stored in an annular space formed between the inboard end portion of the bolt 72' and the joint outer ring 51'.

In the eleventh embodiment, the hub ring 41' and the joint outer ring 51' are joined and unitized together by tightening the bolt 72' via the tubular member 106, and the joint outer ring 51' is, through the tightening of the bolt 72', expanded from the inside diameter side toward the outside diameter side in the range of elastic deformation by pressing and securing in position a plurality of the steel ball 82' disposed at circumferentially equal intervals by the cage. Thus, a fit condition between the serrated portions 57b and 58b that has been in a loose-fit condition is made to be a tight-fit condition. In disassembling, the steel balls 82' in the cage 101 is released from the pressed-in state by removing the bolt 72', the fit condition of the serrated portions 57b and 58b of the joint outer ring 51' and the tubular member 106 can be returned to a loose-fit condition.

Figure 14:
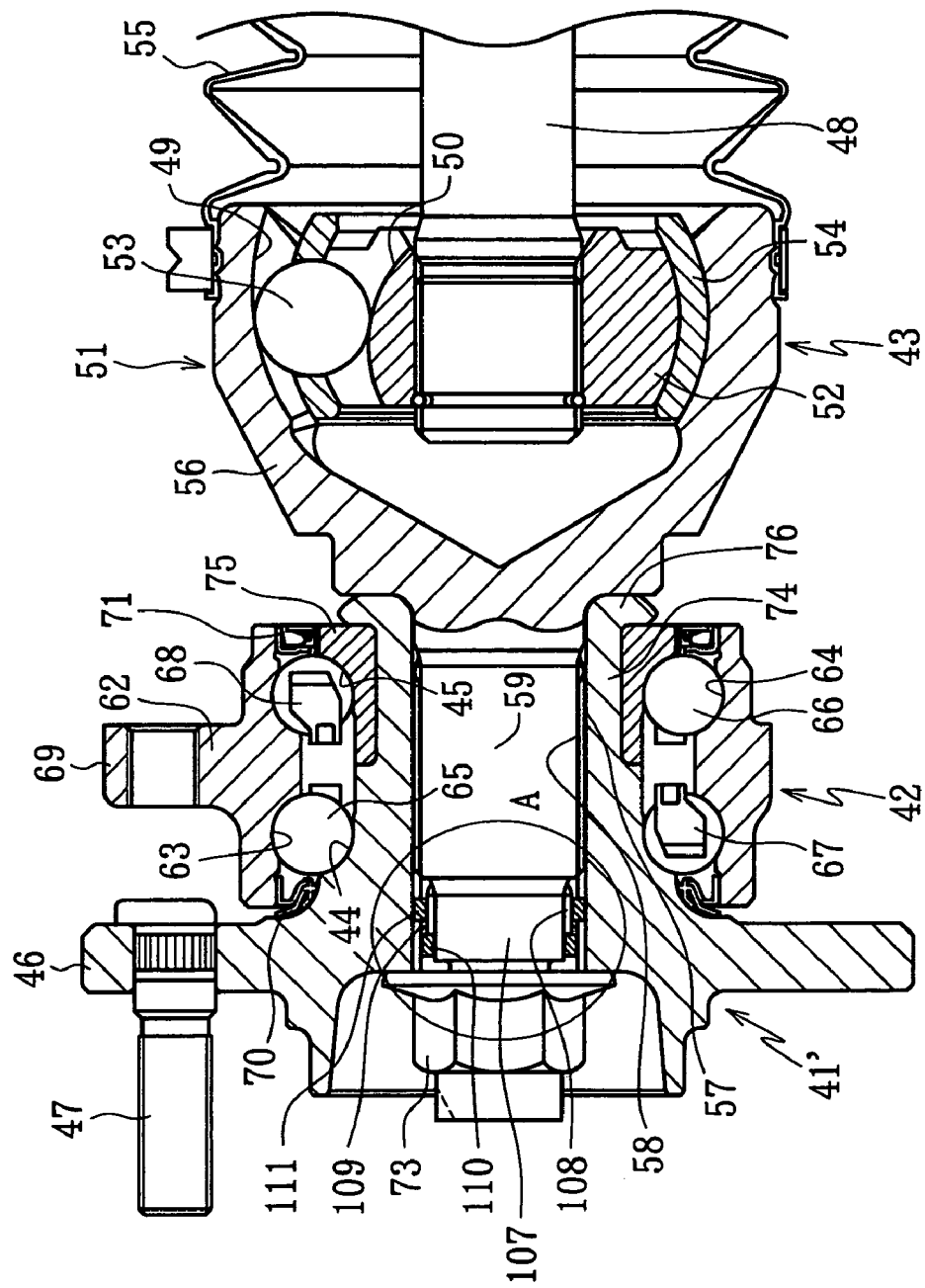
FIG. 14 is a cross sectional view showing a twelfth embodiment of a bearing device according to the invention.
Figure 15:
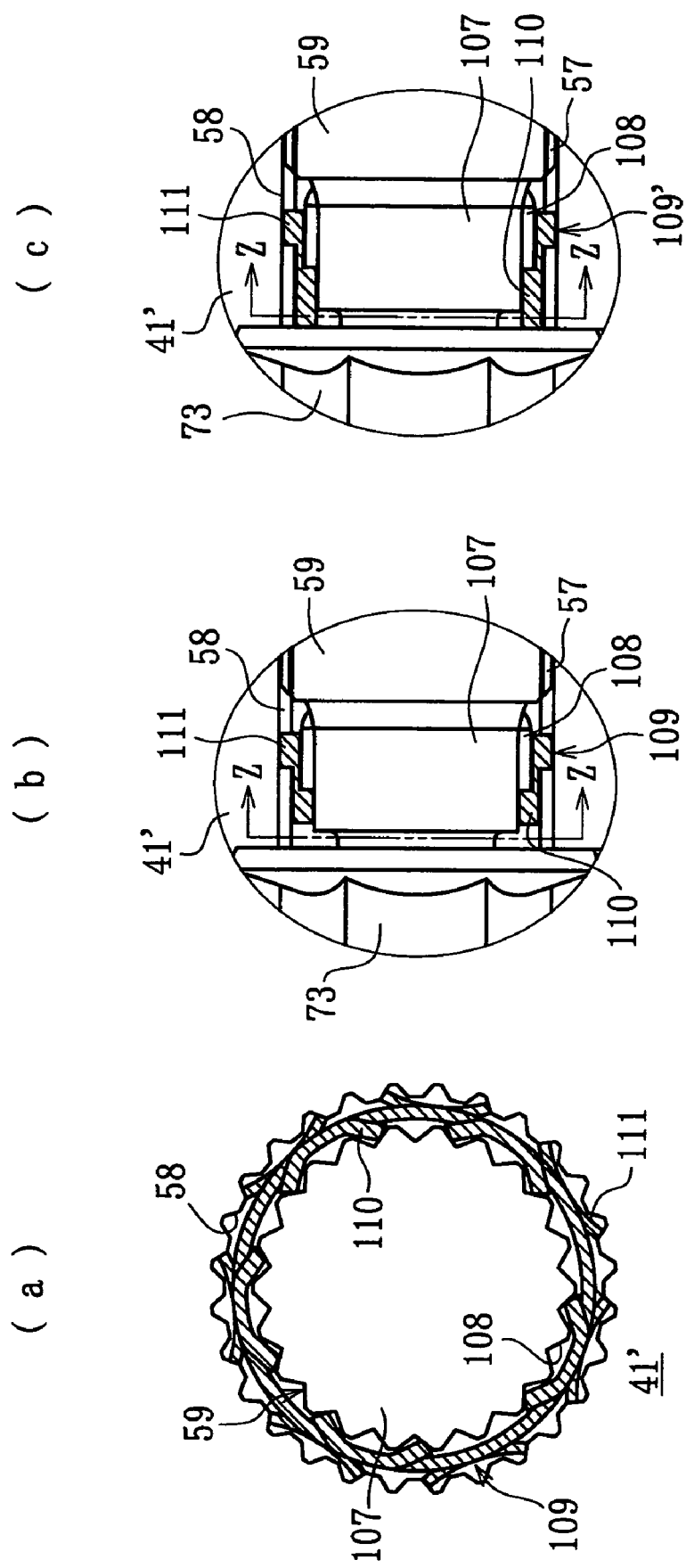
FIG. 15(*a*) is a view seen from Z—Z line of FIGS. 15(*b*) and 15(*c*), FIG. 15(*b*) is an enlarged cross sectional view of portion A showing a ring member in FIG. 14, and FIG. 15(*c*) is an enlarged cross sectional view of portion A showing a ring member in a thirteenth embodiment, an alternative example of the twelfth embodiment in FIG. 14.

Next, FIG. 14 is a twelfth embodiment showing a bearing device, a type separable by removing a nut. In the twelfth embodiment, a small-diameter portion 107 has a diameter smaller than that of a part on which the serrated portion 57 fitting to the serrated portion 58 of the hub ring 41' is formed. The small-diameter portion 107 is integrally provided on the stem portion 59 of the joint outer ring 51, a portion with projections and depressions, or a serrated portion 108, for example, is formed on the outside periphery of the small-diameter portion 107, and as shown in FIGS. 15(a) and 15(b), a ring member 109 made of steel is installed between the serrated portion 108 on the small-diameter portion 107 and the serrated portion 58 on the hub ring 41'. The ring member 109 is such that a plurality of tongue pieces 110 having a shape curved toward the inside diameter side are arranged at the outboard side thereof at circumferentially equal intervals, and a plurality of tongue pieces 111 having a shape curved toward the outside diameter side are disposed at the inboard side thereof at circumferentially equal intervals. The ring member 109 is quench-hardened.

By pressing the ring member 109 into between the serrated portion 108 on the small-diameter portion 107 of the stem portion 59 and the serrated portion 58 on the hub ring 41', the tongue pieces 110 and 111 are engaged and coupled with both the serrated portions 108 and 58, thereby play between the serrations 57 and 58 respectively of the stem portion 59 and the hub ring 41' is prevented. As a thirteenth embodiment shown in FIG. 15(c), when the ring member 109' is made in a shape so that its outboard side is extended in an axial direction to contact with an end surface of the nut 73, the end surface of the nut 73 can press the ring member 109' into the inboard side when the nut 73 is tightened, which facilitates the pressing of the ring member 109' into between the serrated portion 108 on the small-diameter portion 107 of the stem portion 59 and the serrated portion 58 on the hub ring 41'.

Figure 16:
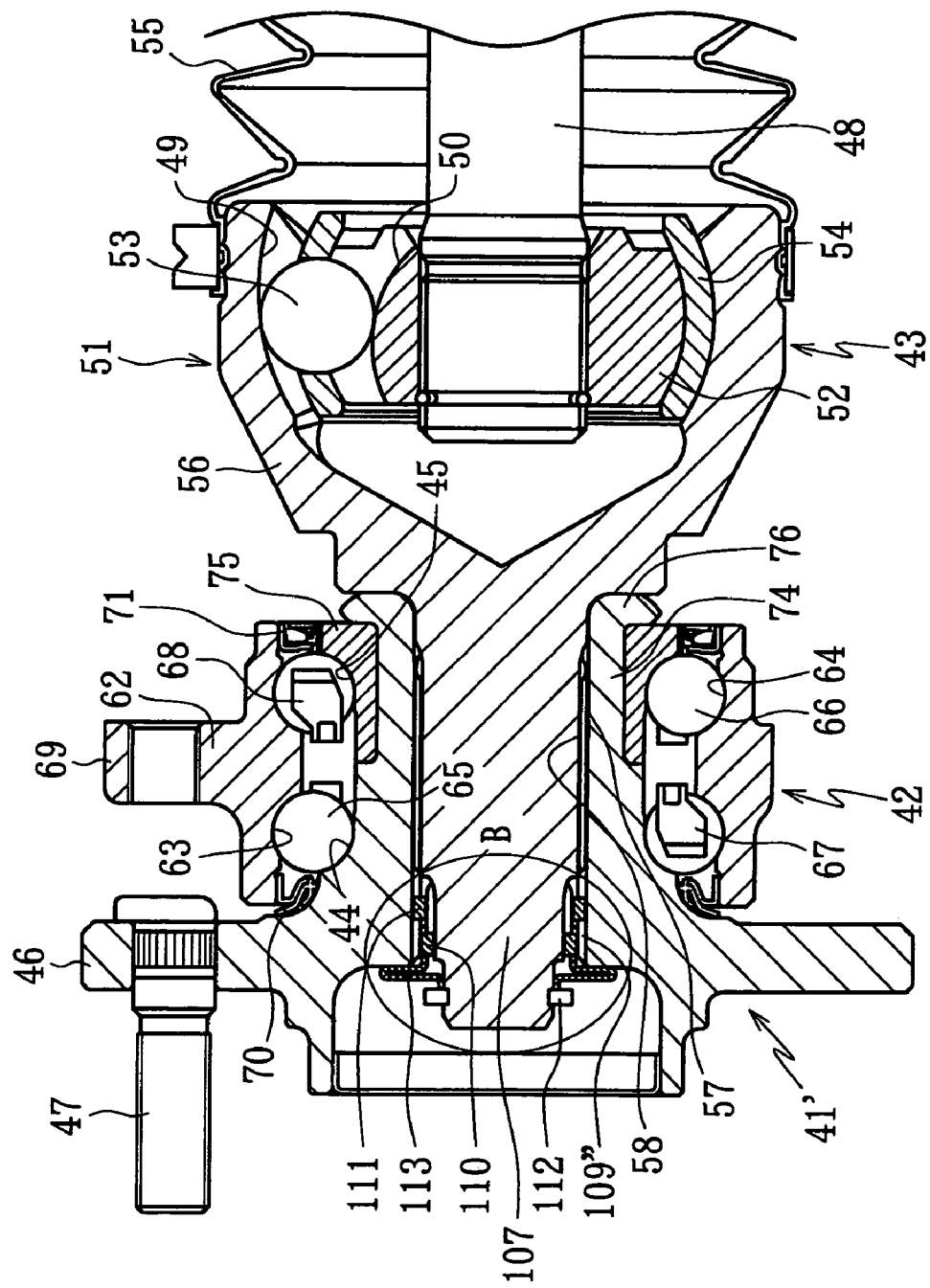
FIG. 16 is a cross sectional view showing a fourteenth embodiment of a bearing device according to the invention.
Figure 17:
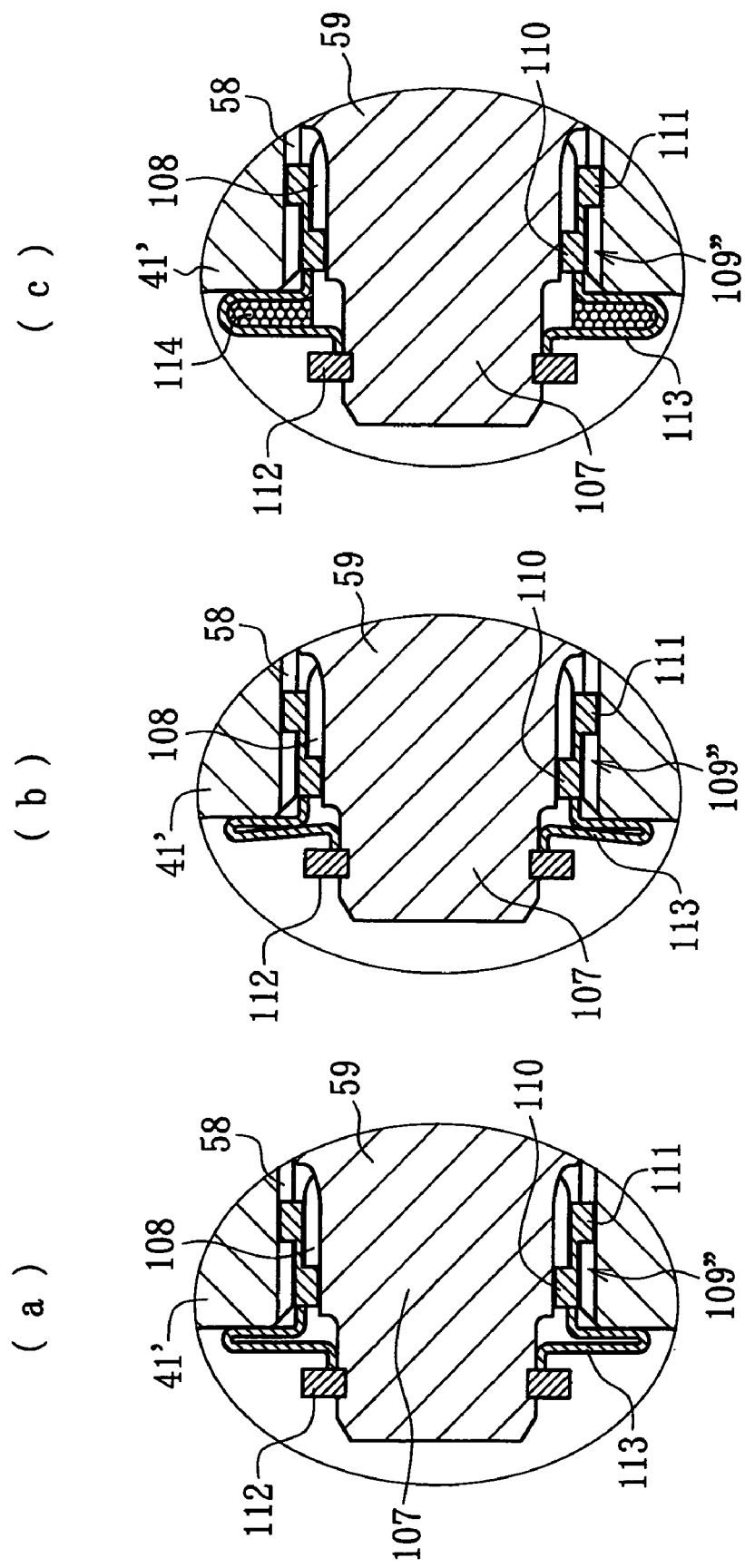
FIG. 17(*a*) is an enlarged cross sectional view of portion B showing a ring member in FIG. 16, FIG. 17(*b*) is an enlarged cross sectional view of portion B showing a ring member in a fifteenth embodiment that is an alternative example of the fourteenth embodiment, and FIG. 17(*c*) is an enlarged cross sectional view of portion B showing a ring member in a sixteenth embodiment that is an alternative example of the fourteenth embodiment.
Figure 18:
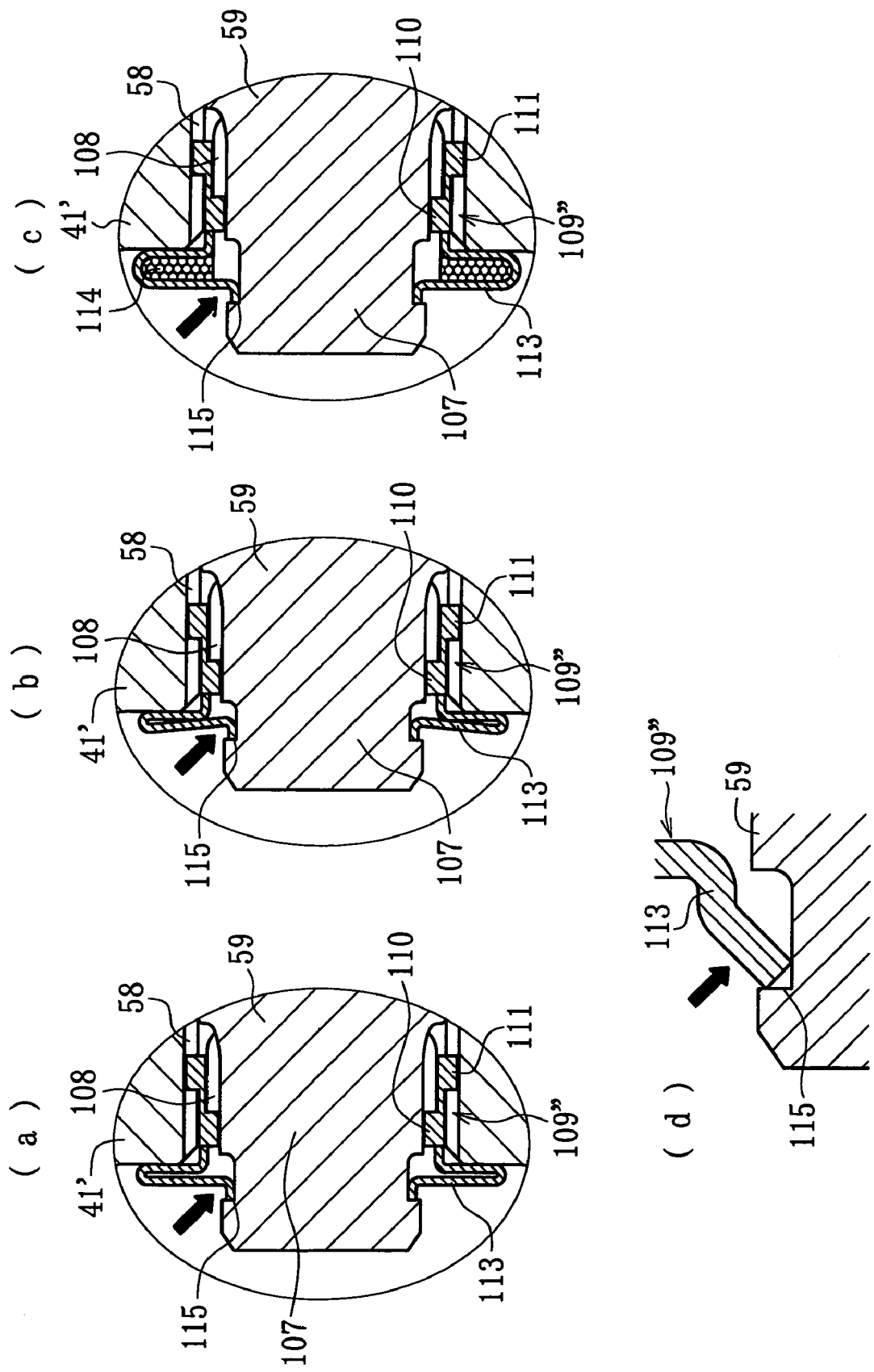
FIG. 18(*a*) is an enlarged cross sectional view of an essential portion showing a ring member in a seventeenth embodiment that corresponds to the fourteenth embodiment.

FIG. 16 and FIG. 17(a) show a fourteenth embodiment, a modified example of the twelfth and thirteenth embodiments. In the thirteenth embodiment, the ring member 109' is pressed and fixed by tightening the nut 73, while in a bearing device of the fourteenth embodiment, the ring member 109" is pressed and fixed by a circlip 112 installed on the axial end of the stem portion 59 of the joint outer ring 51. A curved press-down portion 113 is integrally and extendedly provided at an outboard end portion of the ring member 109", and the ring member 109" is pressed into position through the press-down portion 113 when the circlip 112 is installed.

Also, as a fifteenth embodiment shown in FIG. 17(b), when, in installing the circlip 112, the press-down portion 113 of the ring member 109" is compressed in an axial direction and fixed in position in an elastically deformed state, movement of the stem portion 59 of the joint outer ring 51 in an axial direction can be prevented. Further, in a constitution in which an elastic member 114 such as a rubber is stored and held in the press-down portion 113 of the ring member 109" as a sixteenth embodiment shown in FIG. 17(c), the press-down portion 113 of the ring member 109" is compressed in an axial direction and fixed in position in an elastically deformed state in the same manner as in the fifteenth embodiment, and thus the elastic member 114 makes the installation of the circlip easier.

In the embodiments from the fourteenth to sixteenth, the ring member 109" is fixed by the circlip 112 considering convenience for disassembling; however, as shown by the embodiments from seventeenth to nineteenth in FIGS. 18(a)–18(c), it may also be so constituted that, a groove 115 with sharp bottom corners is formed on an outside periphery of the stem portion 59 instead of using the circlip 112, and an end portion of the press-down portion 113 of the ring member 109" is engaged and coupled with the groove 115 with sharp bottom corners.

Each of the embodiments from the seventeenth to the nineteenth shown in FIGS. 18(a) to 18(c) corresponds to each of the embodiments from the fourteenth to the sixteenth shown in FIGS. 17(a) to 17(c). As shown in a twentieth embodiment in FIG. 18(d), the constitution may also be such that an end portion of the press-down portion 113 of the ring member 109" is of a shape that inclines toward its axis so that it can be engaged and coupled with the groove 115 with sharp bottom corners on the stem portion 59. Also, by providing slits at parts indicated by arrows in FIGS. 18(a) to 18(c), the press-down portion 113 on the ring member 109" is more easily engaged and coupled with the groove 115 having sharp bottom corners on the stem portion 59, and thereby workability in installing the ring member 109" is improved.

Figure 19:
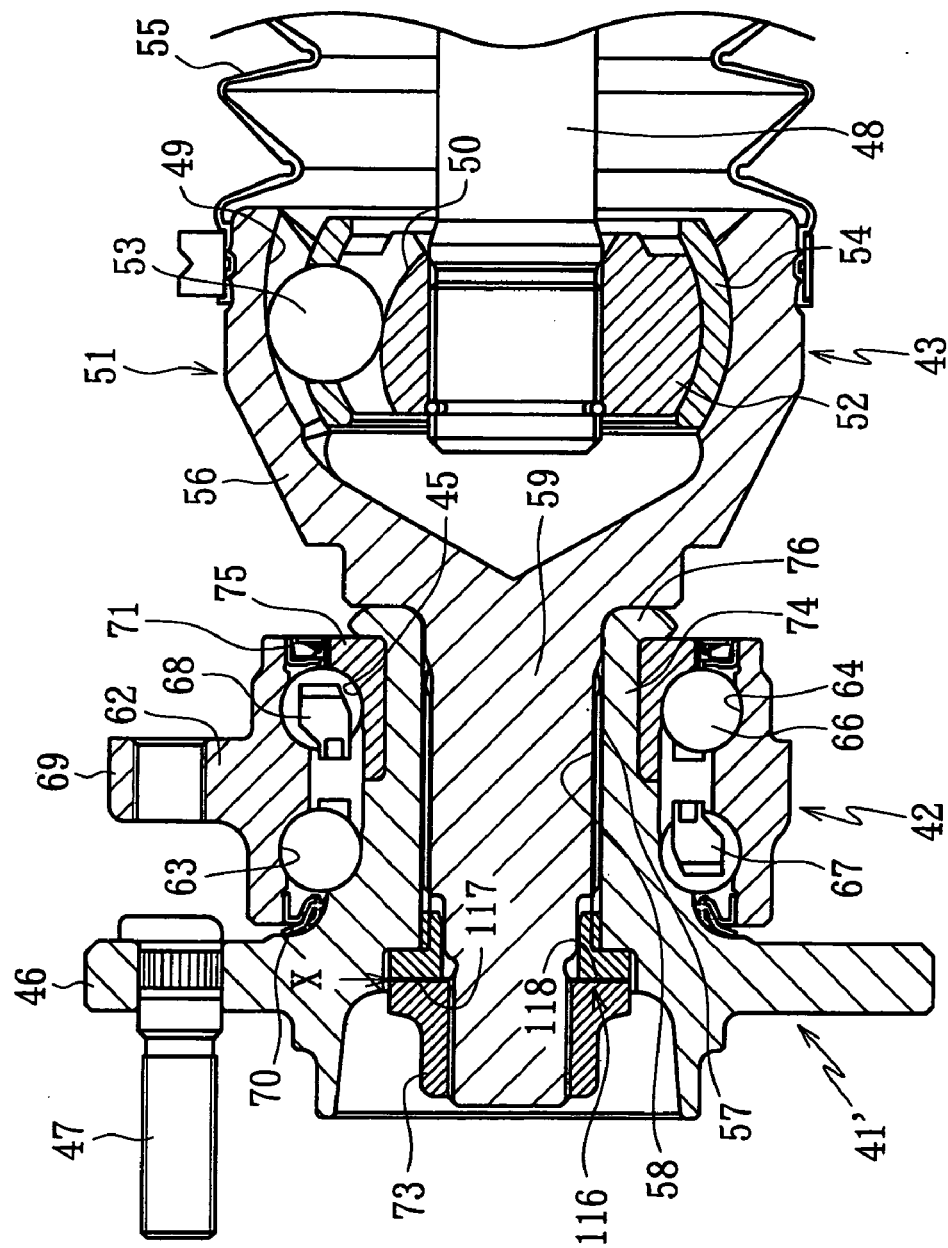
FIG. 19 is a cross sectional view showing a twenty-first embodiment of a bearing device according to the invention.
Figure 20:
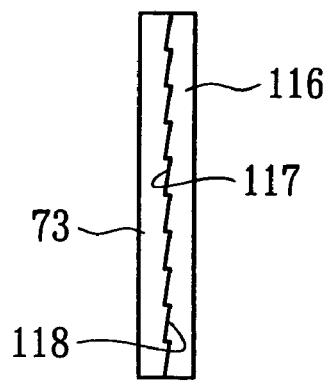
FIG. 20 shows view X depicting the contact surfaces of the ring member and nut in FIG. 19.
Figure 21:
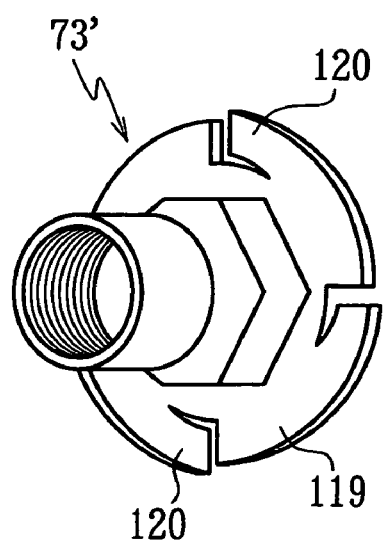
FIG. 21(a) is a perspective view of a nut in a twenty-second embodiment of a bearing device according to the invention.
FIG. 21(b) is a front view of the nut in FIG. 21(a)
Figure 21:
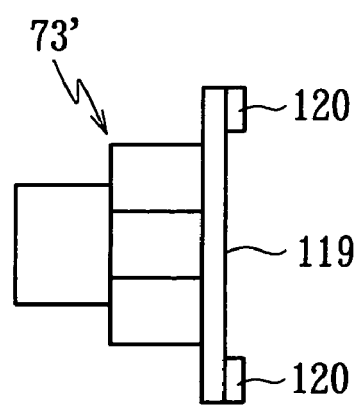

FIG. 19 is a twenty-first embodiment of a bearing device. In the twenty-first embodiment, as shown in FIG. 20, fine teeth 117 and 118 that lock the nut 73 against a loosening direction are formed on an outboard end surface of a ring member 116 press-fitted in advance into the through hole of the hub ring 41' and on the end surface of the nut 73 that engages with the stem portion 59.

In the twenty-first embodiment, play between the serrated portions 57 and 58, respectively of the stem portion 59 and the hub ring 41', can be prevented by tightening the nut 73 through the ring member 116, and at the same time, the teeth 117 and 118 biting each other between the nut 73 and the ring member 116 also realizes prevention for loosening the nut 73. The ring member 116 may be either of sintered material or steel. Also, it may be constituted in such a way that, as shown in a twenty-second embodiment in FIGS. 21(a) and 21(b), a nut 73' is of steel, brim portions 120 raised toward the ring-plate side are formed on a seat surface 119 of the nut 73', and the brim portions 120 are engaged and coupled with the teeth 117 of the ring member 116.

Figure 22:
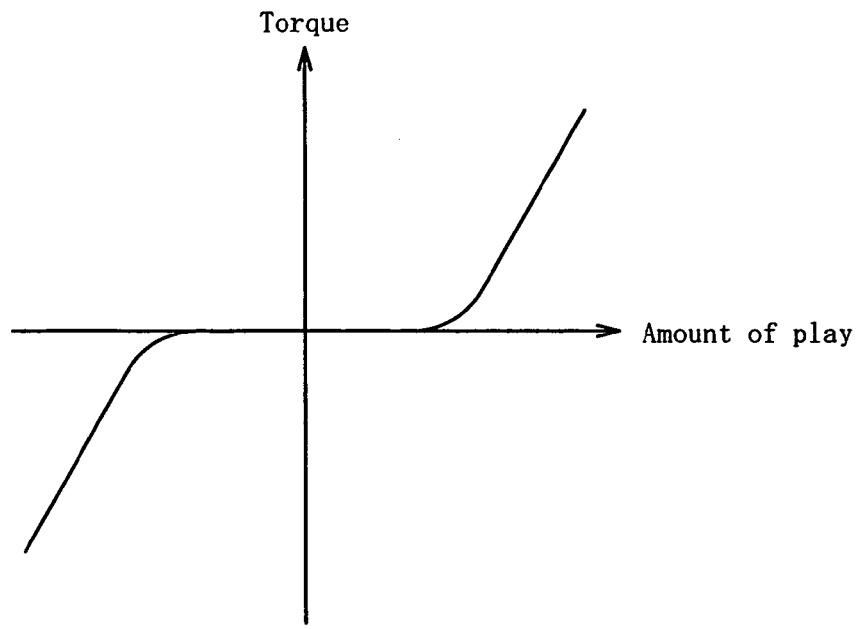
FIG. 22 is a characteristics diagram of a conventional bearing device, showing the relationship between tightening torque of a bolt or nut and play at a serrated portion.
Figure 23:
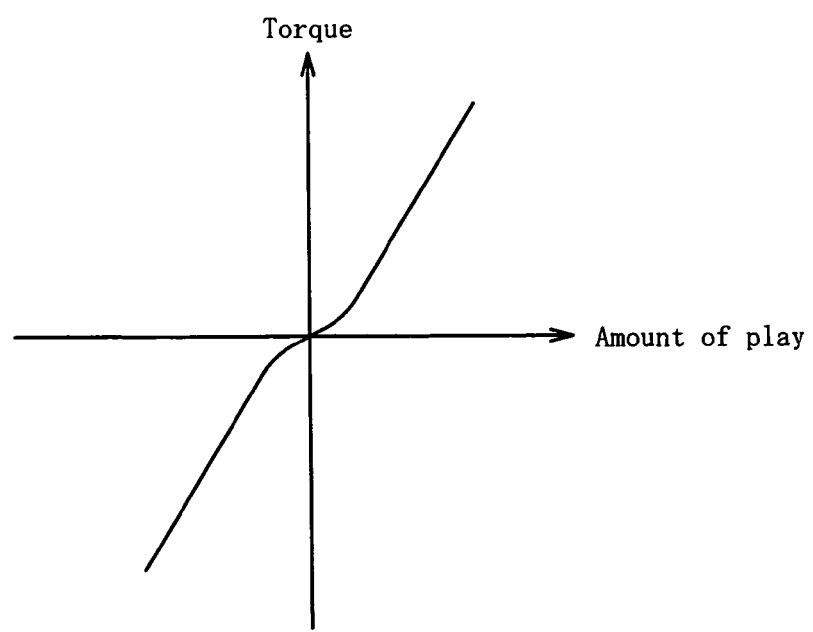
FIG. 23 is a characteristics diagram of a bearing device according to the invention showing the relationship between tightening torque of a bolt or nut and play at a serrated portion.

With regard to play between the serrated portions 57 and 58 of the stem portion 59 and the hub ring 41' with respect to tightening torque applied either by a bolt or a nut, FIG. 22 shows characteristics of a conventional constitution and FIG. 23 shows those of a constitution according to the invention. Comparing both characteristics, it is obviously understood that, in a constitution according to the invention, play between the serrated portions 57 and 58 of the stem portion 59 and the hub ring 41' is more controlled in a constitution of the invention than a conventional constitution.

In a bearing device of a separable type in which the hub ring 41' and the bearing 42 are unitized and the constant velocity universal joint 43 is fixed to the hub ring 41' with a nut, the inboard end portion of the hub ring 41' is roll-formed as described above, and the roll-formed portion 76 prevents loosening of the inner ring 75 and applies pre-load to the bearing 42, in which the center position of the constant velocity universal joint 43 is shifted toward the inboard side by the amount of thickness dimension of the roll-formed portion 76. That is, in a font-wheel-drive front-wheel-steer vehicle, aligning the center position of the constant velocity universal joint 43 and the center position of a kingpin becomes difficult, which spoils freedom in design.

Figure 24:
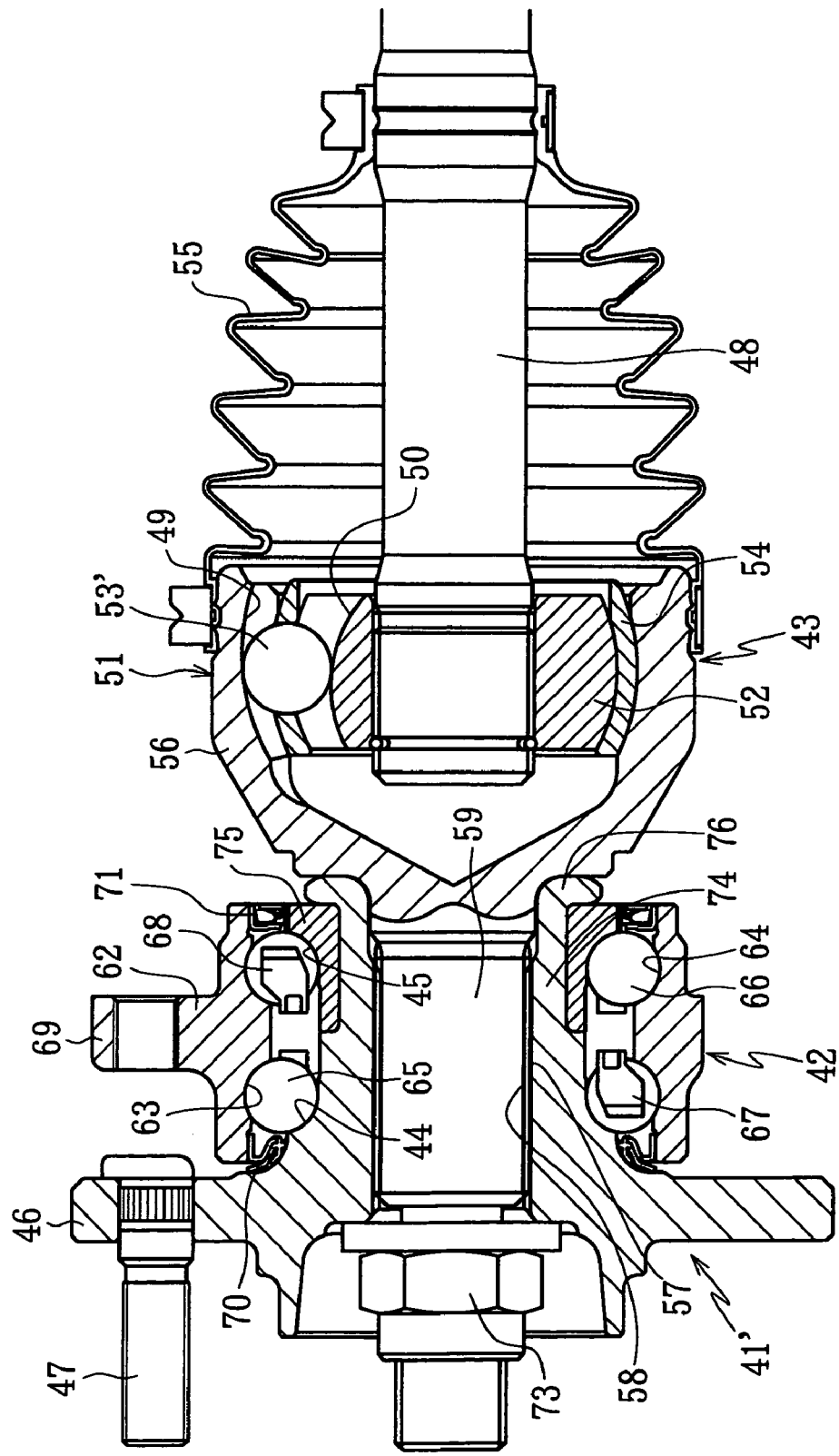
FIG. 24 is a cross sectional view showing a twenty-third embodiment of a bearing device according to the invention.

A bearing device of a twenty-third embodiment shown in FIG. 24 presents means to minimize the shift of the center position of the constant velocity universal joint 43 caused by the roll-formed portion 76 of the hub ring 41'. The number of torque transmission balls installed between the joint outer ring and joint inner ring of a constant velocity universal joint is generally six, while in the twenty-third embodiment, eight pieces of the torque transmission balls are installed between the joint outer ring 51 and joint inner ring 52 of the constant velocity universal joint 43. Using eight pieces of torque transmission balls 53' allows to make the outside diameter of each torque transmission ball 53' smaller, and the dimension of the constant velocity universal joint 43 in an axial direction can be shortened by the reduced diameter dimension, so that the shift of the center position of the constant velocity universal joint 43 can be minimized.

Figure 25:
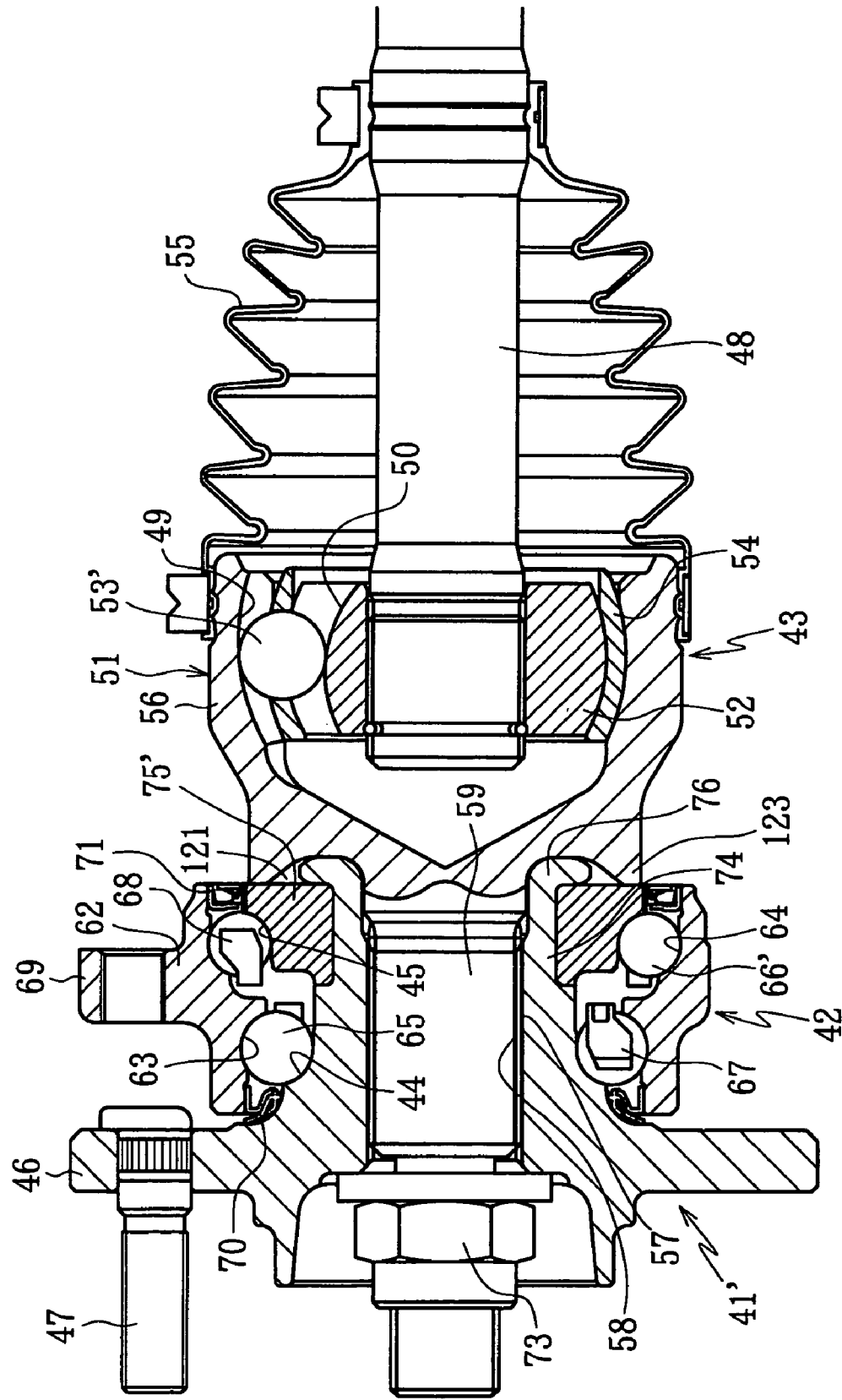
FIG. 25 is a cross sectional view showing a twenty-fourth embodiment of a bearing device according to the invention.
Figure 26:
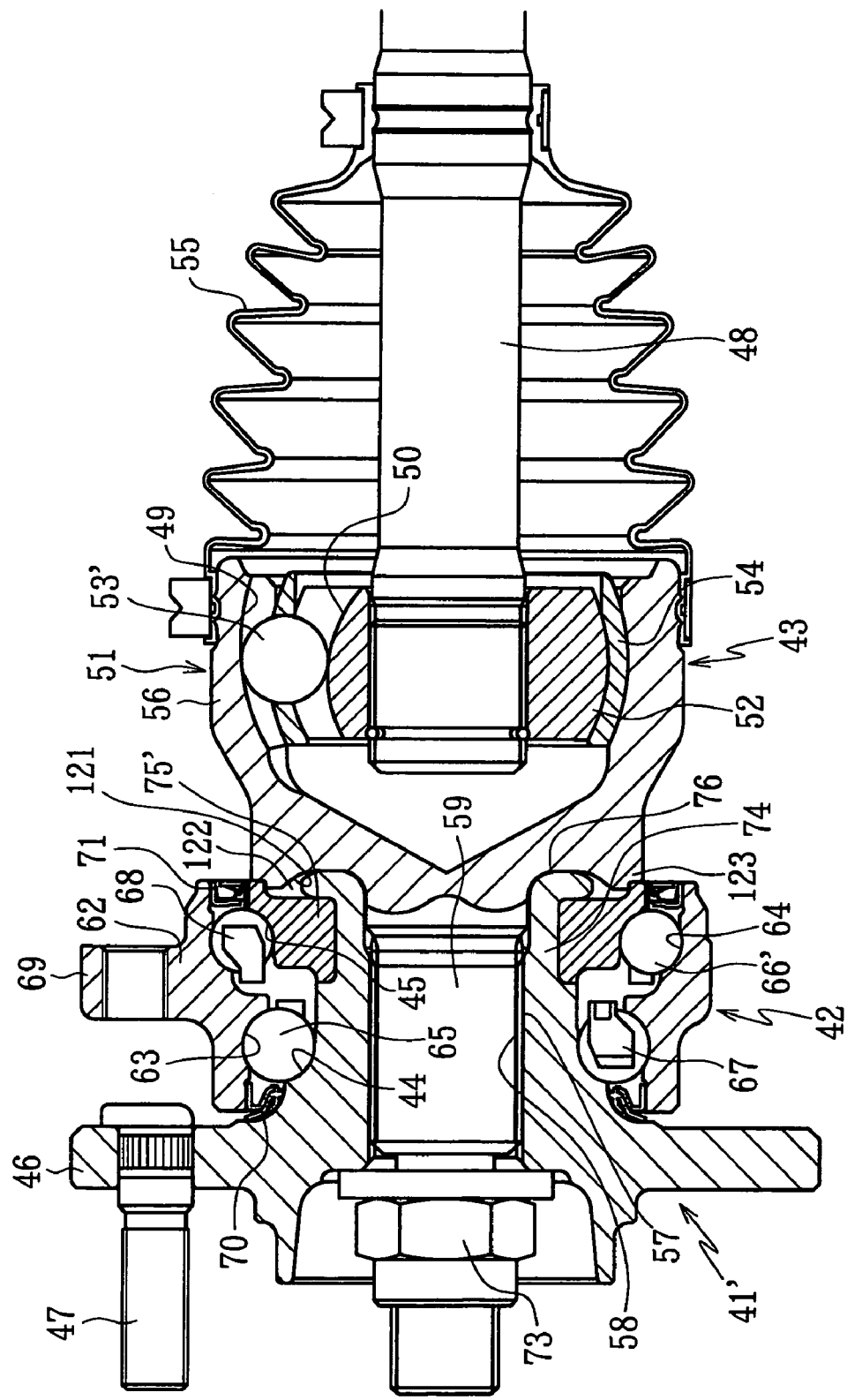
FIG. 26 is a cross sectional view showing a twenty-fifth embodiment of a bearing device according to the invention.

As other means to minimize the shift of the center position of the constant velocity universal joint, a twenty-fourth embodiment shown in FIG. 25 or a twenty-fifth embodiment shown in FIG. 26 are presented. In the twenty-fourth and twenty-fifth embodiments, a diameter of an inner ring 75' is made larger by increasing the thickness of the inner ring 75' of the bearing 42 in a radial direction, thereby the pitch circle diameter (PCD) of inboard rolling elements 66' is made larger than that of the outboard rolling elements 65 to shorten a ball pitch distance until an installation span is equal. By doing so, the inboard rolling elements 66' can be moved to the outboard side, so that the dimension of the constant velocity universal joint 43 in the axial direction can be shortened by the dimension moved, minimizing the shift of the center position of the constant velocity universal joint

43. The outside diameter of the inboard rolling elements 66' may be made smaller than that of the outboard rolling elements.

In a twenty-fourth embodiment shown in FIG. 25, an annular space 121 at a concave portion is provided in a part at the joint outer ring 51 with which the roll-formed portion 76 contacts, and the roll-formed portion 76 of the hub ring 41' is stored in the space 121 at a concave portion. Further, in a twenty-fifth embodiment shown in FIG. 26, because the thickness in a radial direction of the inner ring 75' becomes thicker, a concave portion 122 is formed on the inboard end portion of the inner ring 75', and the roll-formed portion 76 of the hub ring 41' is stored in the concave space 121 of the joint outer ring 51 and in the concave portion 122 of the inner ring 75'. With the constitution described above, the length in an axial direction of the constant velocity universal joint 43 can be shortened, and thereby the shift of the center position of the constant velocity universal joint 43 can be minimized. In the constitutions described above, an outside circumferential portion around the concave space of the joint outer ring 51 is made to contact with an inboard end portion 123 of the inner ring 75', and thereby moment load applied to the bearing can be supported, and the rigidity of the entire unit is enhanced.

Figure 27:
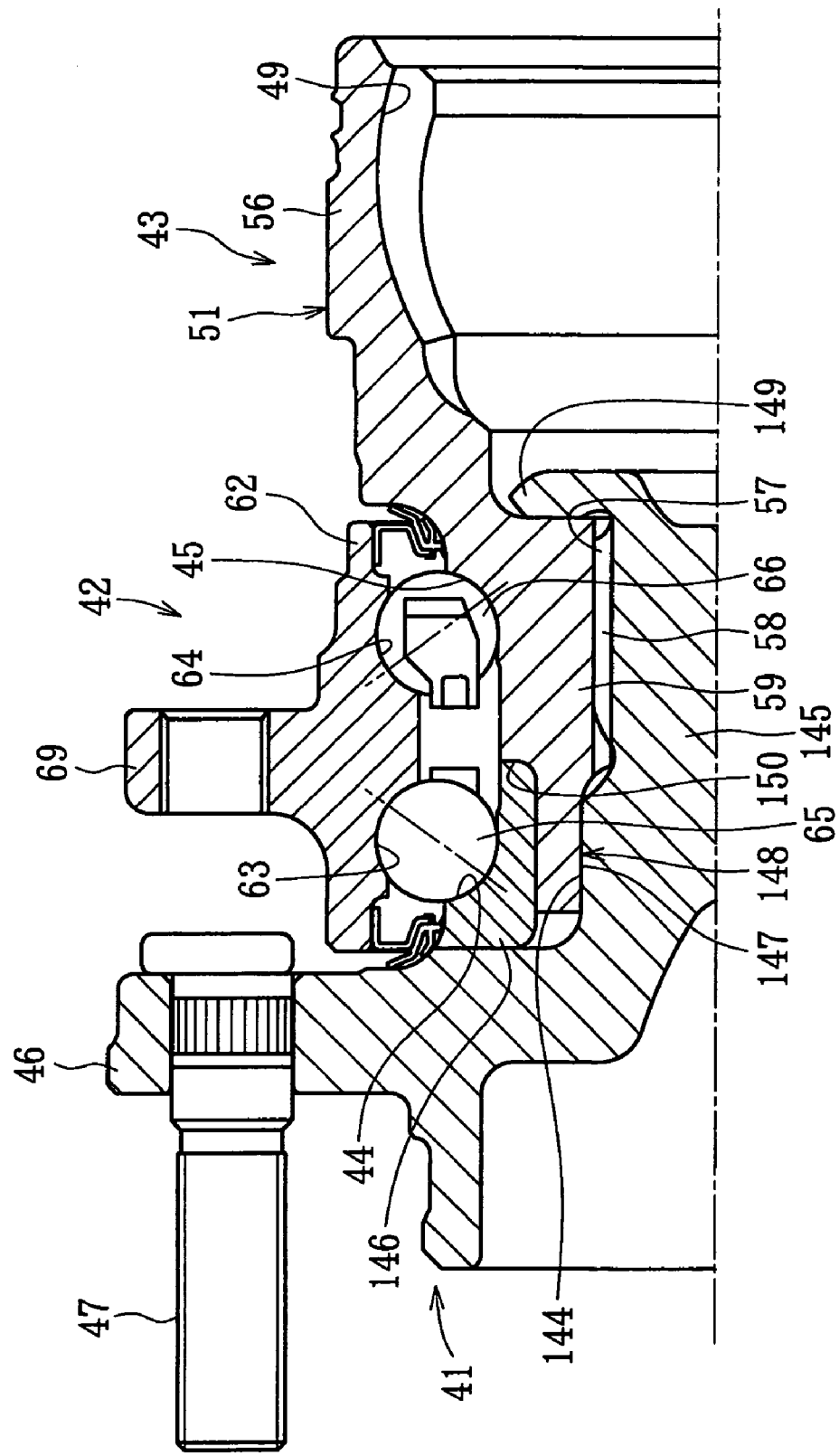
FIG. 27 is a cross sectional view showing a twenty-sixth embodiment of a bearing device according to the invention.

A bearing device shown as a twenty-sixth embodiment in FIG. 27 is for a driving wheel, and a shaft-shaped portion 145 having a fitting surface 144 on its outside periphery is formed at a position more inboard side than the flange 46 of the hub ring 41. The inboard end portion of the shaft-shaped portion 145 is extended to a position beyond the inboard inner raceway 45. A solid-shaped hub ring is shown in the figure as an example of the hub ring 41; however, it may be a hollow-shaped for a weight-lightening purpose.

The joint outer ring 51 is composed of the mouth portion 56 formed with the track groove 49 on its inside periphery, and the hollow stem portion 59 extending toward the outboard side of the mouth portion 56. The stem portion 59 is provided with the inboard inner raceway 45 on an outside periphery near the mouth portion 56. A tubular fit surface 147 is formed on an inside periphery at the outboard end portion of the stem portion 59.

In the twenty sixth embodiment, an inner ring 146 is fitted and fixed on an outside periphery of the joint outer ring 51. The inner ring 146 is provided with the outboard inner raceway 44 on its outside periphery and is pressed onto an outside periphery of the outboard end portion of the stem portion 59 with an interference that is necessary and sufficient to prevent creeping from occurring.

The joint outer ring 51 is fitted onto an outside periphery of the shaft-shaped portion 145 of the hub ring 41 with the inner ring 146 being pressed and fixed onto an outside periphery of the stem portion 59. At this time, by engaging the serrated portion 57 formed on an outside periphery of the shaft-shaped portion 145 of the hub ring 41 with serrated portion 58 formed on an inside periphery of the stem portion 59 of the joint outer ring 51, torque transmission is made between the joint outer ring 51 and the hub ring 41 through the serrated portions 57 and 58.

On the outboard side of the serrated portions 57 and 58, a fit portion 148 is formed in which the fit surface 147 of the joint outer ring 51 and the fit surface 144 of the hub ring 41 are fitted to each other. In the fit portion 148, because the fit surfaces 144 and 147 are fitted to each other without play with an interference fit, radial load is securely transmitted between the hub ring 41 and the joint outer ring 51, thereby radial rigidity of the bearing is increased.

As described above, when a tubular end portion (or a portion to be swaged) of the hub ring 41 projecting in the mouth portion 56 is plastically deformed toward outside diameter side by using means such as rocking die swaging after the joint outer ring 51 is fitted onto the hub ring 41, a swaged portion 149, a plastically deformed portion couples with an end portion of the joint outer ring 51, pushes the joint outer ring 51 into the outboard side. As a result, a front surface of the inner ring 146 contacts with a shoulder surface 150 formed on the stem portion 59 of the joint outer ring 51, a back surface of the inner ring 146 contacts with a surface extending in a radial direction of the hub ring 41, the hub ring 41 and the joint outer ring 51 are positioned in an axial direction, so that the dimension between the inner raceways 44 and 45 is defined, and at the same time, pre-load is applied to the bearing 42.

In the twenty-sixth embodiment shown in FIG. 27, the joint outer ring 51 is fitted onto the hub ring 41 as described above. Therefore, the dimensions of the serrated portions in a radial direction are not limited to under the bore diameter dimension of the hub ring 41, and the diameters of the serrated portions 57 and 58 can be enlarged. This allows to shorten the lengths in an axial direction of the serrated portions 57 and 58, and to make a bearing device more compact in size.

Also, because an inboard end portion of the hub ring 41 is extended beyond the position of the inboard inner raceway 45, moment load from a wheel acting on the hub ring 41 can be supported not only by the outboard bearing, but also by the inboard bearing. Because moment load is supported by a double-row bearing as described above, problems such as insufficient rigidity of the hub ring 41, loosening at the swaged portion 149 and the like, which occur in a bearing device that supports moment load mainly by an outboard bearing, are not involved, and moment rigidity of the entire bearing device is improved.

In a bearing device in which an outboard inner raceway is formed on a hub ring, the hub ring functions itself as a raceway of a common rolling-element bearing. Therefore, the hub ring is made of expensive steel for bearing, or extremely purified steel, and particularly of high-carbon steel advantageous for securing hardenability and hardness of a raceway surface, which significantly raises material costs. Additionally, in a constitution that requires swaging of an end portion of the hub ring, because of characteristics of high-carbon steel, the portion to be swaged must be treated with annealing or thermal refining for easier swaging operation, which also raises production costs.

Contrary to this, in the twenty-sixth embodiment shown in FIG. 27, the outboard inner raceway 44 is formed on the inner ring 146, a separate element from the hub ring 41, and neither of the outboard inner raceway 44 nor the inboard inner raceway 45 is provided on the hub ring 41. Therefore, no consideration is required for hardenability or the hardness of the inner raceway in selecting material for the hub ring 41, and extremely purified steel or high-carbon steel is not necessary to be used. As a result, steel material containing carbon in a degree similar to that of steel for normal use may be used as a material of the hub ring 41 to prevent material costs from rising. Also, steel of low- to medium-carbon content such as S15C to S50C (preferably S45C) as defined in JIS (Japanese Industrial Standards) may be used to lower the hardness of the portion to be swaged so that workability in swaging operation is improved. In this case, an appropriate thermal refining treatment may be applied to the steel material to improve its characteristics such as fatigue strength and others. Addition of boron in the material further improves fatigue strength after thermal refining. Even when a thermal refining treatment is not applied, addition of an element such as vanadium improves the fatigue strength of a material.

Figure 28:
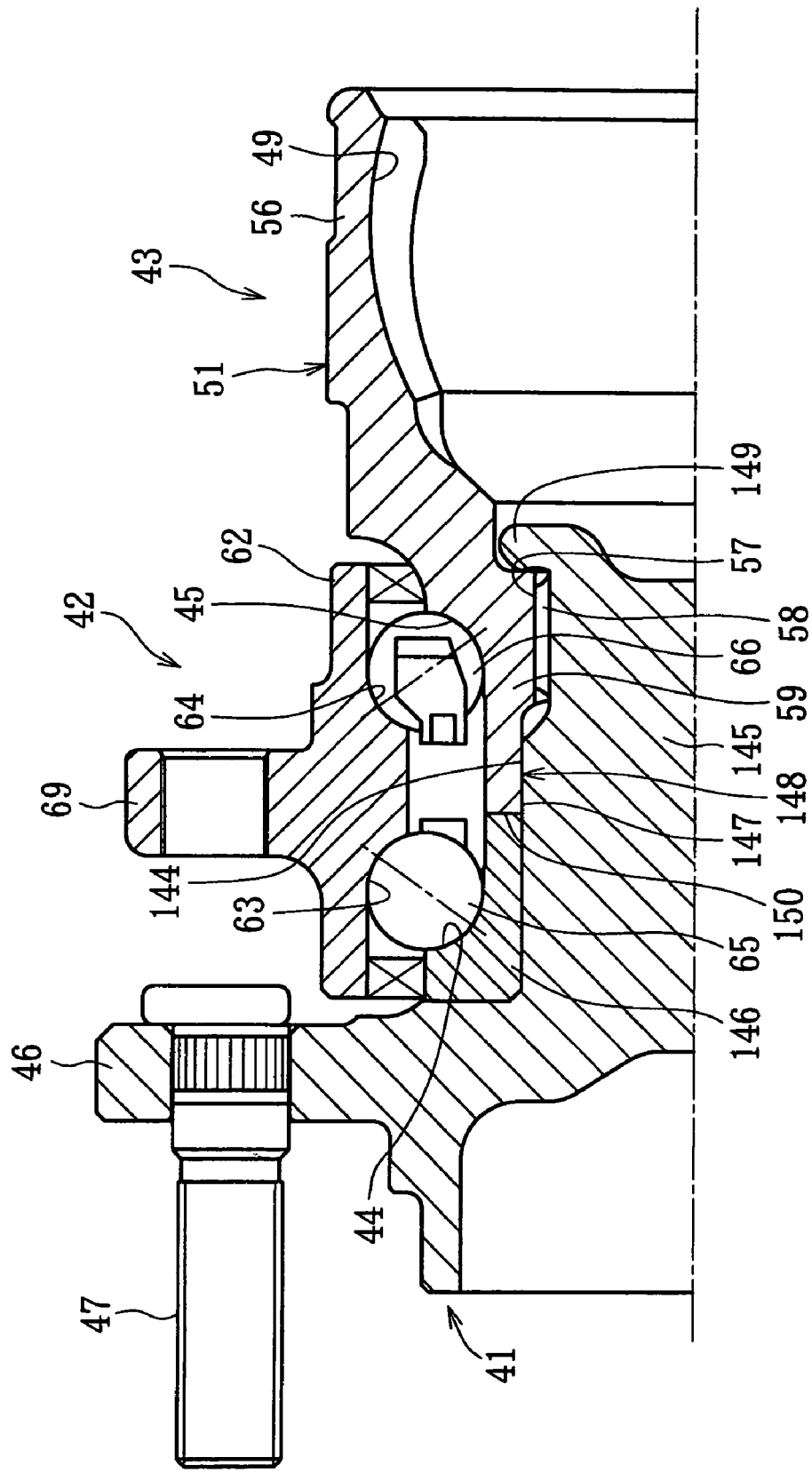
FIG. 28 is a cross sectional view showing a twenty-seventh embodiment in which an inner ring having an inner raceway is fitted to a hub ring.

FIG. 28 shows a twenty-seventh embodiment, which differs from the embodiment in FIG. 27 in that the inner ring 146 is fitted onto an outside periphery of the hub ring 41 and is butted with an end portion of the joint outer ring 51. In this case, the inner ring 146 is positioned by making the front surface of the inner ring 146 to contact with an end portion of the joint outer ring 51 and making the back surface of the inner ring 146 to contact with a surface of the hub ring 41 extending in a radial direction. In this embodiment, because the stem portion 59 of the joint outer ring 51 is fitted onto the shaft-shaped portion 145 of the hub ring 41 through the serrated portions 57 and 58, shortening in the dimension in an axial direction of the serrated portions 57 and 58 is achieved by enlarging the diameters, and moment rigidity is improved by supporting moment load with a double-row bearing. Also, because the hub ring 41 is not provided with an inner raceway, the hub ring 41 is not necessary formed with steel for bearing, so that production costs are reduced.

Figure 29:
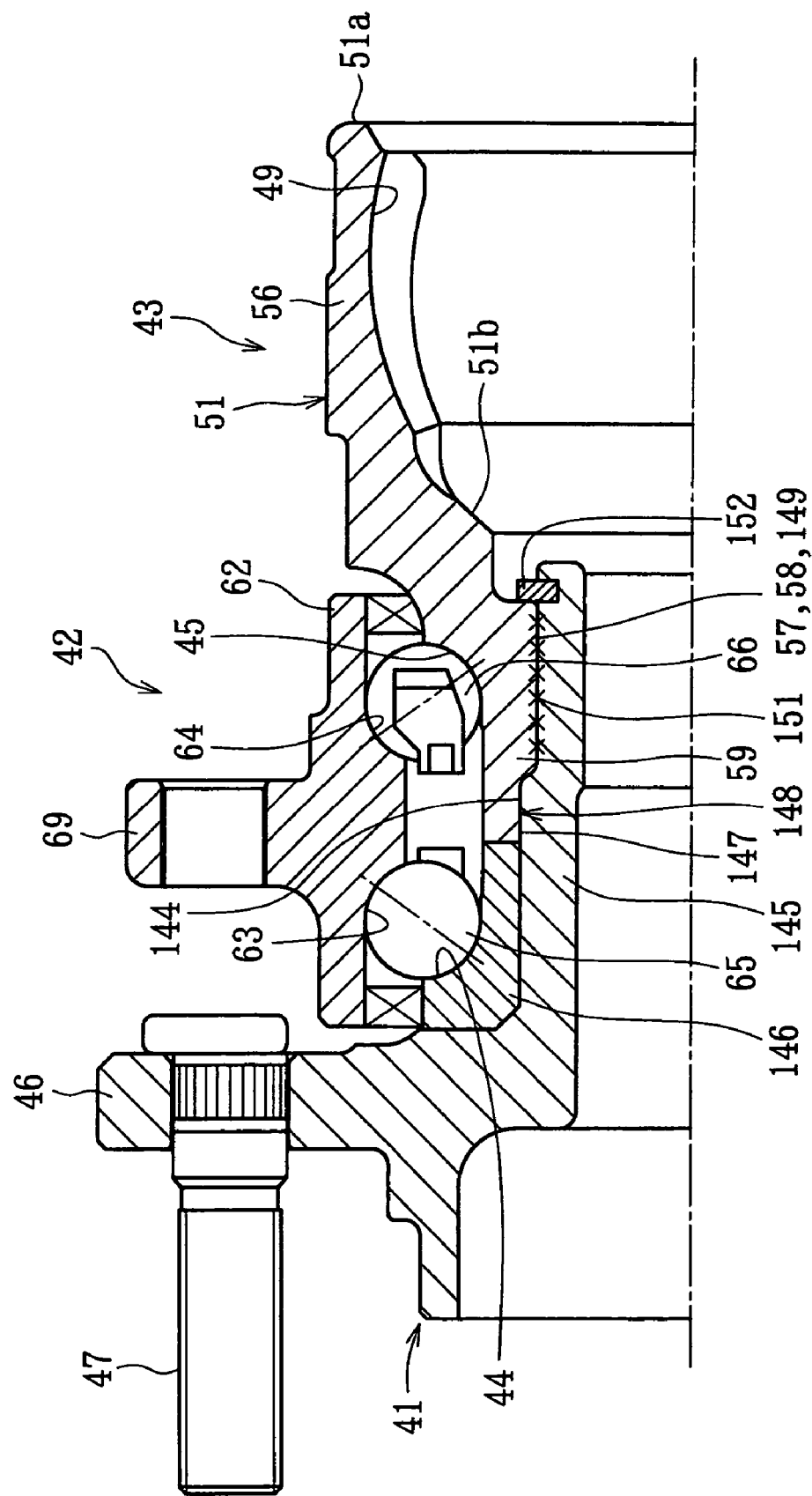
FIG. 29 is a cross sectional view showing a twenty-eighth embodiment in which a hub ring is expanded in its diameter for swaging to be fixed to a joint outer ring.

A twenty-eighth embodiment in FIG. 29 shows a modified example of the coupling constitution of the hub ring 41 and the joint outer ring 51, in which the inner ring 146 is fitted onto the outside periphery of the hub ring 41 in the same manner as the embodiment shown in FIG. 28, a portion 151 with projections and depressions is provided (the range where the portion 151 with projections and depressions is provided is indicated with 'x' marks) in a fit region of the hub ring 41 and the joint outer ring 51, the fit region of the hub ring 41 and the joint outer ring 51 including the portion 151 with projections and depressions is partly applied with diameter expansion (or diameter shrinkage) to plastically couple the hub ring 41 and the joint outer ring 51 with each other. FIG. 29 shows an example in which the hub ring 41 formed in a hollow shape is partly applied with diameter expansion, however, they may also be plastically coupled by partly shrinking the diameter of the joint outer ring 51 with the portion 151 with projections and depressions being involved.

In this joining constitution, because the diameter of the hub ring 41 is expanded (or the diameter of the joint outer ring is shrunk), the portion 151 with projections and depressions bites into the mating surface, so that the hub ring 41 and the joint outer ring 51 are joint in a state in which torque transmission is possible, and a solid coupling constitution is provided which will not loosen even under an excessive moment load. The joining constitution provides the serrated portion 57 and 58, and the swaged portion 149, shown in FIG. 27 and FIG. 28, on a common part, and it allows to make the dimension in an axial direction of a bearing device shorter than a case in which the serrated portions 57 and 58 are independently formed.

The portion 151 with projections and depressions may be made in any shape. For example, it may be a knurled surface or maybe teeth that extend in an axial direction (such as serration or spline) formed on a plurality of places in a circumferential direction. Also, the portion 151 with projections and depressions is preferably hardened with a heat treatment so that it has excellent bite-in capability for coupling. When the portion 151 with projections and depressions is hardened as described above and is used on an element of which diameter is expanded or shrunk, the portion 151 with projections and depressions may crack during swaging as the diameter is expanded or shrunk. Therefore, the portion 151 with projections and depressions is preferably formed on a member that is not subjected to diameter expansion (or diameter shrunk), or for example, formed on an inside periphery of the joint outer ring 51 of this embodiment.

Figure 33:
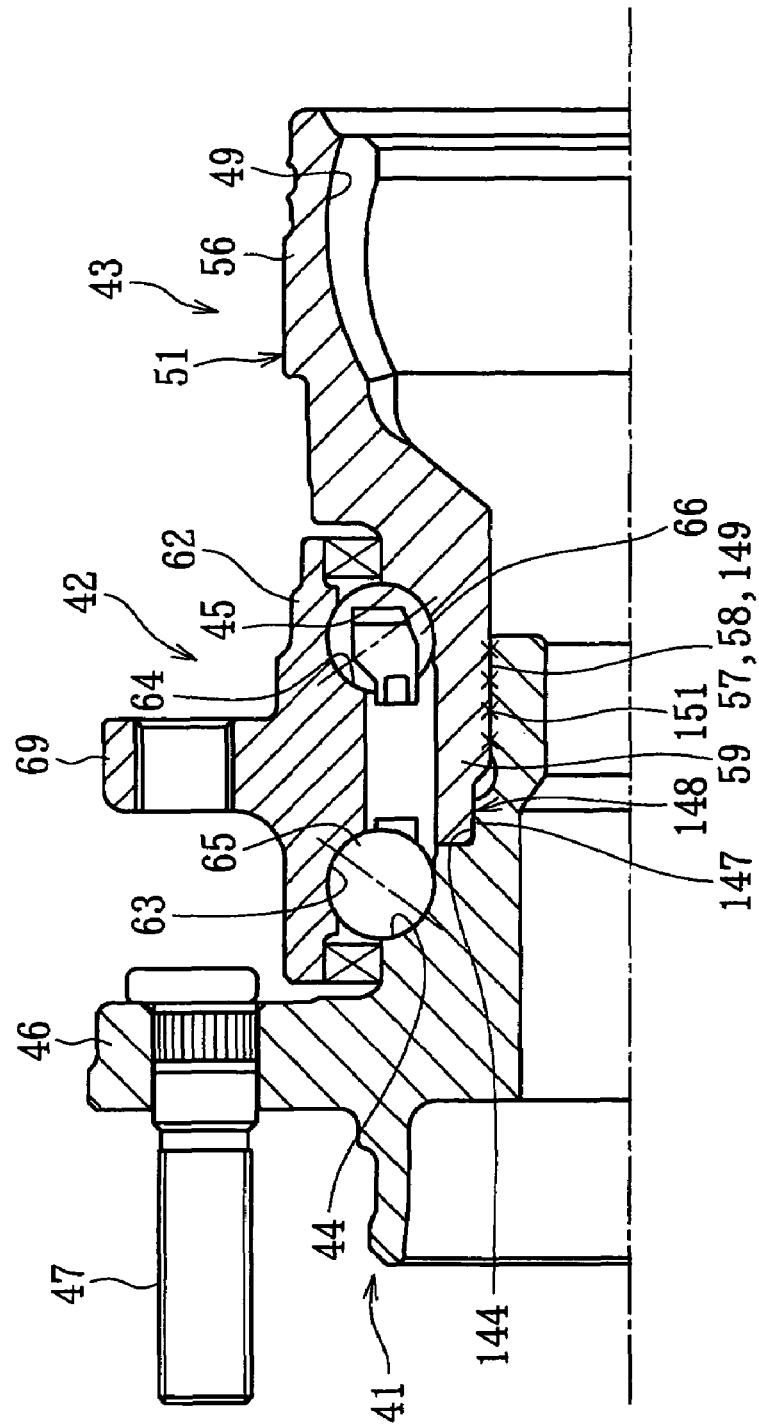
FIG. 33 is a cross sectional view showing a thirty-second embodiment in which a hub ring is expanded in its diameter for swaging to be fixed to a joint outer ring.
Figure 34:
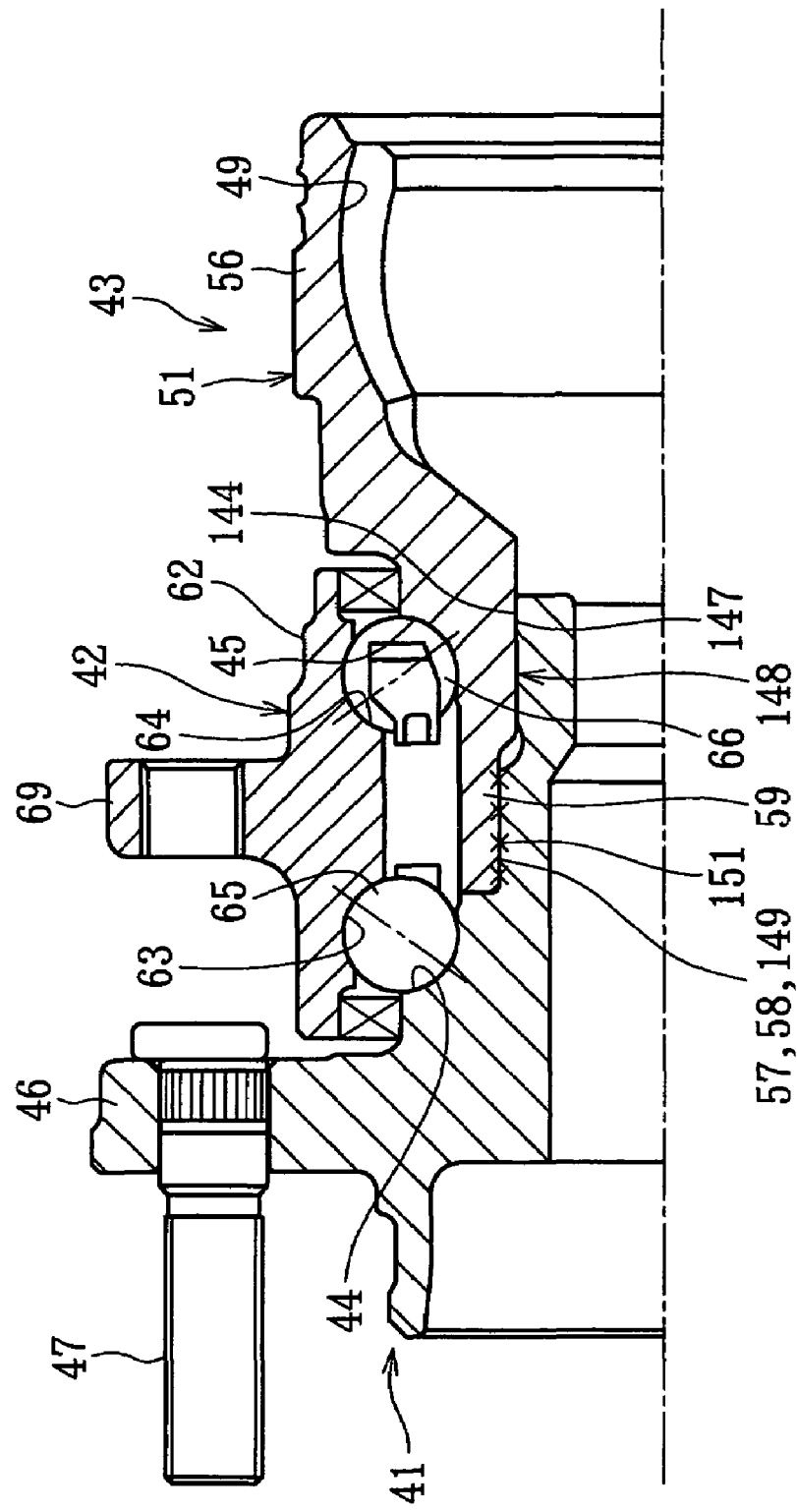
FIG. 34 is a cross sectional view showing a thirty-third embodiment in which a hub ring is expanded in its diameter for swaging to be fixed to a joint outer ring.
Figure 35:
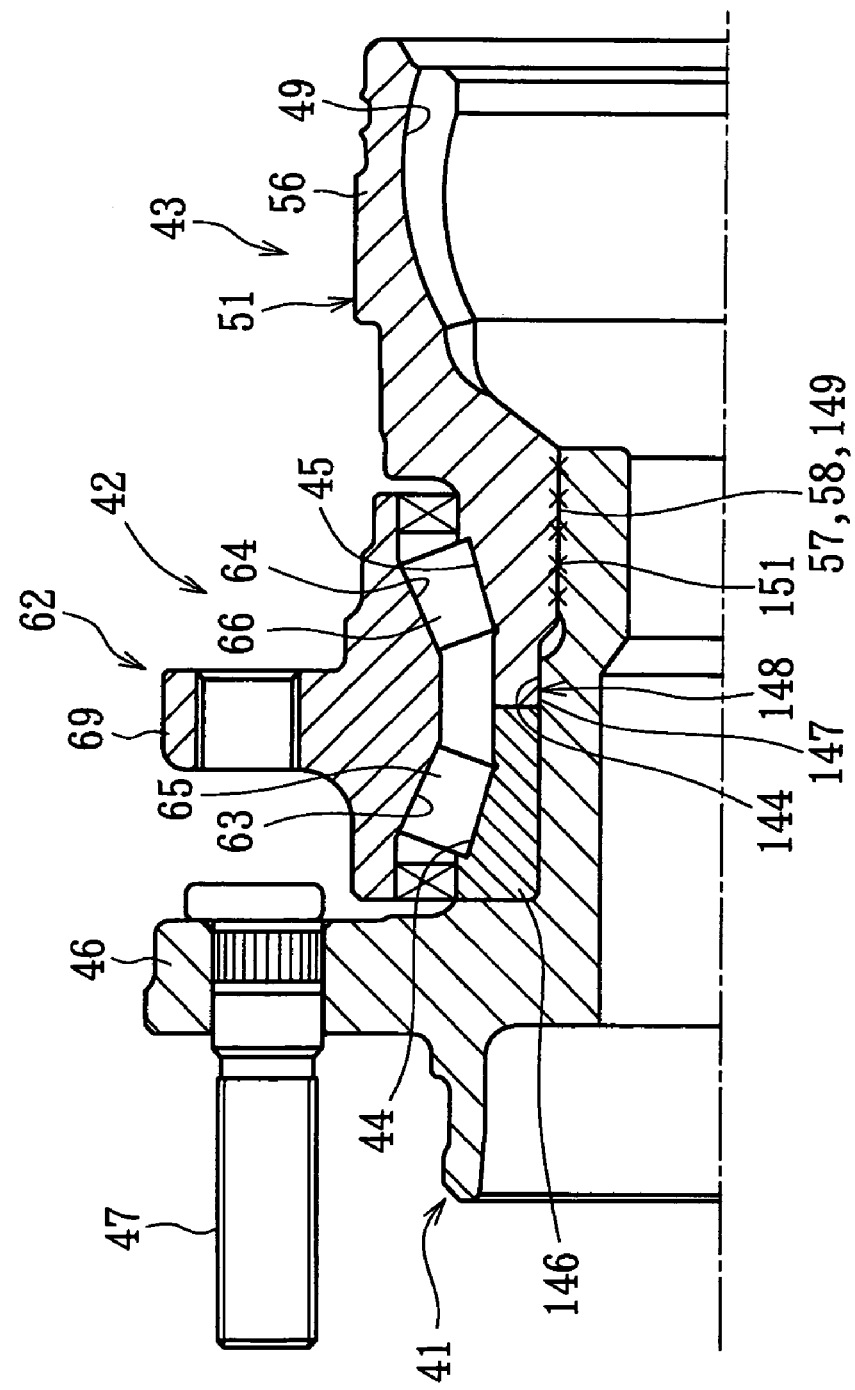
FIG. 35 is a cross sectional view showing a thirty-fourth embodiment in which a double-row conical-roller bearing is used as a bearing shown in FIG. 29.

In the twenty-eighth embodiment in FIG. 29, an example of a constitution is shown, in which a snap ring 152 fitted to the inboard end portion of the hub ring 41 is couple with an end surface of the joint outer ring 51 for strengthening a loosening prevention function; however, the snap ring may be omitted if conditions allow (see FIG. 33 to FIG. 35). Further, FIG. 29 shows an example in which the inner ring 146 is fitted onto an outside periphery of the hub ring 41; however, the inner ring 146 may be fitted onto an outside periphery of the joint outer ring 51 in the same manner as the embodiment shown in FIG. 27.

Figure 30:
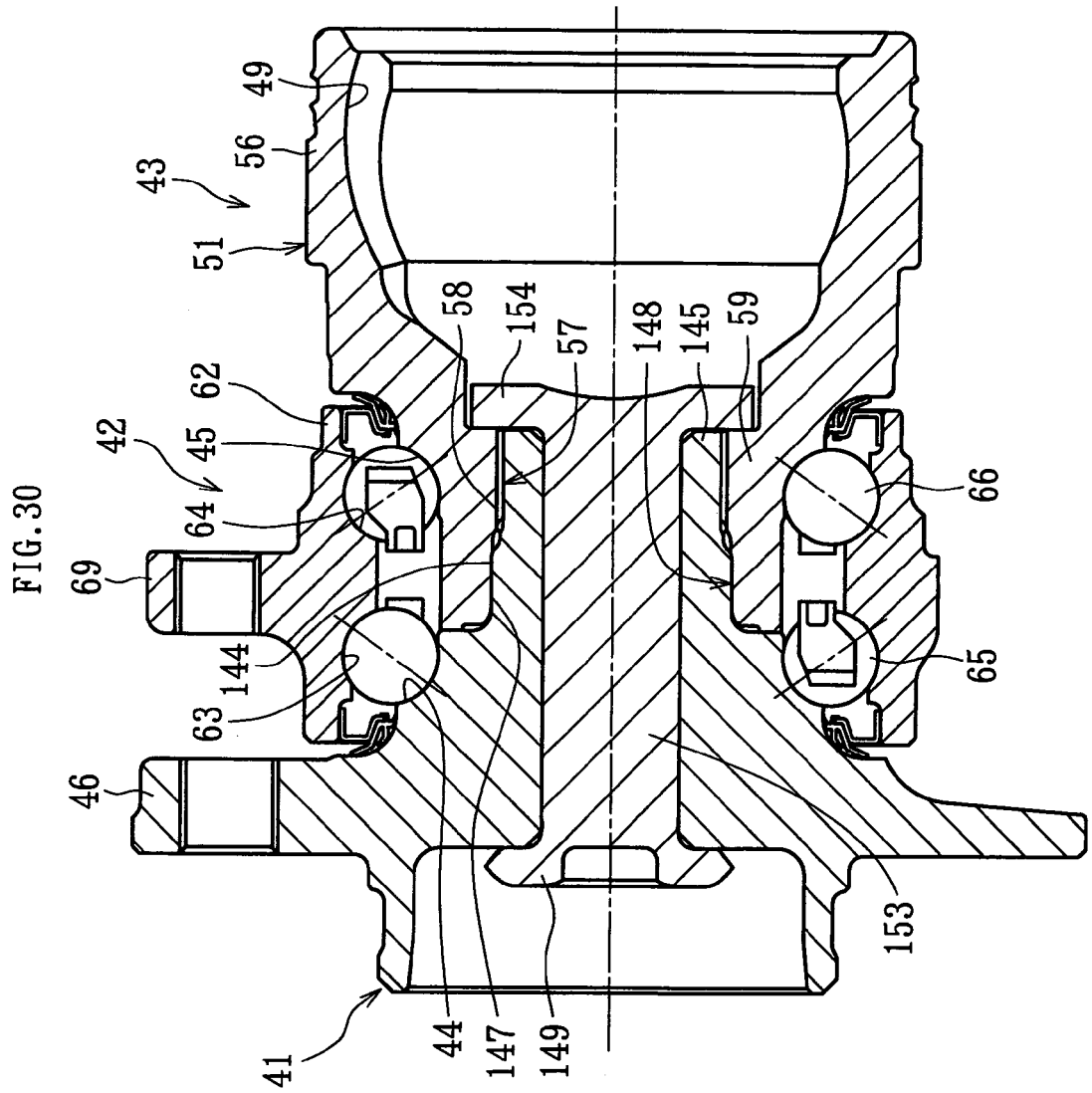
FIG. 30 is a cross sectional view showing a twenty-ninth embodiment in which a hub ring and a joint outer ring are coupled with a connection member.

The hub ring 41 and the joint outer ring 51 may be joined each other in the joining constitution shown in FIG. 30. In a twenty-ninth embodiment in FIG. 30, the hub ring 41 is formed in a hollow shape, one end portion of a connection member 153 fitted into an inside periphery of the hollow shape is roll-formed and plastically deformed. As shown in the figure, a coupling portion 154 is formed at the other end of the connection member 153, one end of the connection member 153 is roll-formed while making the coupling portion 154 couple with the joint outer ring 51, the roll-formed portion 149 produced by the roll-forming is coupled with the hub ring 41, and thereby the hub ring 41 and the joint outer ring 51 are surely joined. The same effect as described above is also obtainable when the direction of the connection member 153 is reversed from that shown in the figure to couple the coupling portion 154 with the hub ring 41, and the roll-formed portion 149 is coupled with the joint outer ring 51.

In FIG. 30, the outboard inner raceway 44 is directly formed on the hub ring 41; however, it may be so constituted that the inner raceway 44 is formed on the inner ring 146, a separate element from the hub ring 41, and the inner ring 146 is fitted onto an outside periphery of the hub ring 41 or the joint outer ring 51.

Figure 31:
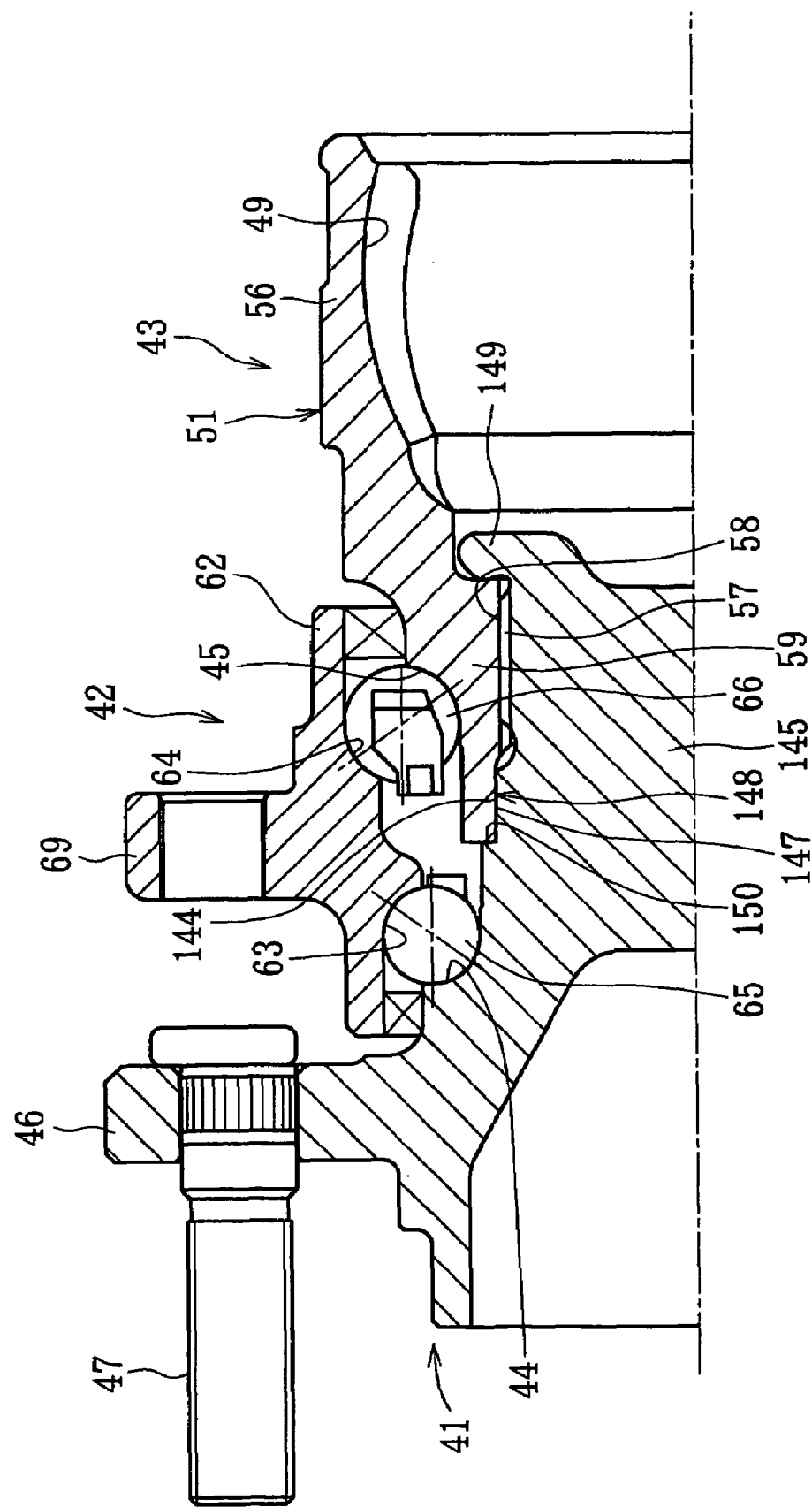
FIG. 31 is a cross sectional view showing a thirtieth embodiment in which pitch-circle diameters of rolling elements and other dimensions are made to differ from each other in inboard and outboard rows.

A thirtieth embodiment in FIG. 31 is for a driving wheel, in which the joint outer ring 51 is fitted onto the hub ring 41 in the same manner as the embodiments shown in FIG. 27 to FIG. 30. In the embodiment shown in FIG. 30, in contrast to a bearing device in which specifications of an outboard bearing are made to accord with those of an inboard bearing having tougher load conditions than the outboard bearing, the diameter of the outboard rolling elements 65 is made smaller than that of the inboard rolling elements and the pitch circle diameter of the outboard bearing is made smaller than that of the inboard bearing. By doing so, the dimension in a radial direction of the outboard outer raceway 63 becomes smaller, enabling lightening the weight of the bearing device. Also, the outside diameter of the outer ring 62 at the outboard side can be made smaller than that at the inboard side, a space for removing hub bolts 47 is easily secured and freedom in design is improved.

In this case, both the pitch circle diameter and the diameter of the rolling elements in the outboard side bearing are made smaller; however, the same effect is obtained when either the pitch circle diameter of the bearing or the diameter of the rolling elements is made smaller at the outboard side bearing, and the diameter not made smaller is made equal to that of the inboard side bearing. FIG. 31 shows an example in which the outboard inner raceway 44 is formed on an outside periphery of the hub ring 41 in the same manner as the embodiment shown in FIG. 30. However, the inner ring 146 having the outboard inner raceway 44 may be fitted onto the outside periphery of the joint outer ring 51 in the same manner as the embodiment shown in FIG. 27 to FIG. 29.

Figure 32:
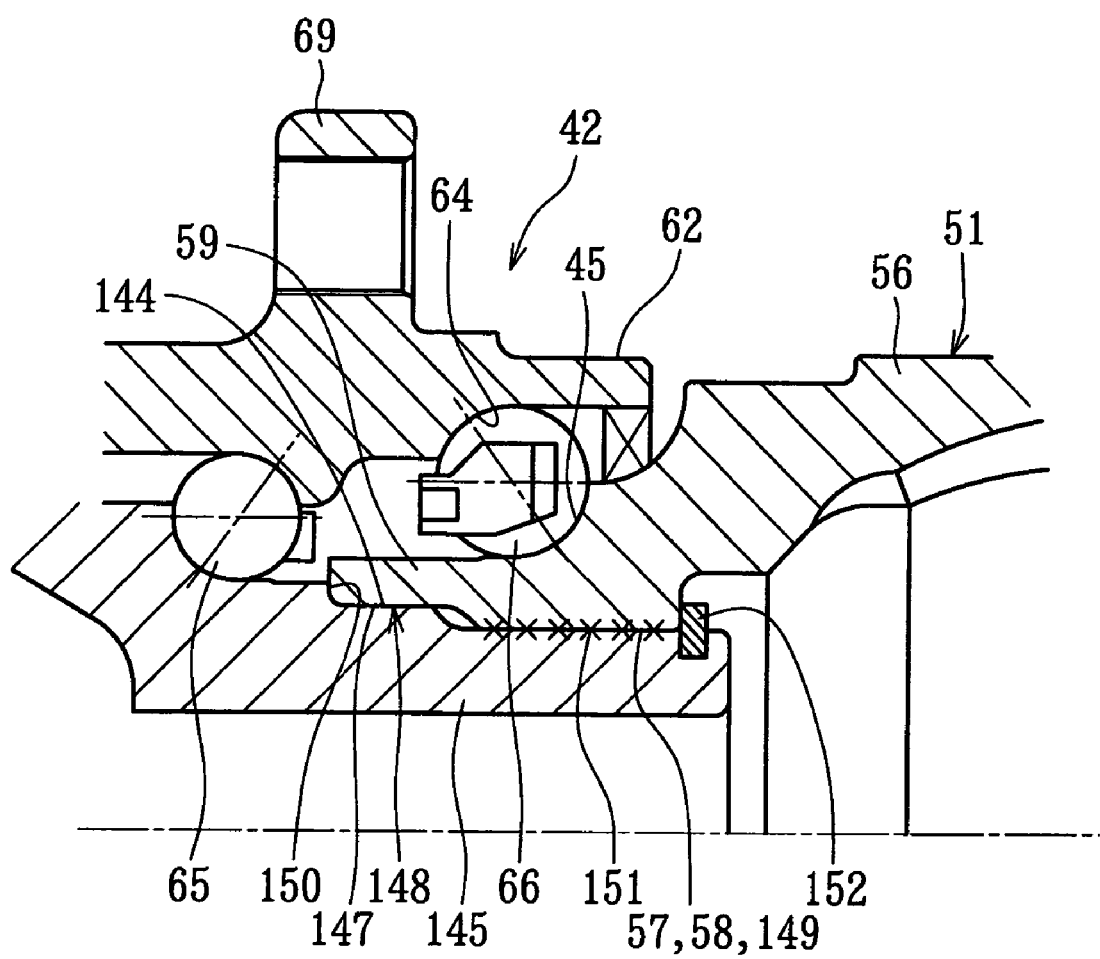
FIG. 32 is a cross sectional view showing a thirty-first embodiment in which a hub ring in FIG. 31 is expanded in its diameter for swaging to be fixed to a joint outer ring.

In the thirtieth embodiment shown in FIG. 31, an end surface of the stem portion 59 of the joint outer ring 51 is made to contact with the shoulder portion 150 of the hub ring 41, the inboard end portion of the hub ring 41 is swaged, the swaged portion 149 is made to couple with an end portion of the joint outer ring 51, and thereby the hub ring 41 and the joint outer ring 51 are plastically joined. The joining constitution for joining the hub ring 41 and the joint outer ring 51 may be made in any form. For example, as a thirty-first embodiment shows in FIG. 32, the hub ring 41 and the joint outer ring 51 may be plastically joined by partly expanding or shrinking the diameters in a fit region with the portion 151 having projections and depressions being provided in the fit region of the hub ring 41 and the joint outer ring 51. Also, although a figure is not shown, the connection member 153 may be used to plastically join the hub ring 41 and the joint outer ring 51 in the same manner as shown in FIG. 30.

Figure 36:
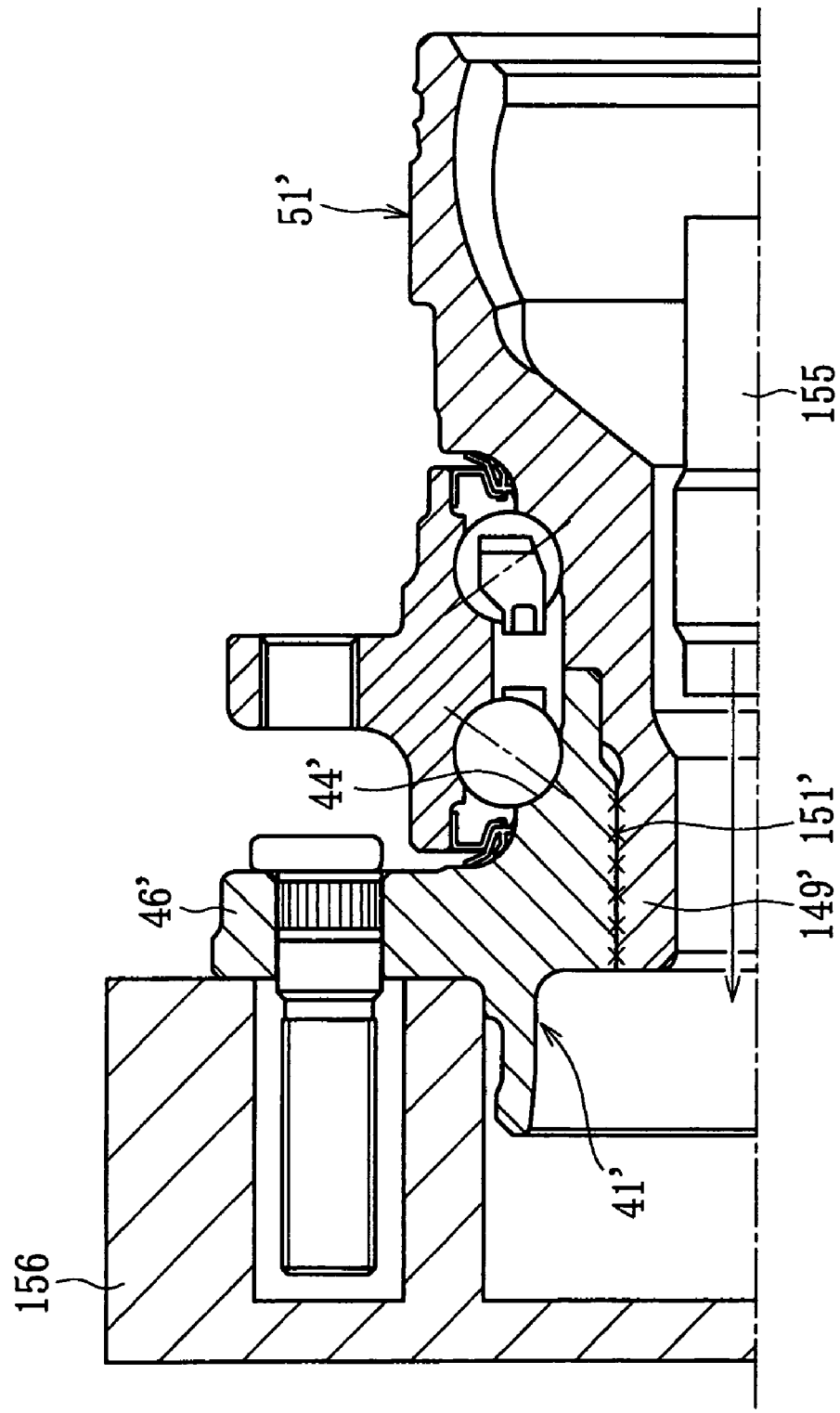
FIG. 36 is a cross sectional view showing a thirty-fifth embodiment in which a hub ring is fitted onto an outside periphery of a joint outer ring for fitting them to each other by expanding and swaging.

The constitution described above in which different dimensions are given to the pitch circle diameters or the rolling-element diameters at inboard and outboard sides is applicable not only to a bearing device for a driving wheel, but also to that for a driven wheel (not shown). In a bearing device for a driven wheel, the hub ring 41 and the double-row bearing 42 are unitized, and the constitution is different from that of a driving wheel shown in FIG. 27 to FIG. 32 in that the constant velocity universal joint 43 is not provided in a bearing device for a driven wheel. In this kind of a bearing device for driven wheels, the outboard inner raceway 44 is generally formed on an outside periphery of the hub ring 41, and the inboard inner raceway 45 is formed on an inner ring fitted onto an outside periphery of the hub ring 41. As described with reference to FIG. 29, if the hub ring 41' is fitted onto an outside periphery of the joint outer ring 51' as a thirty-fifth embodiment in FIG. 36 at the time when the hub ring 41 and the joint outer ring 51 are plastically joined by diameter expansion swaging (or diameter shrinkage swaging), a plastically deformed portion 149' produced by swaging is inevitably disposed at more outboard side than the outboard inner raceway 44', creating the following problems:

1̂ The joint outer ring 51' becomes longer in an axial direction, which is against demands for weight-lightening, 2̂ Diameter expansion swaging is made by pushing a punch 155 into an inside periphery of the hub ring 41'. The push-in must be made in the direction in which the joint outer ring 51' and the hub ring 41' couple with each other in an axial direction so that pre-load is given. In this case, push-in load must be received by a jig 156 disposed at an outboard end surface of the wheel mounting flange 46' of the hub ring 41'; however, accuracy in run-out of an end-surface of the wheel mounting flange 46' may be affected.

3̂ As described above, in diameter expansion swaging, a portion 151' with projections and depressions is preferably formed on an element at the outer side, or on an inside periphery of the hub ring 41', and the portion is hardened by a heat treatment. In this case, heat treatment of the hub ring 41' must be applied to both an outside periphery including the inner raceway 44' and an inside periphery including the portion 151' with projections and depressions, and thereby heat-treatment costs are increased.

Contrary to this, when the joint outer ring 51 is fitted onto an outside periphery of the hub ring 41 as shown in FIG. 29, the region of diameter expansion can be disposed at more inboard side than the outboard inner raceway 44. As a result, the joint outer ring 51 may be shortened in length in an axial direction, the weight is lightened and processing costs (costs of such as forging and machining) are reduced. Diameter expansion swaging can be made by inserting a punch from the outboard side. Therefore, push-in load can be received by an end surface 51a or a bottom 51b of the mouth portion 56 of the joint outer ring 51, so that affect to run-out accuracy of an end surface of the wheel mounting flange 46 is avoided. Further, because the portion 151 with projections and depressions is formed on an inside periphery of the joint outer ring 51, heat treatment is also applied to the inside periphery of the joint outer ring 51. However, as to the joint outer ring 51, a heat treatment of the portion 151 with projections and depressions can be applied at the same time when a heat treatment of the track groove 49 that is originally expected to do is made. Therefore, the number of steps for a heat-treatment process does not increase, and rise in heat treatment costs is avoided.

In FIG. 29, diameter expansion swaging is made at the bore side of the inboard inner raceway 45; however, as a thirty-second embodiment in FIG. 33, diameter expansion swaging can be also made in the region between the double-row raceways 44 and 45. In this case, the dimensions in an axial direction of both the hub ring 41 and the joint outer ring 51 can be shortened, so that weight is further lightened.

In a thirty-third embodiment in FIG. 34, diameter expansion swaging is made in the region between the inner raceways 44 and 45, and the fit portion 148 is disposed more to the inboard side than the position of the swaged portion 149, which differs from an embodiment shown in FIG. 33. In this case, the fit portion 148 is not necessarily disposed in the region between the inner raceways 44 and 45, so that the distance between the inner raceways 44 and 45 can be shortened than that shown in FIG. 33.

A thirty-fourth embodiment shown in FIG. 35 is an example in which a double-row tapered-roller bearing is used as a bearing. This type of bearings has high durability to impact load and particularly suitable for automobiles that is inherently heavy in weight. In the figure, the swaged portion 149 is disposed on the bore surface of the inner raceway 45; however, it can also be disposed in the region between the inner raceways 44 and 45 in the same manner as the embodiment shown in FIG. 33, and further, a fit portion 148 can be disposed at the inboard side of the swaged portion 149 in the same manner as the embodiment shown in FIG. 34.

Figure 37:
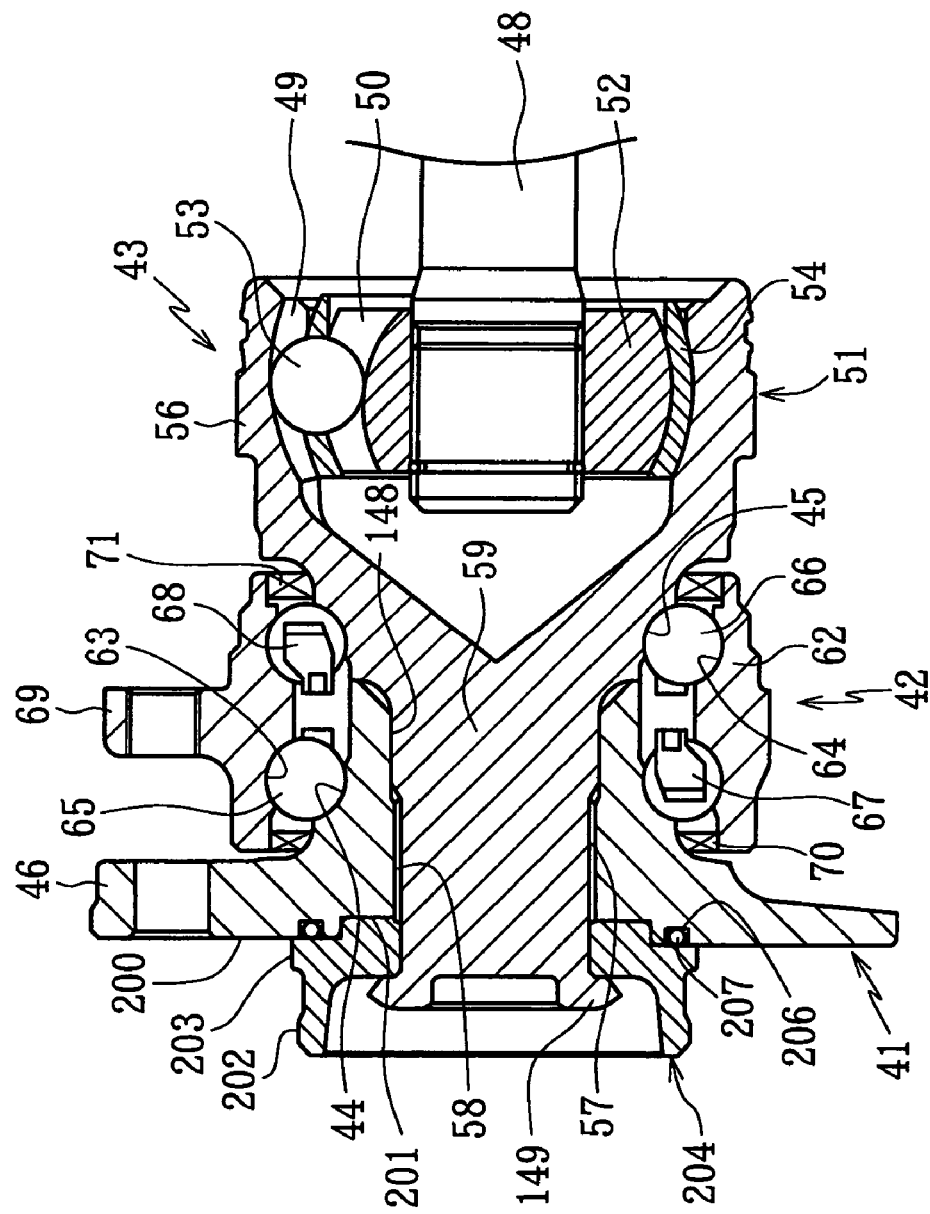
FIG. 37 is a cross sectional view showing a thirty-sixth embodiment of a bearing device according to the invention.

FIG. 37 shows a bearing device for a driving wheel as a thirty-sixth embodiment. The fit portion 148 that fits to a base portion of the shaft-shaped stem portion 59 of the joint outer ring 51 is formed, and the serrated portion 58 that fits to the serrated portion 57 of the stem portion 59 of the joint outer ring 51 is formed on a periphery of a bore at the outboard side. A concave portion 201 is formed around the periphery of a through hole at an outboard end surface of the hub ring 41, and a pilot member, or a pilot ring 204, having a wheel guide portion 202 and a brake guide portion 203 is press-fitted into the concave portion 201. A brake rotor (not shown) is mounted on an outboard flange 200 of the wheel mounting flange 46. Torque transmission is enabled by inserting the stem portion 59 of the joint outer ring 51 into the through hole of the hub ring 41 with the pilot ring 204 installed on position, fitting the base portion of the stem portion 59 to the fit portion 148 of the hub ring 41, and at the same time, by fitting the serrated portion 57 to the serrated portion 58 of the hub ring 41.

Figure 38:
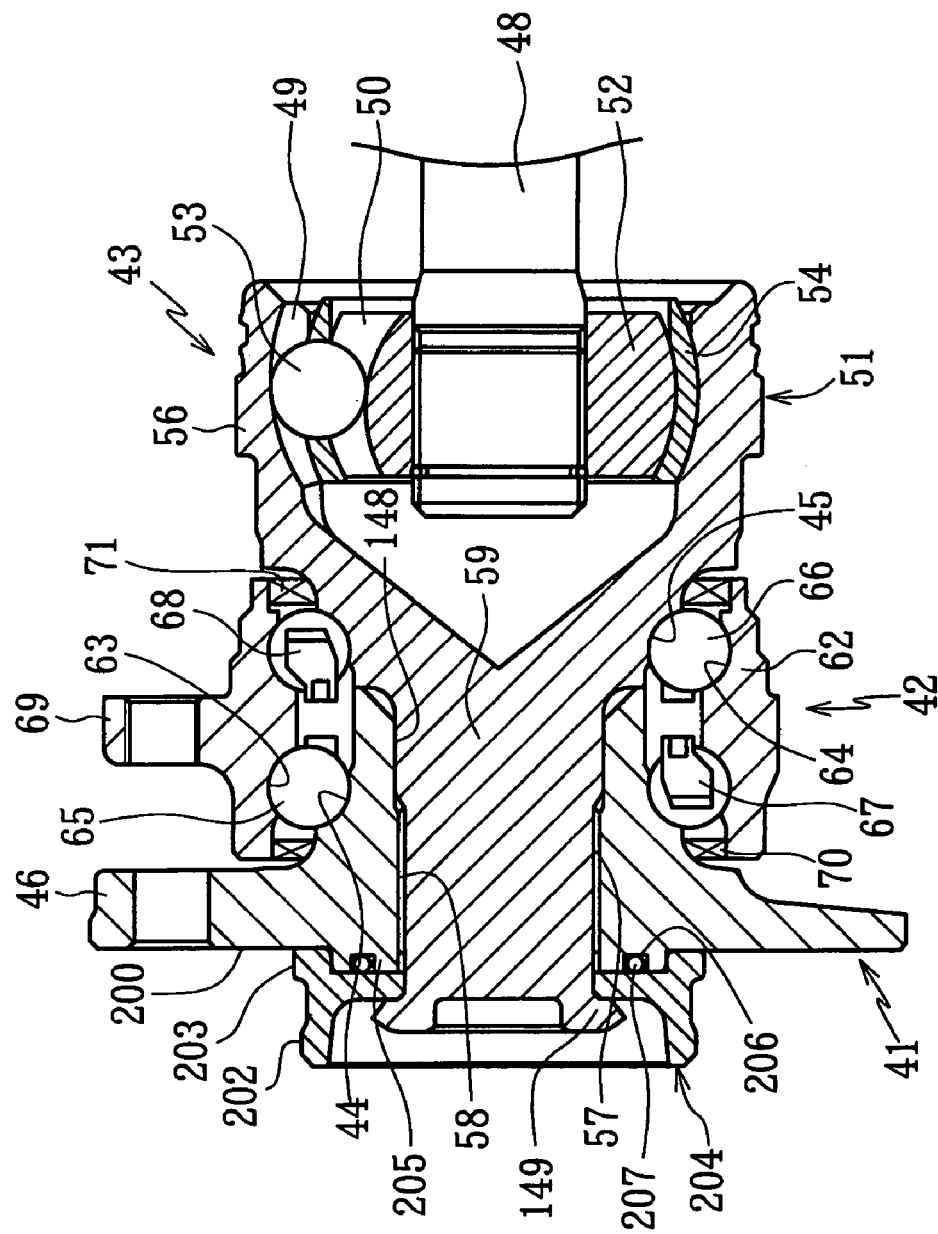
FIG. 38 is a cross sectional view showing a thirty-seventh embodiment of a bearing device according to the invention.

In the thirty-sixth embodiment, the pilot ring 204 and the hub ring 41 are fitted in such a way that the concave portion 201 is provided at the outboard end surface of the hub ring 41, and the pilot ring 204 is fitted to the concave portion 201. However, it may also be constituted such that, as a thirty-seventh embodiment shown in FIG. 38, a convex portion 205 is provided at the outboard end surface of the hub ring 41, and the pilot ring 204 is fitted to the convex portion 205.

An axial end of the joint outer ring 51 is swaged and plastically deformed to be fixed to the pilot ring 204, and the joint outer ring 51 is fixed to and unitized with the hub ring 41 through the pilot ring 204. Thus, by fixing the joint outer ring 51 to the hub ring 41 by swaging, a shoulder portion of the joint outer ring 51 is butted with the inboard end portion of the hub ring 41, and thereby pre-load is given to the bearing 42.

In the thirty-sixth embodiment, the pilot member 204, a separate element, is fitted to the outboard end portion of the hub ring 41, axis alignment of the hub ring 41 and the joint outer ring 51 is made through the fit portion 148 of the inboard end portion of the hub ring 41 and the pilot ring 204, and the pilot ring 204 and the hub ring 41 are fixed to be unitized by swaging an axial end of the joint outer ring 51. Because axis alignment of the hub ring 41 and the joint outer ring 51 is made through the pilot ring 204, a separate element from the hub ring 41, run-out of the wheel mounting flange 46 of the hub ring 41 can be prevented. Further, the pilot ring 204 prevents moment load acting on the hub ring from concentrating on the swaged portion 149.

As described above, by making the pilot ring 204 having the wheel guide portion 202 and the brake guide portion 203 a separate element from the hub ring 41, surface treatments (such as rust-proofing, wax application or painting) for the pilot ring 204 may be applied prior to assembling. By doing so, surface treatments for the wheel guide portion 202 and the brake guide portion 203 that have been carried out in assembly lines become unnecessary.

Also, a seal member may be installed on a surface where the pilot ring 204 and the hub ring 41 contact with each other. For example, a seal member maybe applied on the surface of either the pilot ring 204 or the hub ring 41, or it may be constituted such that an annular groove 206 with sharp bottom corners is formed on the outboard end surface of the hub ring 41, and an O-ring 207 is installed on the groove 206 (see FIG. 37 and FIG. 38). The constitution in which the O-ring 207 is installed in the groove 206 may also be applicable to a thirty-eighth and thirty-ninth embodiments that are described below (see FIG. 39 and FIG. 40).

Further, a surface-hardened layer may be formed by a heat treatment on the pilot ring 204. Providing a surface-harden layer on the pilot ring 204 can prevent plastic deformation of an outboard end surface of the hub ring 41 induced by swaging. Dip quenching or carburization is suited as a heat treatment for forming a surface-hardened layer.

Figure 39:
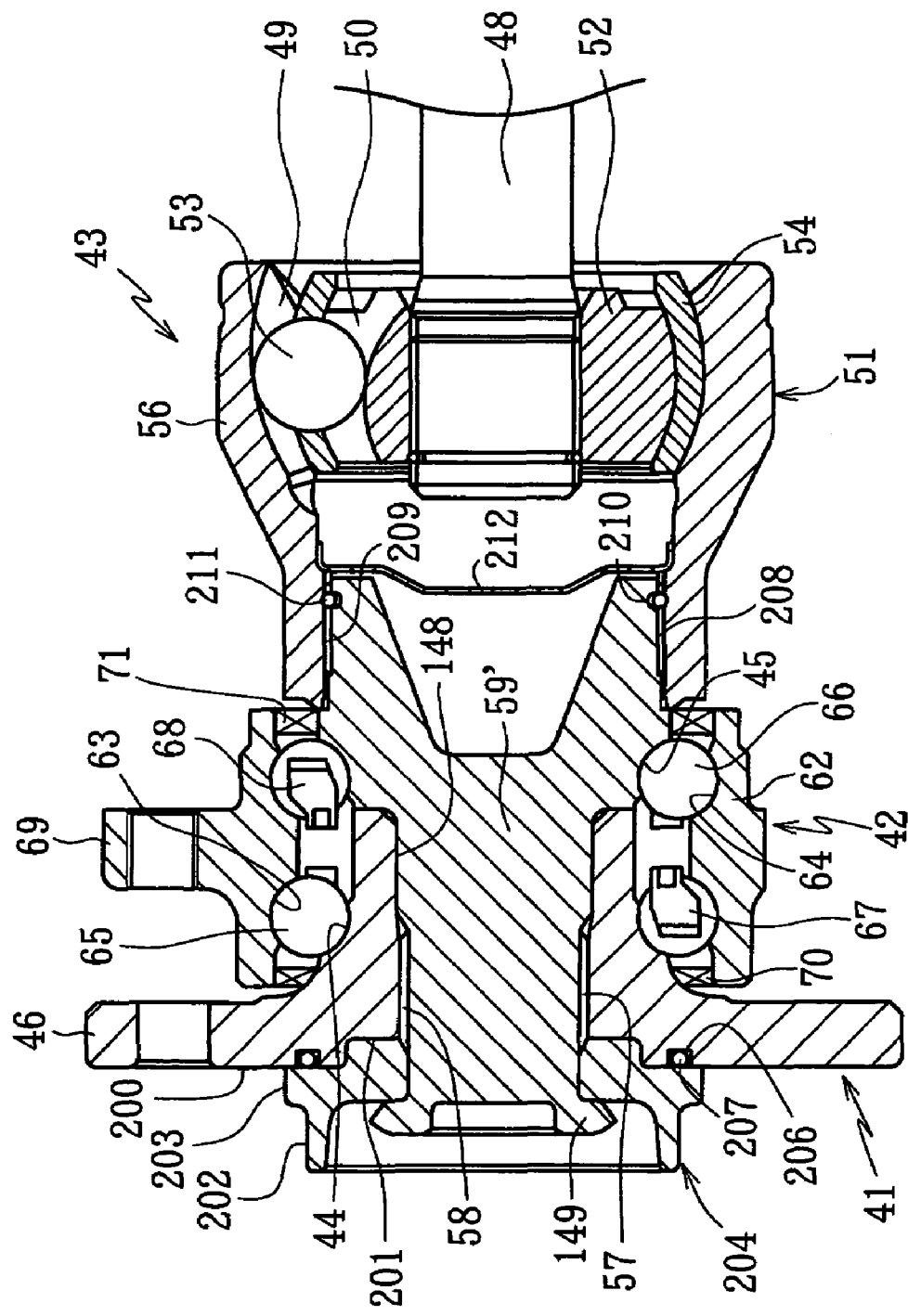
FIG. 39 is a cross sectional view showing a thirty-eighth embodiment of a bearing device according to the invention.

In the thirty-sixth embodiment described above, the mouth portion 56 and the stem portion 59 are unitized to form the joint outer ring 51 of the constant velocity universal joint 43, and this constitution is also applicable to a bearing device having the joint outer ring 51 in which the mouth portion 56 and the stem portion 59 are separable as the thirty-eighth embodiment shown in FIG. 39.

In the thirty-eighth embodiment, a serrated portion 208, as well as an annular groove 210 with sharp bottom corners, is formed on an outside periphery of the inboard end portion of the stem portion 59. While on an inside periphery of the outboard end portion of the mouth portion 56, a serrated portion 209 that fits to the serrated portion 208 of the stem portion 59 is formed. The inboard inner raceway 45 formed on the shoulder portion of the joint outer ring 51 in the thirty-sixth embodiment is formed directly on an outside periphery of a shoulder portion of the stem portion 59' in the thirty-eighth embodiment.

In the thirty-eighth embodiment, the stem portion 59' and the mouth portion 56 are made detachable in such a way that the mouth portion 56 is fitted to the stem portion 59' through the serrated portions 208 and 209 with a fixing ring 211 being installed in the groove 210 of the stem portion 59'. The serrated portions 208 and 209 enable torque transmission between the stem portion 59' and the mouth portion 56, and a relative shift in an axial direction between the stem portion 59' and the mouth portion 56 is prevented by the fixing ring 211. An end plate 212 installed inside the mouth portion 56 prevents grease or other similar materials filled in the mouth portion 56 from leaking out.

Figure 40:
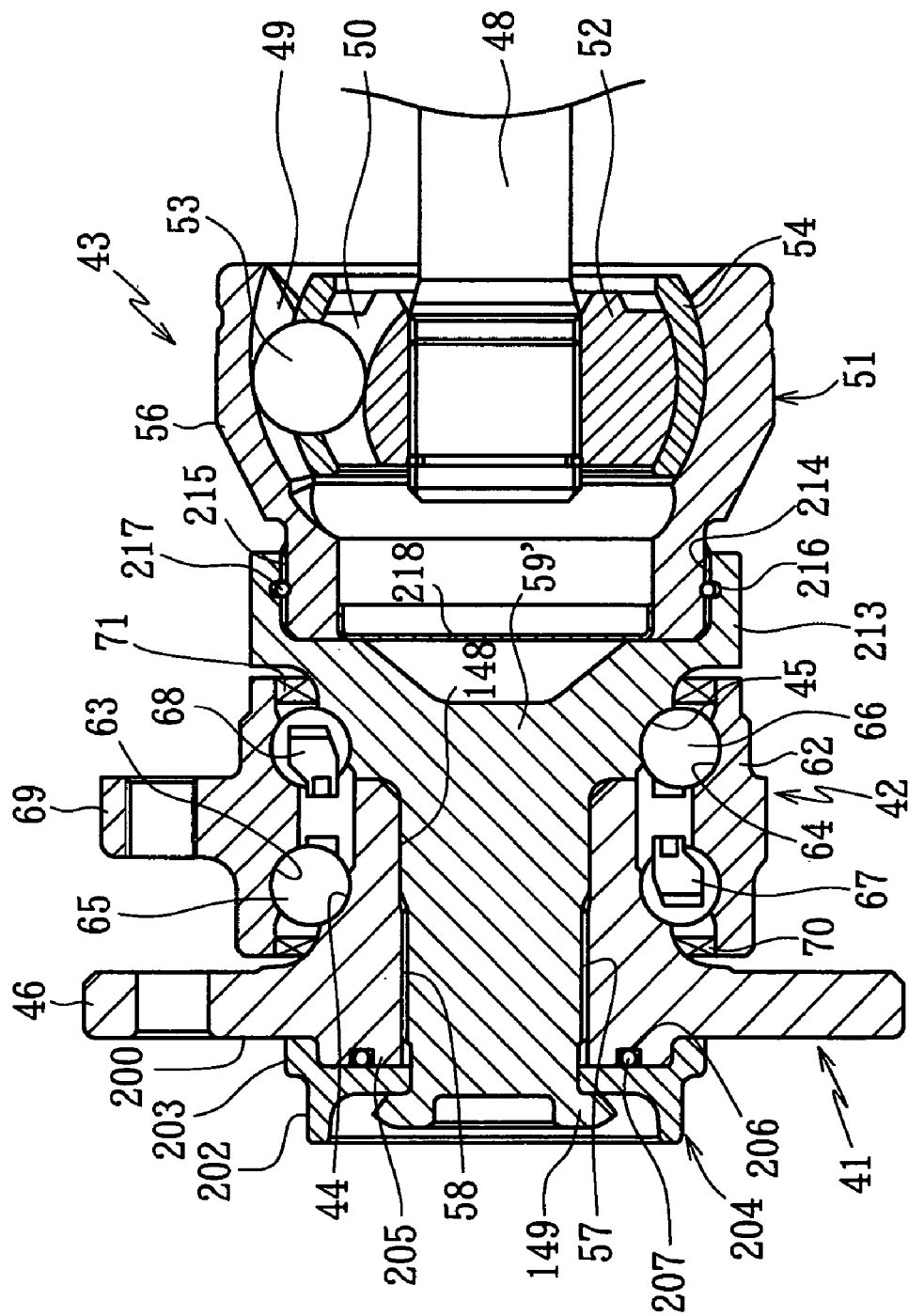
FIG. 40 is a cross sectional view showing a thirty-ninth embodiment of a bearing device according to the invention.

A bearing device as shown in the thirty-seventh embodiment may also have the joint outer ring 51 in which the mouth portion 56 and the stem portion 59' are separable in the same manner as that shown in a thirty-ninth embodiment in FIG. 40.

In the thirty-ninth embodiment, the diameter of an inboard end portion of the stem portion 59' is expanded to integrally form a tubular portion 213, a serrated portion 214, as well as an annular groove 216 with sharp bottom corners, is formed on an inside periphery of the tubular portion 213. While, on an outside periphery at an outboard end portion of the mouth portion 56, a serrated portion 215 that fits to a serrated portion 214 of the stem portion 59' is formed. Also in the thirty-ninth embodiment, the inboard inner raceway 45 that is formed on the shoulder portion of the joint outer ring 51 in the thirty-seventh embodiment is formed directly on an outside periphery of a shoulder of the stem portion 59'.

In the thirty-ninth embodiment, the stem portion 59' and the mouth portion 56 are made detachable in such a way that the mouth portion 56 is fitted to the stem portion 59' through the serrated portions 214 and 215 with a fixing ring 217 being installed in the groove 216 with sharp bottom corners on the tubular portion 213 of the stem portion 59'. The serrated portions 214 and 215 enable torque transmission between the stem portion 59' and the mouth portion 56, and a relative shift in an axial direction between the stem portion 59' and the mouth portion 56 is prevented by the fixing ring 217. An end plate 218 installed inside the mouth portion 56 prevents grease or other similar materials filled in the mouth portion 56 from leaking.

Figure 41:
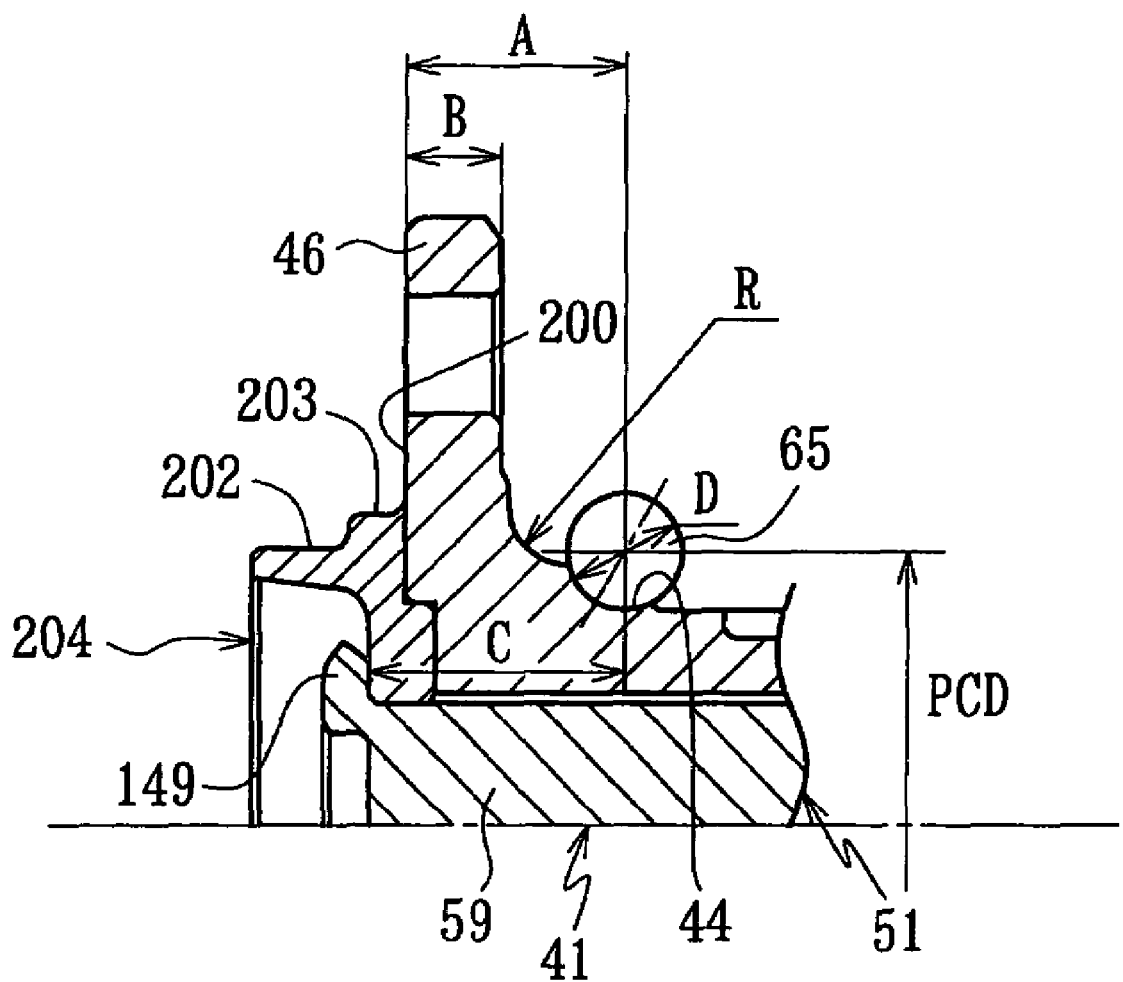
FIG. 41 is a cross sectional view of a part showing a hub ring, a stem portion of a joint outer ring and a pilot ring, all of which are shown in FIG. 37.

In the thirty-sixth to thirty-ninth embodiments described above, the position of the outboard inner raceway of the hub ring 41, or the center position of the rolling elements 65 on the inner raceway 44 is defined by ratios described below (see FIG. 41).

That is, ① The ratio of a thickness B of the wheel mounting flange to a distance dimension A between an outboard flange-surface 200 of the wheel mounting flange 46 and the position of an inner raceway is set to $B/A \geq 0.41$, ② The ratio of a distance dimension C between a surface on the pilot ring 204 with which a swaged portion contacts and the position of the inner raceway to the distance dimension A between the flange surface 200 and the position of the inner raceway is set to $C/A \geq 0.79$, ③ The ratio of a curvature R of a sealing portion with which the seal 70 has a sliding contact relationship with an outside diameter D of the rolling element 65 is set to $2R/D \geq 0.37$, ④ The ratio of the distance dimension C between a surface on the pilot ring 204 with which swaged portion contacts and the position of the inner raceway to a pitch circle diameter PCD of the rolling elements 65 is set to $C/PCD \geq 0.33$, and ⑤ The ratio of the outside diameter D of the rolling elements 65 to the distance dimension A between the flange surface 200 and the position of the inner raceway is set to D/A≧0.45.

The embodiments from the thirty-sixth to the thirty-ninth described above have discussed bearing devices having a constitution in which the inboard inner raceway 45 of the double-row inner raceways 44 and 45 is formed directly on the joint outer ring 51 of the constant velocity universal joint 43; however, the present invention is not limited to such embodiments as described above, and is also applicable to a bearing device having a constitution in which an inboard inner raceway is formed on an outside periphery of an inner ring, a separate element, pressed onto a small-diameter stepped portion of a hub ring.

Figure 42:
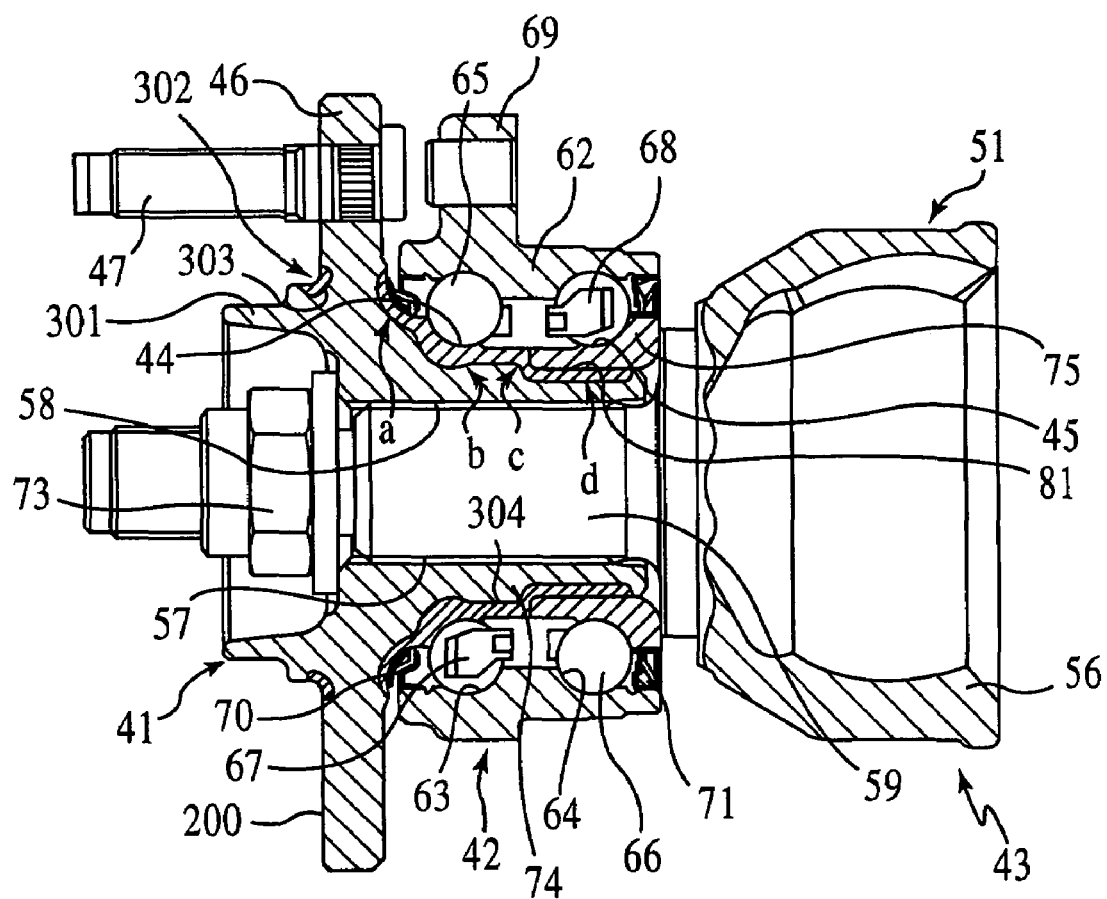
FIG. 42 is a cross sectional view showing a fortieth embodiment of a bearing device according to the invention.

A bearing device of a forty-first embodiment shown in FIG. 42 is, for example, for a driving wheel, in which the inner ring 75 is fitted onto the small-diameter stepped portion 74 formed on an outside periphery of the hub ring 41, and the inboard inner raceway 45 is formed on an outside periphery of the inner ring 75. At opening portions of both ends of the bearing 42, there are seal lips slidingly contacting with slingers that are pressed onto outside peripheries of the inner ring 75, a pair of the seals 70 and 71 for sealing an annular space surrounded by the outer ring, hub ring and the inner ring are fitted into bores at both ends of the outer ring 62 to prevent leakage of grease filled inside and entry of water or foreign matter from outside.

In the forty-first embodiment, a surface-hardened layer 303 is formed, for example, by induction hardening on an outboard base portion of the wheel mounting flange 46, or on a fillet portion 302 located on a region extending from the brake rotor mounting surface 200 to the tubular pilot portion 301. Forming the surface-hardened layer 303 facilitates enhancement of the strength of the outboard base portion, the weakest portion for rotational bending fatigue, while allowing keep current processing methods and facilities, and without changing the shape and dimensions of a wheel mounting flange 46, and without increasing a carbon content or adding strengthening elements to a material.

The surface-hardened layer 303 formed on the fillet portion 302 of the wheel mounting flange 46 is prepared with a surface hardness in the range from HRC 40 through 63, preferably from HRC 58 through 63, with its depth being in the range from 0.3 through 2 mm, preferably from 0.5 through 2 mm.

When the surface hardness of the surface-hardened layer 303 is in the range from HRC 40 to 63, preferably from 58 through 63, it effectively prevents breakage caused by rotational bending fatigue, because rotational bending fatigue basically depends on hardness. When surface hardness is less than HRC 40, desired strength for rotational bending fatigue is not obtainable.

Preventing breakage caused by rotational bending fatigue means preventing production of cracks on a material surface from occurring. Stress caused by rotational bending is highest at the surface, and it reduces toward inside. Therefore, the depth of a surface-hardened layer 303 is not necessarily so deep, and a depth from 0.3 through 2 mm, preferably from 0.5 through 2 mm, may be sufficient. Briefly, desired strength for rotational bending fatigue is not obtainable when the depth of a surface-hardened layer 303 is less than 0.5 mm, and stress caused by rotational bending reduces at a depth deeper than 2 mm, so that it is not necessary to make the depth deeper than that described above.

The hub ring 41 and the inner ring 75 are made of carbon steel containing C from 0.5 through 0.8 wt %. Carbon steel containing C from 0.5 through 0.8 wt % has better workability than SUJ2, high-carbon chrome steel for a bearing (containing C from 0.95 through 1.10 wt %), by a degree corresponding to its less carbon content. A carbon content of 0.5 wt % or more is needed to increase strength, wear resistance and rolling fatigue life, and a content of 0.8 wt % is an upper limit, because processability, machinability, and toughness lower above this value.

In the forty-first embodiment shown in FIG. 42, a surface-hardened layer 304 is formed on an outside periphery of the hub ring 41 with which a seal lip of the seal 70 installed at the outboard end portion of the outer ring 62 slidingly contacts, or on a region extending from a sealing portion through the inner raceway 44 and to the small-diameter stepped portion 74.

Each portion of the surface-hardened layer 304 is indicated by alphabetical letters from 'a' to 'd' as follows: portion 'a' is a sealing portion with which the seal lip of the seal 70 to slidingly contacts, and wear resistance is required for this portion. By forming the surface-hardened layer 304 on the sealing portion, strength of the wheel mounting flange 46 is further enhanced. Portion 'b' is an inner raceway 44 on which the rolling elements 65 roll, and durability is required for this portion. Portion 'c' is a part that contacts with the inner ring 75, and portion 'd' is a part that fits to the inner ring 75 or to the hub ring 41, and therefore, the portion requires resistance for creeping and fretting.

Figure 43:
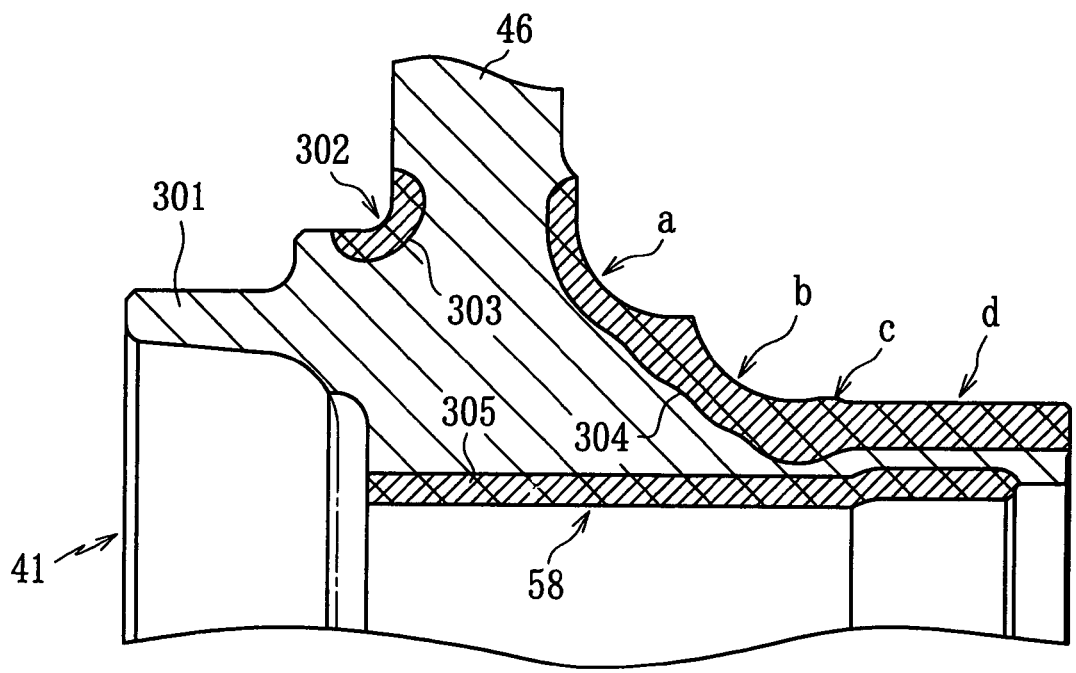
FIG. 43 is an enlarged cross sectional view of a part showing the hub ring in FIG. 42.

In a forty-second embodiment shown in FIG. 43, a surface-hardened layer 305 is provided on the serrated portion 58 formed on an inside periphery of the hub ring 41. When the surface-hardened layer 305 is formed on the serrated portion 58 in this way, wear resistance and strength increase, and the increase in strength allows to shorten the effective length of the serrated portion 58.

Figure 44:
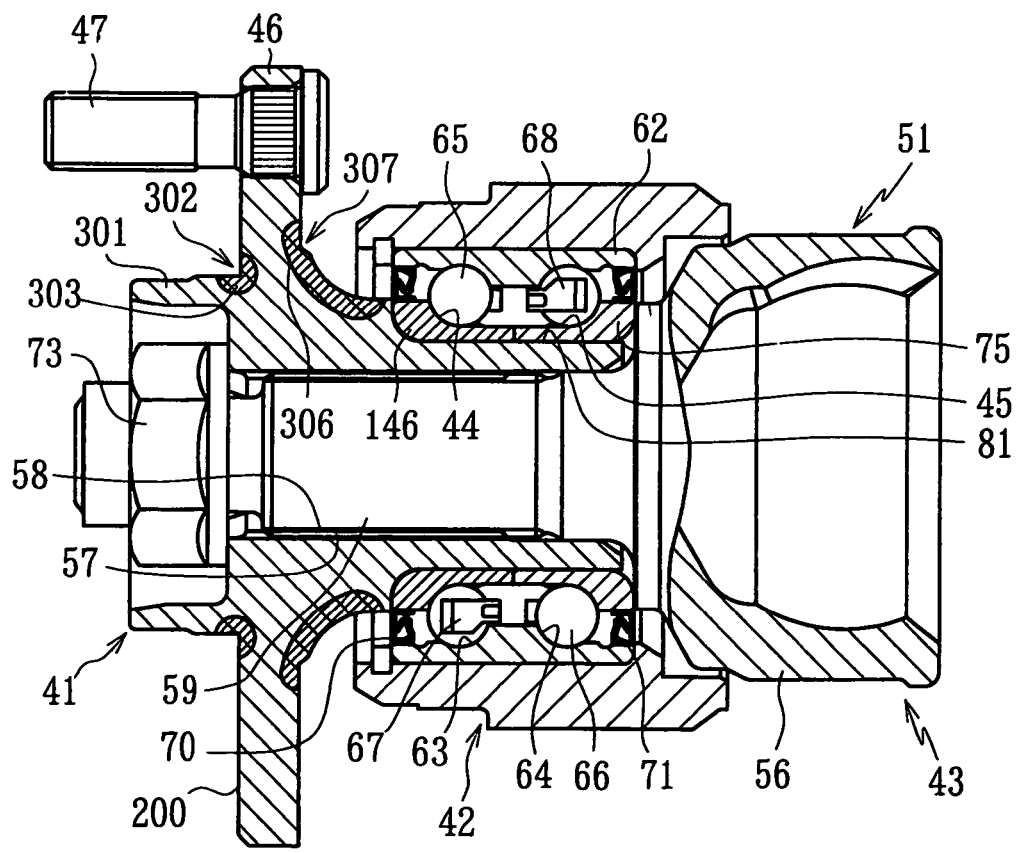
FIG. 44 is a cross sectional view showing a forty-first embodiment of a bearing device according to the invention.
Figure 45:
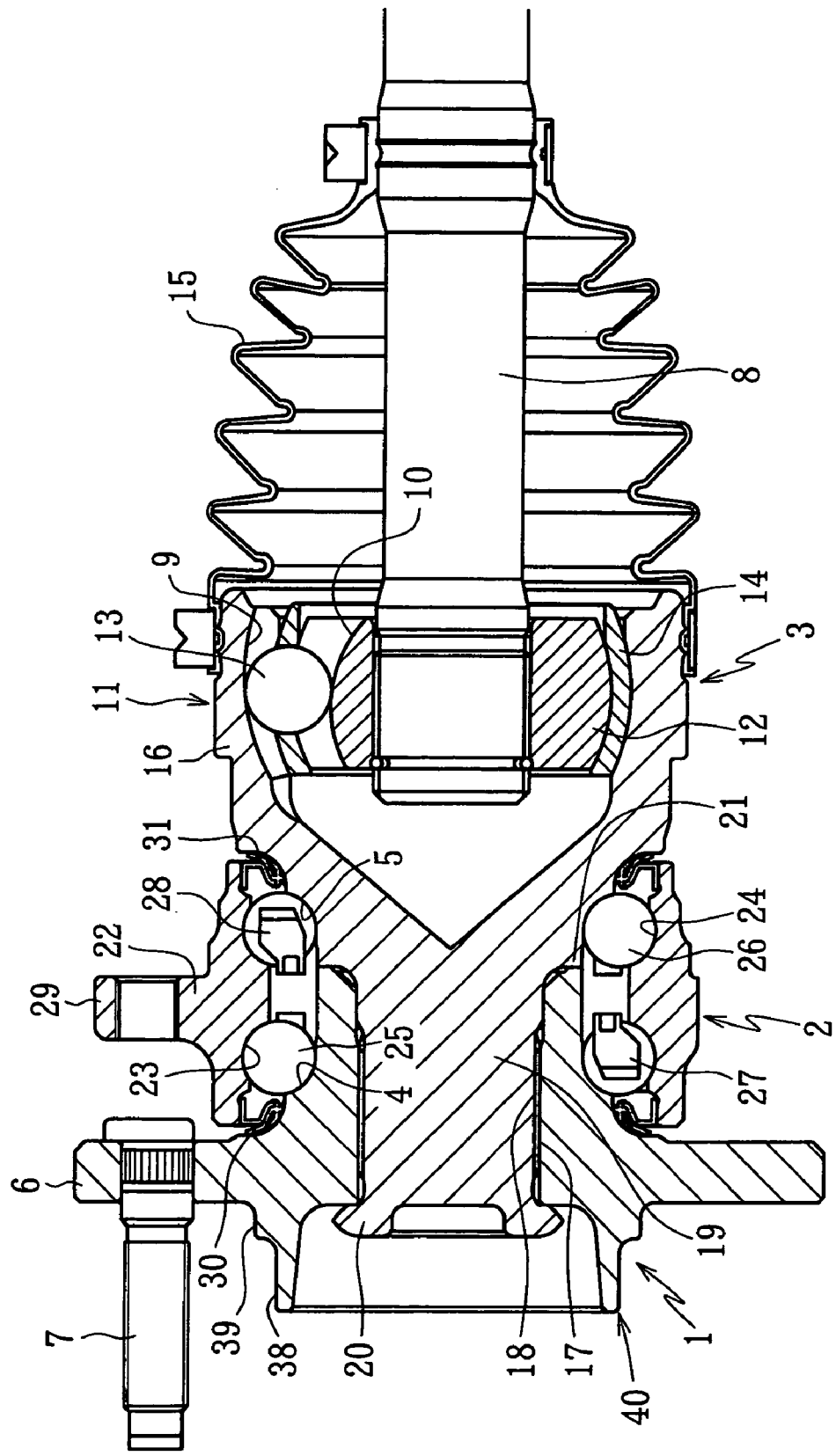
FIG. 45 is a cross sectional view showing a conventional non-separable-type bearing device in which a hub ring, a bearing and a constant velocity universal joint are unitized.
Figure 46:
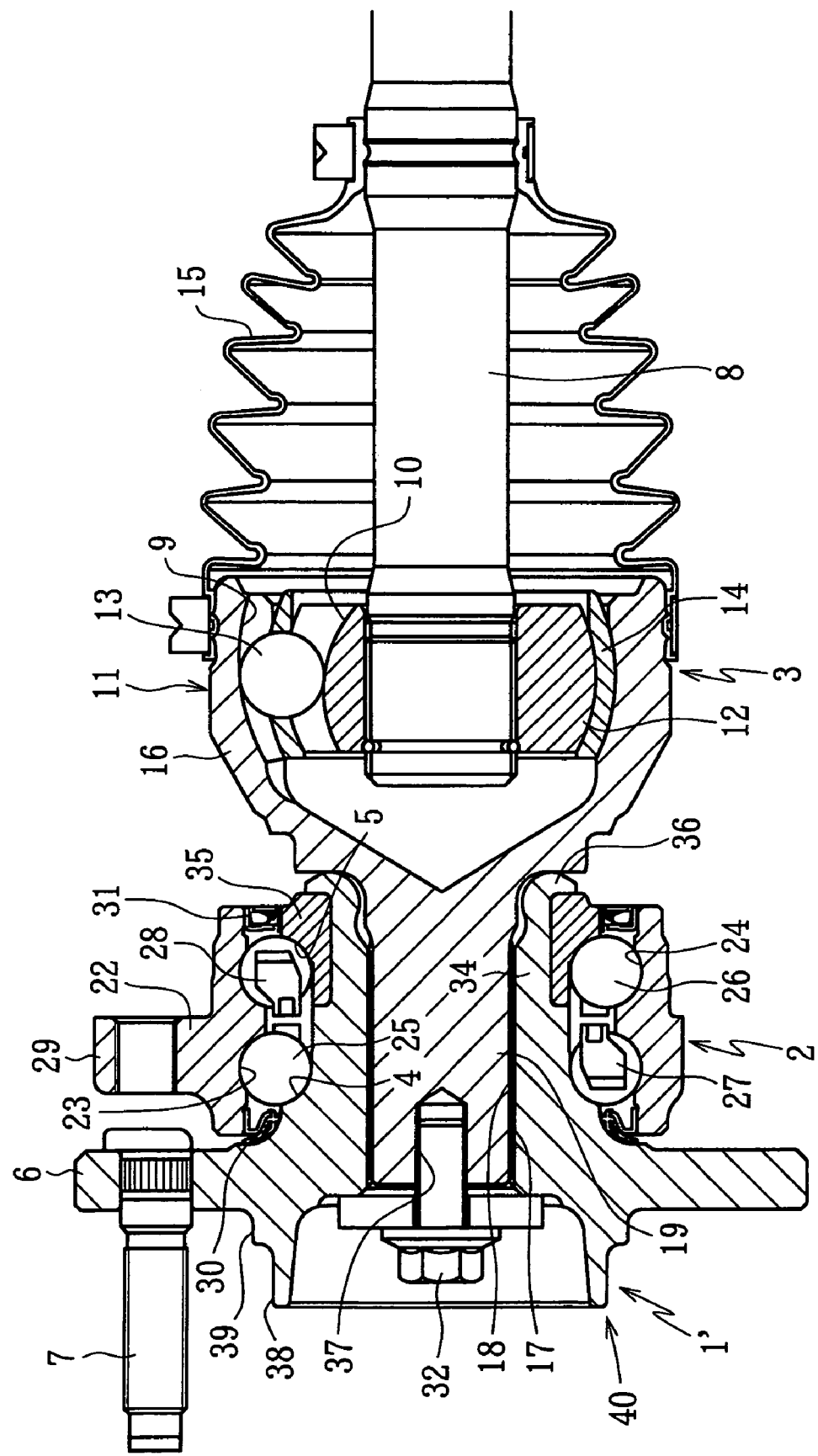
FIG. 46 is a cross sectional view showing a conventional separable-type bearing device in which a hub ring and a bearing are unitized, and the hub ring is fixed with bolts to a constant velocity universal joint.
Figure 47:
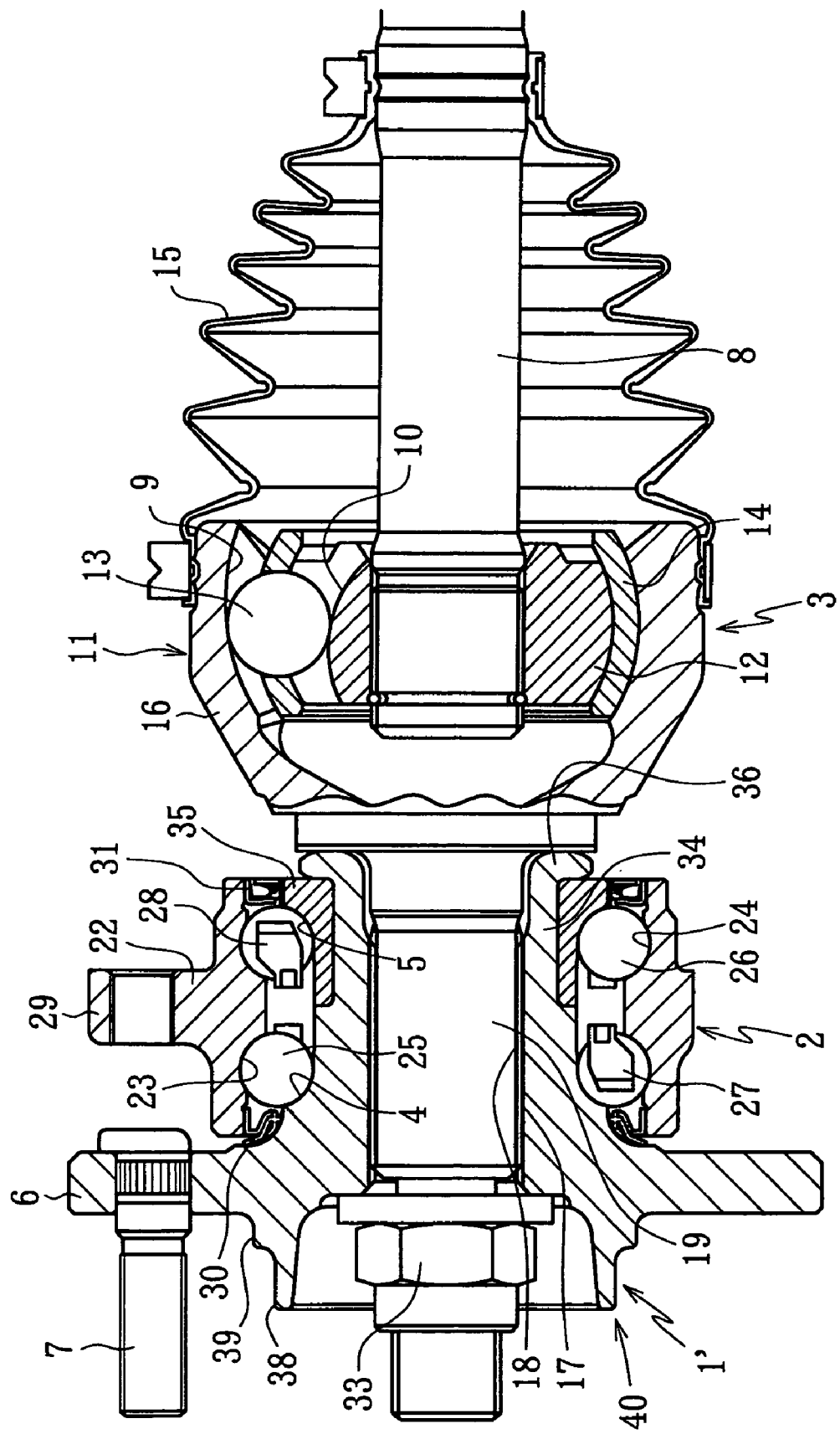
FIG. 47 is a cross sectional view showing a conventional separable-type bearing device in which a hub ring and a bearing are unitized, and the hub ring is fixed with a nut to a constant velocity universal joint.

FIG. 44 shows a forty-third embodiment of a bearing device according to the invention. In the forty-third embodiment, differently from the embodiment shown in FIG. 42 in which the outboard inner raceway 44 is formed directly on the hub ring 41, the inner ring 146 is pressed onto the small-diameter stepped portion 74 of the hub ring 41 in the same manner as the inboard inner raceway 45, and the outboard inner raceway 44 is formed on an outside periphery of the inner ring 146 which is a separate element.

In a bearing device of this embodiment, a surface-hardened layer 306 is formed not only on the fillet portion 302 that is an outboard base portion of the wheel mounting flange 46, but formed also on an inboard base portion of the wheel mounting flange 46, or on a fillet portion 307. By forming the surface-hardened layers 303 and 306 on both sides of the base of the wheel mounting flange 46, or about the fillet portions 302 and 307, the strength of the wheel mounting flange 46 is further increased.

For a heat treatment method for forming the surface-hardened layers 303 to 306, induction hardening is suitable. By effectively using characteristics of induction heating, induction heat treatment as a surface hardening treatment can provide wear resistance or improved fatigue strength to material, while allowing free selection of the surface-hardened layers 303 to 306.

Induction heating is a method to make a metal material generate heat in the material by directly converting electric energy to heat energy using the phenomenon of electromagnetic induction. Induction heat treatment using the method of induction heating has many features. Characteristics of a base material can be maintained even after the treatment, because induction heating enables local heating, facilitates free selection of the depth of the layer to be hardened, and allows to control so that regions other than those to be hardened are not thermally affected.

In the embodiment shown in FIG. 42 and FIG. 44, cases in which the joint outer ring 51 of the constant velocity universal joint 43 is fixed to the hub ring 41 with the nut 73 are shown; however, the invention is not limited to such described in the embodiment, and it may also be constituted such that the joint outer ring 51 is fixed to the hub ring 41 by swaging an end portion of the stem portion 59 of the joint outer ring 51 to the hub ring 41. Also, the invention is applicable not only to a bearing device for a driving wheel, but also to that for a driven wheel. In a system with which an outer-ring rotates and a wheel mounting flange is provided on a outer ring, a surface-hardened layer is formed on a base portion of the wheel mounting flange on the outer ring.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A wheel bearing device comprising:
   a hub ring;
   a constant velocity universal joint;
   a double-row bearing which is unitized together with the hub ring and the constant velocity universal joint,
   wherein one of double-row inner raceways of the bearing is formed on a joint outer ring of the constant velocity universal joint and another of double-row inner raceways of the bearing is formed on an outer periphery of an inner ring disposed between the hub ring and the joint outer ring,
   wherein the joint outer ring is fitted onto the hub ring with torque transmission means being provided in between, and
   wherein the hub ring and the joint outer ring are joined together by plastic deformation.

2. The wheel bearing device according to claim 1, wherein an inboard end portion of the hub ring is extended beyond the position of an inboard inner raceway of the double-row inner raceways.

3. The wheel bearing device according to claim 1, wherein the torque transmission means and a plastically deformed portion are separately disposed from each other.

4. The wheel bearing device according to claim 3, wherein the plastically deformed portion is disposed at one side of the torque transmission means in an axial direction, and at the other side is a fit portion at which the hub ring and the joint outer ring are fitted to each other without play.

5. The wheel bearing device according to claim 3, wherein the plastically deformed portion is such that an end portion of the hub ring is coupled with the joint outer ring by swaging.

6. The wheel bearing device according to claim 1, wherein the hub ring and the joint outer ring are joined together by plastically deforming an end portion of a connection member fitted into the hub ring.

7. The wheel bearing device according to claim 6, wherein the plastically deformed portion and the torque transmission means are provided at a common part.

8. The wheel bearing device according to claim 7, wherein a portion with projections and depressions is provided within a fit region of the hub ring and the joint outer ring, and the fit region including the portion with projections and depressions is at least partly expanded or shrunk in the diameter.

9. The wheel bearing device according to claim 8, wherein the diameter expansion portion or the diameter shrinkage portion is disposed more inboard side than an outboard inner raceway.

10. The wheel bearing device according to claim 1 to 9, wherein a pitch circle diameter of an outboard bearing of a double-row bearing is smaller than that of an inboard bearing.

11. The wheel bearing device according to any one of claims 1 to 9, wherein the diameter of outboard rolling elements of a double-row bearing is smaller than that of inboard rolling elements.

12. The wheel bearing device according to any one of claims 1 to 9, wherein the inner ring is fitted to the hub ring.

13. The wheel bearing device according to any one of claims 1 to 9, wherein the inner ring is fitted to the joint outer ring.

* * * * *